US009762929B2

(12) United States Patent
Puri et al.

(10) Patent No.: US 9,762,929 B2
(45) Date of Patent: Sep. 12, 2017

(54) CONTENT ADAPTIVE, CHARACTERISTICS COMPENSATED PREDICTION FOR NEXT GENERATION VIDEO

(71) Applicants: Atul Puri, Redmond, WA (US); Neelesh N. Gokhale, Seattle, WA (US)

(72) Inventors: Atul Puri, Redmond, WA (US); Neelesh Gokhale, Seattle, WA (US)

(73) Assignee: Intel Corporation, Santa Clara, CA (US)

( * ) Notice: Subject to any disclaimer, the term of this patent is extended or adjusted under 35 U.S.C. 154(b) by 250 days.

(21) Appl. No.: 14/435,544

(22) PCT Filed: Nov. 13, 2013

(86) PCT No.: PCT/US2013/069905
§ 371 (c)(1),
(2) Date: Apr. 14, 2015

(87) PCT Pub. No.: WO2014/078422
PCT Pub. Date: May 22, 2014

(65) Prior Publication Data
US 2015/0281716 A1    Oct. 1, 2015

Related U.S. Application Data

(60) Provisional application No. 61/725,576, filed on Nov. 13, 2012, provisional application No. 61/758,314, filed on Jan. 30, 2013.

(51) Int. Cl.
*H04N 19/82*    (2014.01)
*H04N 19/12*    (2014.01)
(Continued)

(52) U.S. Cl.
CPC .......... *H04N 19/82* (2014.11); *H04N 19/105* (2014.11); *H04N 19/119* (2014.11); *H04N 19/12* (2014.11);
(Continued)

(58) Field of Classification Search
CPC .... H04N 19/82; H04N 19/139; H04N 19/527; H04N 19/105; H04N 19/573;
(Continued)

(56) References Cited

U.S. PATENT DOCUMENTS 7,620,109 B2 *   11/2009   Srinivasan ............. H04N 19/61
                                                      375/240.29
9,609,318 B2 *   3/2017    Matsuo .................. H04N 19/50
(Continued)

FOREIGN PATENT DOCUMENTS

CN          1652608 A       8/2005
CN        101039434 A       9/2007
(Continued)

OTHER PUBLICATIONS

European Search Report for EP13855974.5, mailed Jun. 16, 2016, 9 pages.
(Continued)

*Primary Examiner* — Sath V Perungavoor
*Assistant Examiner* — Howard D Brown, Jr.
(74) *Attorney, Agent, or Firm* — Jordan IP Law, LLC

(57) ABSTRACT

Techniques related to content adaptive, characteristics compensated prediction for video coding are described.

21 Claims, 19 Drawing Sheets

(51) Int. Cl.

| | |
|---|---|
| *H04N 19/176* | (2014.01) |
| *H04N 19/119* | (2014.01) |
| *H04N 19/147* | (2014.01) |
| *H04N 19/46* | (2014.01) |
| *H04N 19/122* | (2014.01) |
| *H04N 19/136* | (2014.01) |
| *H04N 19/85* | (2014.01) |
| *H04N 19/172* | (2014.01) |
| *H04N 19/44* | (2014.01) |
| *H04N 19/513* | (2014.01) |
| *H04N 19/61* | (2014.01) |
| *H04N 19/91* | (2014.01) |
| *H04N 19/573* | (2014.01) |
| *H04N 19/105* | (2014.01) |
| *H04N 19/139* | (2014.01) |
| *H04N 19/527* | (2014.01) |

(52) U.S. Cl.
CPC ........ *H04N 19/122* (2014.11); *H04N 19/136* (2014.11); *H04N 19/139* (2014.11); *H04N 19/147* (2014.11); *H04N 19/172* (2014.11); *H04N 19/176* (2014.11); *H04N 19/44* (2014.11); *H04N 19/46* (2014.11); *H04N 19/513* (2014.11); *H04N 19/527* (2014.11); *H04N 19/573* (2014.11); *H04N 19/61* (2014.11); *H04N 19/85* (2014.11); *H04N 19/91* (2014.11)

(58) Field of Classification Search
CPC ........ H04N 19/12; H04N 19/61; H04N 19/91; H04N 19/172; H04N 19/44; H04N 19/513; H04N 19/136; H04N 19/176; H04N 19/85; H04N 19/14
See application file for complete search history.

(56) References Cited

U.S. PATENT DOCUMENTS

| | | | |
|---|---|---|---|
| 2010/0061461 A1 | 3/2010 | Bankoski et al. | |
| 2010/0202521 A1 | 8/2010 | Koo et al. | |
| 2011/0058611 A1 | 3/2011 | Sugimoto et al. | |
| 2013/0128984 A1* | 5/2013 | Matsuo ............ | H04N 19/00569 375/240.16 |
| 2013/0170554 A1* | 7/2013 | Matsuo ............ | H04N 19/00587 375/240.16 |
| 2014/0112391 A1* | 4/2014 | Matsuo ................. | H04N 19/52 375/240.16 |
| 2014/0119453 A1* | 5/2014 | Bandoh ............ | H04N 19/00751 375/240.16 |
| 2014/0161189 A1* | 6/2014 | Zhang ................. | H04N 19/597 375/240.16 |

FOREIGN PATENT DOCUMENTS

| | | |
|---|---|---|
| CN | 101263513 A | 9/2008 |
| CN | 101455084 A | 6/2009 |
| CN | 101523922 A | 9/2009 |
| JP | 2007-049741 | 2/2007 |
| KR | 10-2011-0113583 A | 10/2011 |
| KR | 10-2012-0080548 A | 7/2012 |
| WO | 2007011851 A2 | 1/2007 |
| WO | 2011039931 A1 | 4/2011 |
| WO | 2011126345 A2 | 10/2011 |
| WO | 2011128269 A1 | 10/2011 |

OTHER PUBLICATIONS

International Preliminary Report on Patentability for PCT/US2013/069905, mailed May 28, 2015, 8 pages.
Examination Report for EP13855974.5, mailed Nov. 17, 2016, 7 pages.
Notice of Reasons for Rejection for JP 2015-542034, mailed Jun. 22, 2016, 3 pages.
International Search Report and Written Opinion for PCT/US2013/069905, mailed Feb. 26, 2014, 16 pages.

* cited by examiner

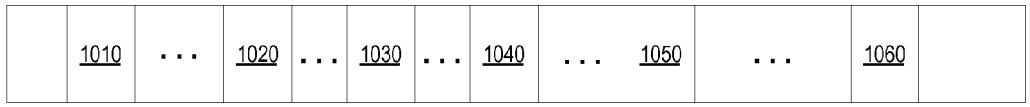

Receive Encoded Bitstream
1102

Decode the Entropy Encoded Bitstream to Determine Coding Partition Indicator(s), Block Size Data, Transform Type Data, Quantizer (Qp), and Quantized Transform Coefficients, Motion Vectors and Reference Type Data, Characteristic Parameters (e.g., mop, syp)
1104

Apply Quantizer (Qp) on Quantized Coefficients to Generate Inverse Quantized Transform Coefficients
1106

On each Decoded Block of Coefficients in a Coding (or Intra Predicted) Partition Perform Inverse Transform based on Transform Type and Block Size Data to Generate Decoded Prediction Error Partitions
1108

Use Decoded Modifying Characteristics (e.g., mop, syp) to Generate Modified References for Prediction and Use Motion Vectors and Reference Info, Predicted Partition Info, and Modified References to Generate Predicted Partition
1109

Add Predicted Partition to the Decoded Prediction Error Data Partition to Generate a Reconstructed Partition
1110

Assemble Reconstructed Partitions to Generate a Tile or Super-Fragment
1112

Assemble Tiles or Super-Fragments of a Picture to Generate a Full Decoded Picture
1114

FIG. 11

CONTENT ADAPTIVE, CHARACTERISTICS COMPENSATED PREDICTION FOR NEXT GENERATION VIDEO

RELATED APPLICATIONS

The present application claims the benefit of U.S. Provisional Application No. 61/725,576 filed 13 Nov. 2012, and titled "CONTENT ADAPTIVE VIDEO CODER", as well as U.S. Provisional Application No. 61/758,314 filed 30 Jan. 2013, and titled "NEXT GENERATION VIDEO CODING".

BACKGROUND

A video encoder compresses video information so that more information can be sent over a given bandwidth. The compressed signal may then be transmitted to a receiver having a decoder that decodes or decompresses the signal prior to display.

High Efficient Video Coding (HEVC) is the latest video compression standard, which is being developed by the Joint Collaborative Team on Video Coding (JCT-VC) formed by ISO/IEC Moving Picture Experts Group (MPEG) and ITU-T Video Coding Experts Group (VCEG). HEVC is being developed in response to the previous H.264/AVC (Advanced Video Coding) standard not providing enough compression for evolving higher resolution video applications. Similar to previous video coding standards, HEVC includes basic functional modules such as intra/inter prediction, transform, quantization, in-loop filtering, and entropy coding.

The ongoing HEVC standard may attempt to improve on limitations of the H.264/AVC standard such as limited choices for allowed prediction partitions and coding partitions, limited allowed multiple references and prediction generation, limited transform block sizes and actual transforms, limited mechanisms for reducing coding artifacts, and inefficient entropy encoding techniques. However, the ongoing HEVC standard may use iterative approaches to solving such problems.

For instance, with ever increasing resolution of video to be compressed and expectation of high video quality, the corresponding bitrate/bandwidth required for coding using existing video coding standards such as H.264 or even evolving standards such as H.265/HEVC, is relatively high. The aforementioned standards use expanded forms of traditional approaches to implicitly address the insufficient compression/quality problem, but often the results are limited.

This disclosure, developed within the context of a Next Generation Video (NGV) codec project, addresses the general problem of designing an advanced video codec that maximizes the achievable compression efficiency while remaining sufficiently practical for implementation on devices. For instance, with ever increasing resolution of video and expectation of high video quality due to availability of good displays, the corresponding bitrate/bandwidth required using existing video coding standards such as earlier MPEG standards and even the more recent H.264/AVC standard, is relatively high. H.264/AVC was not perceived to be providing high enough compression for evolving higher resolution video applications.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 10 illustrates an example bitstream;

FIG. 11 is a flow diagram illustrating an example video decoding process;

DETAILED DESCRIPTION

Figure 1:
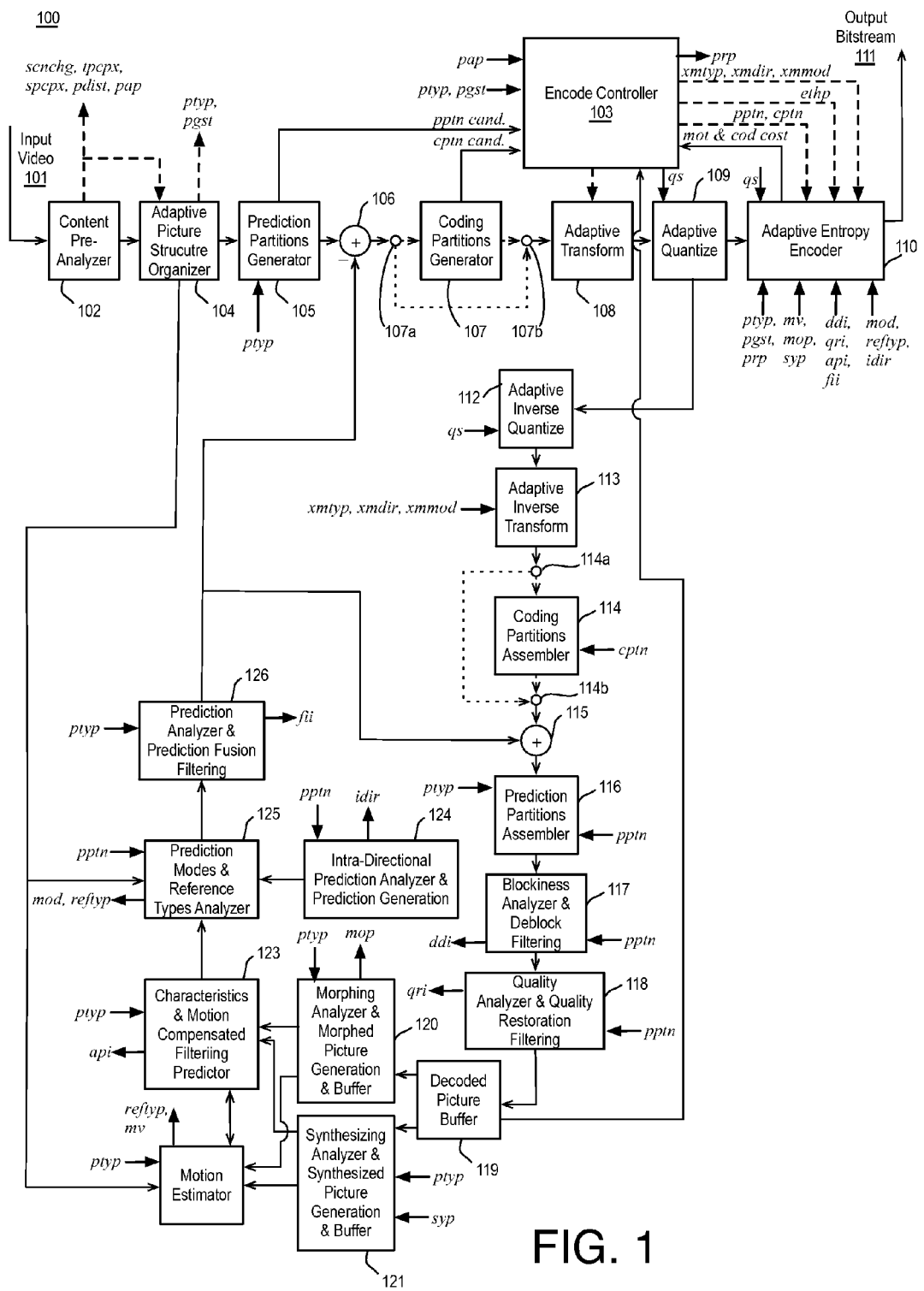
FIG. 1 is an illustrative diagram of an example next generation video encoder.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.); and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Systems, apparatus, articles, and methods are described below related to interframe prediction compensation.

As discussed above, the H.264/AVC standard may have a variety of limitations and ongoing attempts to improve on the standard, such as, for example, the HEVC standard may use iterative approaches to address such limitations. For instance, with ever increasing resolution of video to be compressed and expectation of high video quality, the corresponding bitrate/bandwidth required for coding using existing video coding standards such as H.264 or even evolving standards such as H.265/HEVC, is relatively high. The aforementioned standards may use expanded forms of traditional approaches to implicitly address the insufficient compression/quality problem, but often the results are limited. For example, traditional interframe coding typically includes motion compensated prediction used by the standards. Accordingly, such insufficient compression/quality problems are typically being implicitly addressed by only using local motion compensated prediction in interframe coding of video.

Further, some ad hoc approaches are currently being attempted. Such attempts typically may employ multiple past or multiple past and future frames. Such usage of multiple past or multiple past and future frames is typically employed with the hope that in the past or future frames, there might be some more similar areas to the area of current frame being predicted than in the past frame (for P-pictures/slices), or in the past and future frames (for B-pictures/slices).

However, since many of such insufficient compression/quality problems are not only due to motion but other characteristics as well motion compensated prediction alone can't fully solve such insufficient compression/quality problems using predictions from previous reference frame (in case of P-pictures/slices), and previous and next reference frames in case of B-pictures/slices. Accordingly, Next generation video (NGV) systems, apparatus, articles, and methods are described below. NGV video coding may incorporate significant content based adaptivity in the video coding process to achieve higher compression. Such implementations developed in the context a NGV codec addresses the problem of how to improve the prediction signal, which in turn allows achieving high compression efficiency in video coding.

As used herein, the term "coder" may refer to an encoder and/or a decoder. Similarly, as used herein, the term "coding" may refer to performing video encoding via an encoder and/or performing video decoding via a decoder. For example, a video encoder and video decoder may both be examples of coders capable of coding video data. In addition, as used herein, the term "codec" may refer to any process, program or set of operations, such as, for example, any combination of software, firmware, and/or hardware that may implement an encoder and/or a decoder. Further, as used herein, the phrase "video data" may refer to any type of data associated with video coding such as, for example, video frames, image data, encoded bit stream data, or the like.

FIG. 1 is an illustrative diagram of an example next generation video encoder 100, arranged in accordance with at least some implementations of the present disclosure. As shown, encoder 100 may receive input video 101. Input video 101 may include any suitable input video for encoding such as, for example, input frames of a video sequence. As shown, input video 101 may be received via a content pre-analyzer module 102. Content pre-analyzer module 102 may be configured to perform analysis of the content of video frames of input video 101 to determine various types of parameters for improving video coding efficiency and speed performance. For example, content pre-analyzer module 102 may determine horizontal and vertical gradient information (e.g., Rs, Cs), variance, spatial complexity per picture, temporal complexity per picture, scene change detection, motion range estimation, gain detection, prediction distance estimation, number of objects estimation, region boundary detection, spatial complexity map computation, focus estimation, film grain estimation, or the like. The parameters generated by content pre-analyzer module 102 may be used by encoder 100 (e.g., via encode controller 103) and/or quantized and communicated to a decoder. As shown, video frames and/or other data may be transmitted from content pre-analyzer module 102 to adaptive picture organizer module 104, which may determine the picture type (e.g., I-, P-, or F/B-picture) of each video frame and reorder the video frames as needed. In some examples, adaptive picture organizer module 104 may include a frame portion generator configured to generate frame portions. In some examples, content pre-analyzer module 102 and adaptive picture organizer module 104 may together be considered a pre-analyzer subsystem of encoder 100.

As shown, video frames and/or other data may be transmitted from adaptive picture organizer module 104 to prediction partitions generator module 105. In some examples, prediction partitions generator module 105 may divide a frame or picture into tiles or super-fragments or the like. In some examples, an additional module (e.g., between modules 104 and 105) may be provided for dividing a frame or picture into tiles or super-fragments. Prediction partitions generator module 105 may divide each tile or super-fragment into potential prediction partitionings or partitions. In some examples, the potential prediction partitionings may be determined using a partitioning technique such as, for example, a k-d tree partitioning technique, a bi-tree partitioning technique, or the like, which may be determined based at least in part on the picture type (e.g., I-, P-, or F/B-picture) of individual video frames, a characteristic of the frame portion being partitioned, or the like. In some examples, the determined potential prediction partitionings may be partitions for prediction (e.g., inter- or intra-prediction) and may be described as prediction partitions or prediction blocks or the like.

In some examples, a selected prediction partitioning (e.g., prediction partitions) may be determined from the potential prediction partitionings. For example, the selected prediction partitioning may be based at least in part on determining, for each potential prediction partitioning, predictions using characteristics and motion based multi-reference predictions or intra-predictions, and determining prediction parameters. For each potential prediction partitioning, a potential prediction error may be determined by differencing original pixels with prediction pixels and the selected prediction partitioning may be the potential prediction partitioning with the minimum prediction error. In other examples, the selected prediction partitioning may be determined based at least in part on a rate distortion optimization including a weighted scoring based at least in part on number of bits for coding the partitioning and a prediction error associated with the prediction partitioning.

As shown, the original pixels of the selected prediction partitioning (e.g., prediction partitions of a current frame) may be differenced with predicted partitions (e.g., a prediction of the prediction partition of the current frame based at least in part on a reference frame or frames and other predictive data such as inter- or intra-prediction data) at differencer 106. The determination of the predicted partitions will be described further below and may include a decode loop as shown in FIG. 1. Any residuals or residual data (e.g., partition prediction error data) from the differencing may be transmitted to coding partitions generator module 107. In some examples, such as for intra-prediction of prediction partitions in any picture type (I-, F/B- or P-pictures), coding partitions generator module 107 may be bypassed via switches 107a and 107b. In such examples, only a single level of partitioning may be performed. Such partitioning may be described as prediction partitioning (as discussed) or coding partitioning or both. In various examples, such partitioning may be performed via prediction partitions generator module 105 (as discussed) or, as is discussed further herein, such partitioning may be performed via a k-d tree intra-prediction/coding partitioner module or a bi-tree intra-prediction/coding partitioner module implemented via coding partitions generator module 107.

In some examples, the partition prediction error data, if any, may not be significant enough to warrant encoding. In other examples, where it may be desirable to encode the partition prediction error data and the partition prediction error data is associated with inter-prediction or the like, coding partitions generator module 107 may determine coding partitions of the prediction partitions. In some examples, coding partitions generator module 107 may not be needed as the partition may be encoded without coding partitioning (e.g., as shown via the bypass path available via switches 107a and 107b). With or without coding partitioning, the partition prediction error data (which may subsequently be described as coding partitions in either event) may be transmitted to adaptive transform module 108 in the event the residuals or residual data require encoding. In some examples, prediction partitions generator module 105 and coding partitions generator module 107 may together be considered a partitioner subsystem of encoder 100. In various examples, coding partitions generator module 107 may operate on partition prediction error data, original pixel data, residual data, or wavelet data.

Coding partitions generator module 107 may generate potential coding partitionings (e.g., coding partitions) of, for example, partition prediction error data using bi-tree and/or k-d tree partitioning techniques or the like. In some examples, the potential coding partitions may be transformed using adaptive or fixed transforms with various block sizes via adaptive transform module 108 and a selected coding partitioning and selected transforms (e.g., adaptive or fixed) may be determined based at least in part on a rate distortion optimization or other basis. In some examples, the selected coding partitioning and/or the selected transform(s) may be determined based at least in part on a predetermined selection method based at least in part on coding partitions size or the like.

For example, adaptive transform module 108 may include a first portion or component for performing a parametric transform to allow locally optimal transform coding of small to medium size blocks and a second portion or component for performing globally stable, low overhead transform coding using a fixed transform, such as a discrete cosine transform (DCT) or a picture based transform from a variety of transforms, including parametric transforms, or any other configuration as is discussed further herein. In some examples, for locally optimal transform coding a Parametric Haar Transform (PHT) may be performed, as is discussed further herein. In some examples, transforms may be performed on 2D blocks of rectangular sizes between about 4×4 pixels and 64×64 pixels, with actual sizes depending on a number of factors such as whether the transformed data is luma or chroma, or inter or intra, or if the determined transform used is PHT or DCT or the like.

As shown, the resultant transform coefficients may be transmitted to adaptive quantize module 109. Adaptive quantize module 109 may quantize the resultant transform coefficients. Further, any data associated with a parametric transform, as needed, may be transmitted to either adaptive quantize module 109 (if quantization is desired) or adaptive entropy encoder module 110. Also as shown in FIG. 1, the quantized coefficients may be scanned and transmitted to adaptive entropy encoder module 110. Adaptive entropy encoder module 110 may entropy encode the quantized coefficients and include them in output bitstream 111. In some examples, adaptive transform module 108 and adaptive quantize module 109 may together be considered a transform encoder subsystem of encoder 100.

As also shown in FIG. 1, encoder 100 includes a local decode loop. The local decode loop may begin at adaptive inverse quantize module 112. Adaptive inverse quantize module 112 may be configured to perform the opposite operation(s) of adaptive quantize module 109 such that an inverse scan may be performed and quantized coefficients may be de-scaled to determine transform coefficients. Such an adaptive quantize operation may be lossy, for example. As shown, the transform coefficients may be transmitted to an adaptive inverse transform module 113. Adaptive inverse transform module 113 may perform the inverse transform as that performed by adaptive transform module 108, for example, to generate residuals or residual values or partition prediction error data (or original data or wavelet data, as discussed) associated with coding partitions. In some examples, adaptive inverse quantize module 112 and adaptive inverse transform module 113 may together be considered a transform decoder subsystem of encoder 100.

As shown, the partition prediction error data (or the like) may be transmitted to optional coding partitions assembler 114. Coding partitions assembler 114 may assemble coding partitions into decoded prediction partitions as needed (as shown, in some examples, coding partitions assembler 114 may be skipped via switches 114a and 114b such that decoded prediction partitions may have been generated at adaptive inverse transform module 113) to generate prediction partitions of prediction error data or decoded residual prediction partitions or the like.

As shown, the decoded residual prediction partitions may be added to predicted partitions (e.g., prediction pixel data) at adder 115 to generate reconstructed prediction partitions. The reconstructed prediction partitions may be transmitted to prediction partitions assembler 116. Prediction partitions assembler 116 may assemble the reconstructed prediction partitions to generate reconstructed tiles or super-fragments. In some examples, coding partitions assembler module 114 and prediction partitions assembler module 116 may together be considered an un-partitioner subsystem of encoder 100.

The reconstructed tiles or super-fragments may be transmitted to blockiness analyzer and deblock filtering module 117. Blockiness analyzer and deblock filtering module 117 may deblock and dither the reconstructed tiles or super-fragments (or prediction partitions of tiles or super-fragments). The generated deblock and dither filter parameters may be used for the current filter operation and/or coded in bitstream 111 for use by a decoder, for example. The output of blockiness analyzer and deblock filtering module 117 may be transmitted to a quality analyzer and quality restoration filtering module 118. Quality analyzer and quality restoration filtering module 118 may determine QR filtering parameters (e.g., for a QR decomposition) and use the determined parameters for filtering. The QR filtering parameters may also be coded in bitstream 111 for use by a decoder. As shown, the output of quality analyzer and quality restoration filtering module 118 may be transmitted to decoded picture buffer 119. In some examples, the output of quality analyzer and quality restoration filtering module 118 may be a final reconstructed frame that may be used for prediction for coding other frames (e.g., the final reconstructed frame may be a reference frame or the like). In some examples, blockiness analyzer and deblock filtering module 117 and quality analyzer and quality restoration filtering module 118 may together be considered a filtering subsystem of encoder 100.

In encoder 100, prediction operations may include inter- and/or intra-prediction. As shown in FIG. 1, inter-prediction may be performed by one or more modules including morphing analyzer and generation module 120, synthesizing analyzer and generation module 121, and characteristics and motion filtering predictor module 123. Morphing analyzer and generation module 120 may analyze a current picture to determine parameters for changes in gain, changes in dominant motion, changes in registration, and changes in blur with respect to a reference frame or frames with which it is to be coded. The determined morphing parameters may be quantized/de-quantized and used (e.g., by morphing analyzer and generation module 120) to generate morphed reference frames that that may be used by motion estimator module 122 for computing motion vectors for efficient motion (and characteristics) compensated prediction of a current frame. Synthesizing analyzer and generation module 121 may generate super resolution (SR) pictures and projected interpolation (PI) pictures or the like for determining motion vectors for efficient motion compensated prediction in these frames.

Motion estimator module 122 may generate motion vector data based at least in part on morphed reference frame(s) and/or super resolution (SR) pictures and projected interpolation (PI) pictures along with the current frame. In some examples, motion estimator module 122 may be considered an inter-prediction module. For example, the motion vector data may be used for inter-prediction. If inter-prediction is applied, characteristics and motion filtering predictor module 123 may apply motion compensation as part of the local decode loop as discussed.

Intra-prediction may be performed by intra-directional prediction analyzer and prediction generation module 124. Intra-directional prediction analyzer and prediction generation module 124 may be configured to perform spatial directional prediction and may use decoded neighboring partitions. In some examples, both the determination of direction and generation of prediction may be performed by intra-directional prediction analyzer and prediction generation module 124. In some examples, intra-directional prediction analyzer and prediction generation module 124 may be considered an intra-prediction module.

As shown in FIG. 1, prediction modes and reference types analyzer module 125 may allow for selection of prediction modes from among, "skip", "auto", "inter", "split", "multi", and "intra", for each prediction partition of a tile (or super-fragment), all of which may apply to P- and F/B-pictures. In addition to prediction modes, it also allows for selection of reference types that can be different depending on "inter" or "multi" mode, as well as for P- and F/B-pictures. The prediction signal at the output of prediction modes and reference types analyzer module 125 may be filtered by prediction analyzer and prediction fusion filtering module 126. Prediction analyzer and prediction fusion filtering module 126 may determine parameters (e.g., filtering coefficients, frequency, overhead) to use for filtering and may perform the filtering. In some examples, filtering the prediction signal may fuse different types of signals representing different modes (e.g., intra, inter, multi, split, skip, and auto). In some examples, intra-prediction signals may be different than all other types of inter-prediction signal(s) such that proper filtering may greatly enhance coding efficiency. In some examples, the filtering parameters may be encoded in bitstream 111 for use by a decoder. The filtered prediction signal may provide the second input (e.g., prediction partition(s)) to differencer 106, as discussed above, that may determine the prediction difference signal (e.g., partition prediction error) for coding discussed earlier. Further, the same filtered prediction signal may provide the second input to adder 115, also as discussed above. As discussed, output bitstream 111 may provide an efficiently encoded bitstream for use by a decoder for the presentment of video.

In operation, some components of encoder 100 may operate as an encoder prediction subsystem. For example, such an encoder prediction subsystem of encoder 100 may include decoded picture buffer 119, morphing analyzer and generation module 120, synthesizing analyzer and generation module 121, motion estimator module 122, and/or characteristics and motion compensated precision adaptive filtering predictor module 123.

As will be discussed in greater detail below, in some implementations, such an encoder prediction subsystem of encoder 100 may incorporate a number of components and the combined predictions generated by these components in an efficient video coding algorithm. For example, proposed implementation of the NGV coder may include one or more of the following features: 1. Gain Compensation (e.g., explicit compensation for changes in gain/brightness in a scene); 2. Blur Compensation: e.g., explicit compensation for changes in blur/sharpness in a scene; 3. Dominant/Global Motion Compensation (e.g., explicit compensation for dominant motion in a scene); 4. Registration Compensation (e.g., explicit compensation for registration mismatches in a scene); 5. Super Resolution (e.g., explicit model for changes in resolution precision in a scene); 6. Projection (e.g., explicit model for changes in motion trajectory in a scene); the like; and/or combinations thereof.

For example, in such an encoder prediction subsystem of encoder 100, the output of quality analyzer and quality restoration filtering may be transmitted to decoded picture buffer 119. In some examples, the output of quality analyzer and quality restoration filtering may be a final reconstructed frame that may be used for prediction for coding other frames (e.g., the final reconstructed frame may be a reference frame or the like). In encoder 100, prediction operations may include inter- and/or intra-prediction. As shown, inter-prediction may be performed by one or more modules including morphing analyzer and generation module 120, synthesizing analyzer and generation module 121, and/or characteristics and motion compensated precision adaptive filtering predictor module 123.

As will be described in greater detail below, morphing analyzer and generation module 120 may analyze a current picture to determine parameters for changes in gain, changes in dominant motion, changes in registration, and changes in blur with respect to a reference frame or frames with which it is to be coded. The determined morphing parameters may be quantized/de-quantized and used (e.g., by morphing analyzer and generation module 120) to generate morphed reference frames. Such generated morphed reference frames may be stored in a buffer and may be used by motion estimator module 122 for computing motion vectors for efficient motion (and characteristics) compensated prediction of a current frame.

Similarly, synthesizing analyzer and generation module 121 may generate super resolution (SR) pictures and projected interpolation (PI) pictures or the like for determining motion vectors for efficient motion compensated prediction in these frames. Such generated synthesized reference frames may be stored in a buffer and may be used by motion estimator module 122 for computing motion vectors for efficient motion (and characteristics) compensated prediction of a current frame.

Accordingly, in such an encoder prediction subsystem of encoder 100, motion estimator module 122 may generate motion vector data based at least in part on morphed reference frame(s) and/or super resolution (SR) pictures and projected interpolation (PI) pictures along with the current frame. In some examples, motion estimator module 122 may be considered an inter-prediction module. For example, the motion vector data may be used for inter-prediction. If inter-prediction is applied, characteristics and motion filtering predictor module 123 may apply motion compensation as part of the local decode loop as discussed.

In operation, the proposed implementation of the NGV coder (e.g., encoder 100 and/or decoder 200) may use one or more of the above components besides the usual local motion compensation with respect to decoded past and/or future, picture/slices. As such the implementation does not mandate a specific solution for instance for Gain compensation, or for any other characteristics compensated reference frame generation.

Figure 2:
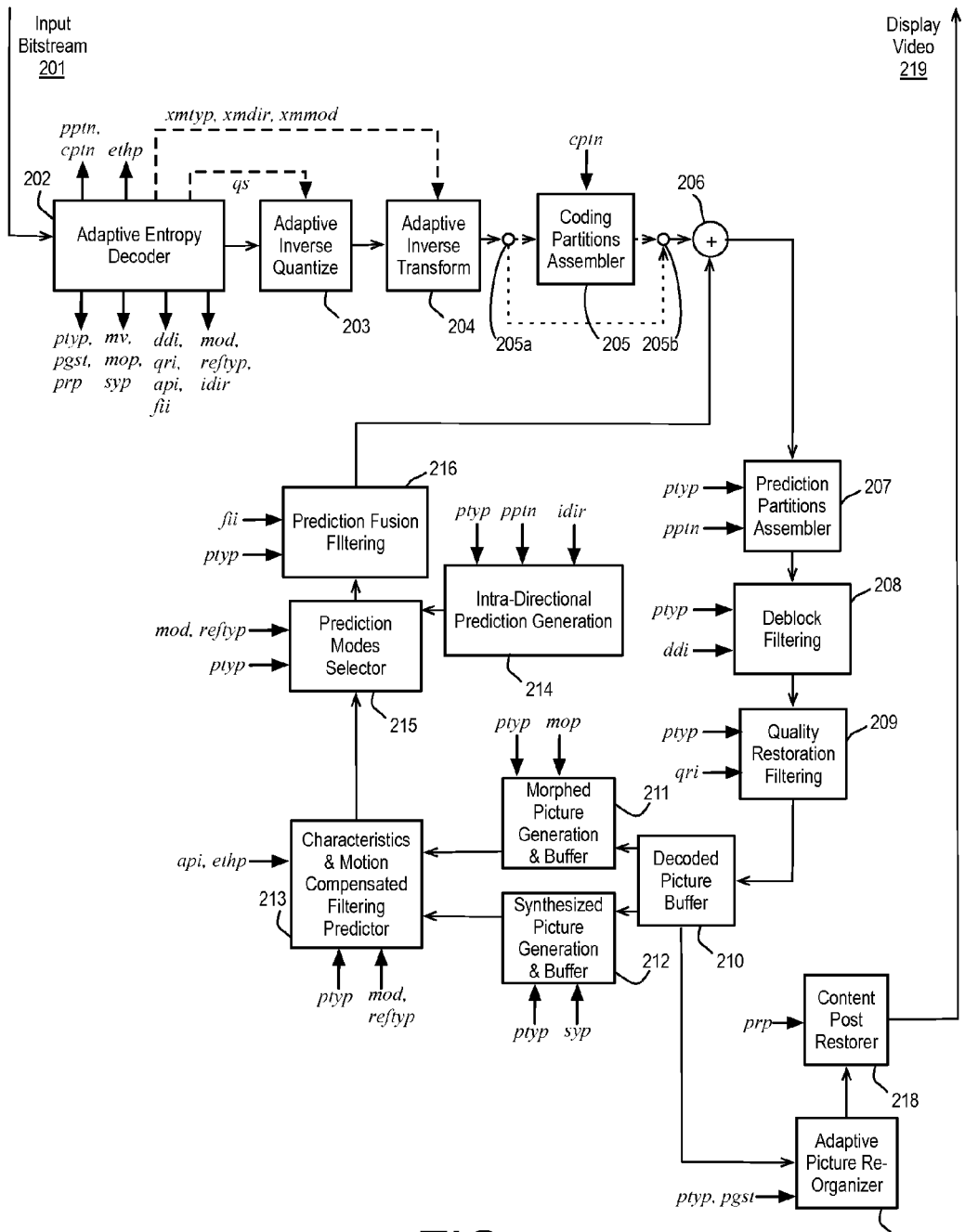
FIG. 2 is an illustrative diagram of an example next generation video decoder.

FIG. 2 is an illustrative diagram of an example next generation video decoder 200, arranged in accordance with at least some implementations of the present disclosure. As shown, decoder 200 may receive an input bitstream 201. In some examples, input bitstream 201 may be encoded via encoder 100 and/or via the encoding techniques discussed herein. As shown, input bitstream 201 may be received by an adaptive entropy decoder module 202. Adaptive entropy decoder module 202 may decode the various types of encoded data (e.g., overhead, motion vectors, transform coefficients, etc.). In some examples, adaptive entropy decoder 202 may use a variable length decoding technique. In some examples, adaptive entropy decoder 202 may perform the inverse operation(s) of adaptive entropy encoder module 110 discussed above.

The decoded data may be transmitted to adaptive inverse quantize module 203. Adaptive inverse quantize module 203 may be configured to inverse scan and de-scale quantized coefficients to determine transform coefficients. Such an adaptive quantize operation may be lossy, for example. In some examples, adaptive inverse quantize module 203 may be configured to perform the opposite operation of adaptive quantize module 109 (e.g., substantially the same operations as adaptive inverse quantize module 112). As shown, the transform coefficients (and, in some examples, transform data for use in a parametric transform) may be transmitted to an adaptive inverse transform module 204. Adaptive inverse transform module 204 may perform an inverse transform on the transform coefficients to generate residuals or residual values or partition prediction error data (or original data or wavelet data) associated with coding partitions. In some examples, adaptive inverse transform module 204 may be configured to perform the opposite operation of adaptive transform module 108 (e.g., substantially the same operations as adaptive inverse transform module 113). In some examples, adaptive inverse transform module 204 may perform an inverse transform based at least in part on other previously decoded data, such as, for example, decoded neighboring partitions. In some examples, adaptive inverse quantize module 203 and adaptive inverse transform module 204 may together be considered a transform decoder subsystem of decoder 200.

As shown, the residuals or residual values or partition prediction error data may be transmitted to coding partitions assembler 205. Coding partitions assembler 205 may assemble coding partitions into decoded prediction partitions as needed (as shown, in some examples, coding partitions assembler 205 may be skipped via switches 205a and 205b such that decoded prediction partitions may have been generated at adaptive inverse transform module 204). The decoded prediction partitions of prediction error data (e.g., prediction partition residuals) may be added to predicted partitions (e.g., prediction pixel data) at adder 206 to generate reconstructed prediction partitions. The reconstructed prediction partitions may be transmitted to prediction partitions assembler 207. Prediction partitions assembler 207 may assemble the reconstructed prediction partitions to generate reconstructed tiles or super-fragments. In some examples, coding partitions assembler module 205 and prediction partitions assembler module 207 may together be considered an un-partitioner subsystem of decoder 200.

The reconstructed tiles or super-fragments may be transmitted to deblock filtering module 208. Deblock filtering module 208 may deblock and dither the reconstructed tiles or super-fragments (or prediction partitions of tiles or super-fragments). The generated deblock and dither filter parameters may be determined from input bitstream 201, for example. The output of deblock filtering module 208 may be transmitted to a quality restoration filtering module 209. Quality restoration filtering module 209 may apply quality filtering based at least in part on QR parameters, which may be determined from input bitstream 201, for example. As shown in FIG. 2, the output of quality restoration filtering module 209 may be transmitted to decoded picture buffer 210. In some examples, the output of quality restoration filtering module 209 may be a final reconstructed frame that may be used for prediction for coding other frames (e.g., the final reconstructed frame may be a reference frame or the like). In some examples, deblock filtering module 208 and quality restoration filtering module 209 may together be considered a filtering subsystem of decoder 200.

As discussed, compensation due to prediction operations may include inter- and/or intra-prediction compensation. As shown, inter-prediction compensation may be performed by one or more modules including morphing generation module 211, synthesizing generation module 212, and characteristics and motion compensated filtering predictor module 213. Morphing generation module 211 may use de-quantized morphing parameters (e.g., determined from input bitstream 201) to generate morphed reference frames. Synthesizing generation module 212 may generate super resolution (SR) pictures and projected interpolation (PI) pictures or the like based at least in part on parameters determined from input bitstream 201. If inter-prediction is applied, characteristics and motion compensated filtering predictor module 213 may apply motion compensation based at least in part on the received frames and motion vector data or the like in input bitstream 201.

Intra-prediction compensation may be performed by intra-directional prediction generation module 214. Intra-directional prediction generation module 214 may be configured to perform spatial directional prediction and may use decoded neighboring partitions according to intra-prediction data in input bitstream 201.

As shown in FIG. 2, prediction modes selector module 215 may determine a prediction mode selection from among, "skip", "auto", "inter", "multi", and "intra", for each prediction partition of a tile, all of which may apply to P- and F/B-pictures, based at least in part on mode selection data in input bitstream 201. In addition to prediction modes, it also allows for selection of reference types that can be different depending on "inter" or "multi" mode, as well as for P- and F/B-pictures. The prediction signal at the output of prediction modes selector module 215 may be filtered by prediction fusion filtering module 216. Prediction fusion filtering module 216 may perform filtering based at least in part on parameters (e.g., filtering coefficients, frequency, overhead) determined via input bitstream 201. In some examples, filtering the prediction signal may fuse different types of signals representing different modes (e.g., intra, inter, multi, skip, and auto). In some examples, intra-prediction signals may be different than all other types of inter-prediction signal(s) such that proper filtering may greatly enhance coding efficiency. The filtered prediction signal may provide the second input (e.g., prediction partition(s)) to differencer 206, as discussed above.

As discussed, the output of quality restoration filtering module 209 may be a final reconstructed frame. Final reconstructed frames may be transmitted to an adaptive picture re-organizer 217, which may re-order or re-organize frames as needed based at least in part on ordering parameters in input bitstream 201. Re-ordered frames may be transmitted to content post-restorer module 218. Content post-restorer module 218 may be an optional module configured to perform further improvement of perceptual quality of the decoded video. The improvement processing may be performed in response to quality improvement parameters in input bitstream 201 or it may be performed as standalone operation. In some examples, content post-restorer module 218 may apply parameters to improve quality such as, for example, an estimation of film grain noise or residual blockiness reduction (e.g., even after the deblocking operations discussed with respect to deblock filtering module 208). As shown, decoder 200 may provide display video 219, which may be configured for display via a display device (not shown).

In operation, some components of decoder 200 may operate as a decoder prediction subsystem. For example, such a decoder prediction subsystem of decoder 200 may include decoded picture buffer 210, morphing analyzer and generation module 211, synthesizing analyzer and generation module 212, and/or characteristics and motion compensated precision adaptive filtering predictor module 213.

As will be discussed in greater detail below, in some implementations, such a decoder prediction subsystem of decoder 200 may incorporate a number of components and the combined predictions generated by these components in an efficient video coding algorithm. For example, proposed implementation of the NGV coder may include one or more of the following features: 1. Gain Compensation (e.g., explicit compensation for changes in gain/brightness in a scene); 2. Blur Compensation: e.g., explicit compensation for changes in blur/sharpness in a scene; 3. Dominant/Global Motion Compensation (e.g., explicit compensation for dominant motion in a scene); 4. Registration Compensation (e.g., explicit compensation for registration mismatches in a scene); 5. Super Resolution (e.g., explicit model for changes in resolution precision in a scene); 6. Projection (e.g., explicit model for changes in motion trajectory in a scene); the like, and/or combinations thereof.

For example, in such a decoder prediction subsystem of decoder 200, the output of quality restoration filtering module may be transmitted to decoded picture buffer 210. In some examples, the output of quality restoration filtering module may be a final reconstructed frame that may be used for prediction for coding other frames (e.g., the final reconstructed frame may be a reference frame or the like). As discussed, compensation due to prediction operations may include inter- and/or intra-prediction compensation. As shown, inter-prediction compensation may be performed by one or more modules including morphing analyzer and generation module 211, synthesizing analyzer and generation module 212, and/or characteristics and motion compensated precision adaptive filtering predictor module 213.

As will be described in greater detail below, morphing analyzer and generation module 211 may use de-quantized morphing parameters (e.g., determined from input bitstream) to generate morphed reference frames. Such generated morphed reference frames may be stored in a buffer and may be used by characteristics and motion compensated precision adaptive filtering predictor module 213.

Similarly, synthesizing analyzer and generation module 212 may be configured to generate one or more types of synthesized prediction reference pictures such as super resolution (SR) pictures and projected interpolation (PI)

pictures or the like based at least in part on parameters determined from input bitstream 201. Such generated synthesized reference frames may be stored in a buffer and may be used by motion compensated filtering predictor module 213.

Accordingly, in such a decoder prediction subsystem of decoder 200, in cases where inter-prediction is applied, characteristics and motion compensated filtering predictor module 213 may apply motion compensation based at least in part on morphed reference frame(s) and/or super resolution (SR) pictures and projected interpolation (PI) pictures along with the current frame.

In operation, the proposed implementation of the NGV coder (e.g., encoder 100 and/or decoder 200) may use one or more of the above components besides the usual local motion compensation with respect to decoded past and/or future, picture/slices. As such the implementation does not mandate a specific solution for instance for Gain compensation, or for any other characteristics compensated reference frame generation.

While FIGS. 1 and 2 illustrate particular encoding and decoding modules, various other coding modules or components not depicted may also be utilized in accordance with the present disclosure. Further, the present disclosure is not limited to the particular components illustrated in FIGS. 1 and 2 and/or to the manner in which the various components are arranged. Various components of the systems described herein may be implemented in software, firmware, and/or hardware and/or any combination thereof. For example, various components of encoder 100 and/or decoder 200 may be provided, at least in part, by hardware of a computing System-on-a-Chip (SoC) such as may be found in a computing system such as, for example, a mobile phone.

Further, it may be recognized that encoder 100 may be associated with and/or provided by a content provider system including, for example, a video content server system, and that output bitstream 111 may be transmitted or conveyed to decoders such as, for example, decoder 200 by various communications components and/or systems such as transceivers, antennae, network systems, and the like not depicted in FIGS. 1 and 2. It may also be recognized that decoder 200 may be associated with a client system such as a computing device (e.g., a desktop computer, laptop computer, tablet computer, convertible laptop, mobile phone, or the like) that is remote to encoder 100 and that receives input bitstream 201 via various communications components and/or systems such as transceivers, antennae, network systems, and the like not depicted in FIGS. 1 and 2. Therefore, in various implementations, encoder 100 and decoder subsystem 200 may be implemented either together or independent of one another.

Figure 3A:
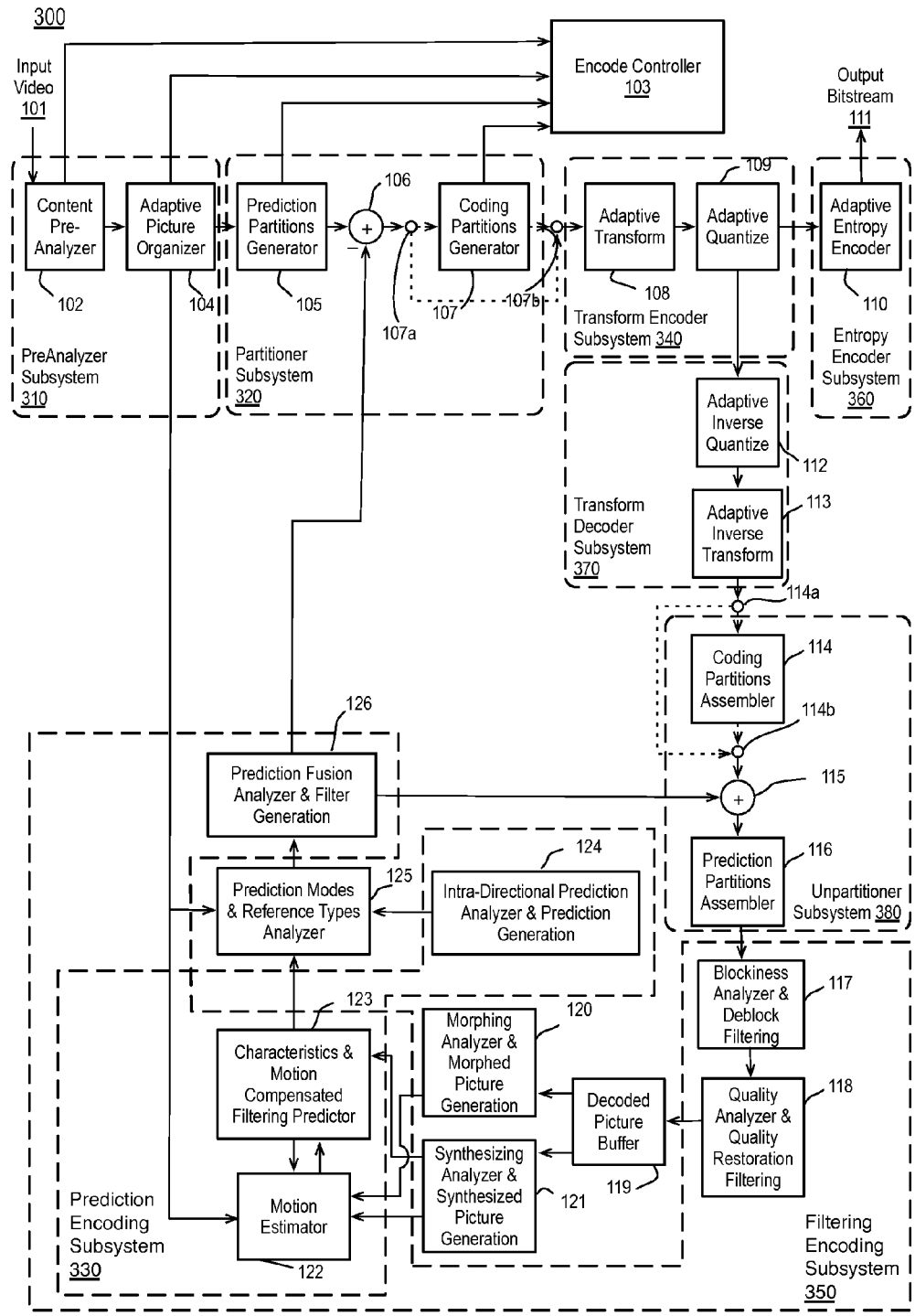
FIG. 3(a) is an illustrative diagram of example next generation video encoder subsystems.
Figure 3B:
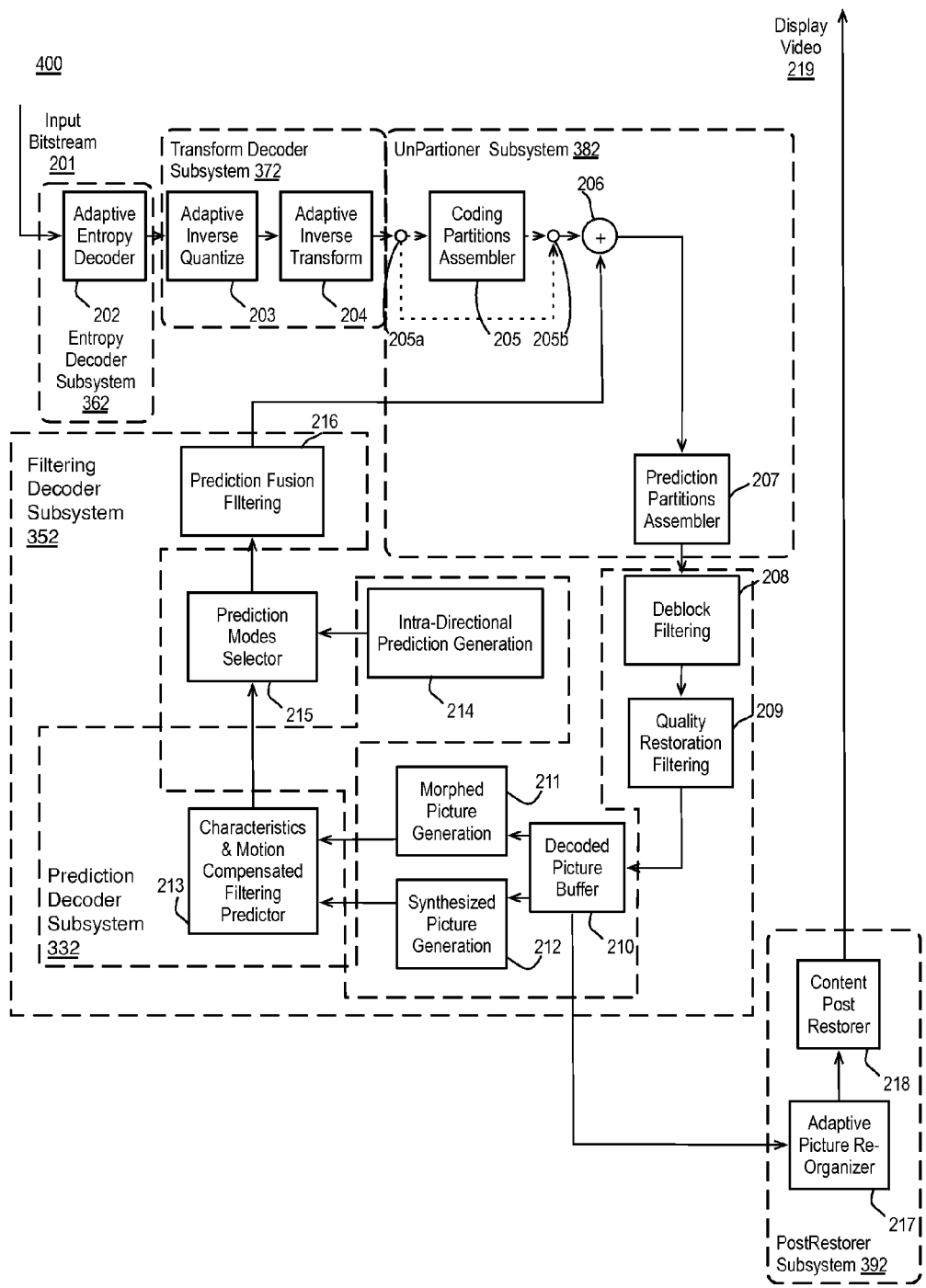
FIG. 3(b) is an illustrative diagram of example next generation video decoder subsystems.

FIG. 3(*a*) is an illustrative diagram of example subsystems associated with next generation video encoder 100, arranged in accordance with at least some implementations of the present disclosure. As shown, encoder 100 may include a pre-analyzer subsystem 310, a partitioner subsystem 320, a prediction encoder subsystem 330, a transform encoder subsystem 340, an entropy encoder subsystem 360, a transform decoder subsystem 370, an unpartitioner subsystem 380, and/or a filtering encoding subsystem 350.

While subsystems 310 through 380 are illustrated as being associated with specific example functional modules of encoder 100 in FIG. 3(*a*), other implementations of encoder 100 herein may include a different distribution of the functional modules of encoder 100 among subsystems 310 through 380. The present disclosure is not limited in this regard and, in various examples, implementation of the example subsystems 310 through 380 herein may include the undertaking of only a subset of the specific example functional modules of encoder 100 shown, additional functional modules, and/or in a different arrangement than illustrated.

FIG. 3(*b*) is an illustrative diagram of example subsystems associated with next generation video decoder 200, arranged in accordance with at least some implementations of the present disclosure. As shown, decoder 200 may include an entropy decoder subsystem 362, a transform decoder subsystem 372, a unpartitioner subsystem 382, a filtering decoder subsystem 352, a prediction decoder subsystem 332, and/or a post restorer subsystem 392.

While subsystems 322 through 392 are illustrated as being associated with specific example functional modules of decoder 200 in FIG. 3(*b*), other implementations of encoder 100 herein may include a different distribution of the functional modules of decoder 200 among subsystems 322 through 392. The present disclosure is not limited in this regard and, in various examples, implementation of the example subsystems 322 through 392 herein may include the undertaking of only a subset of the specific example functional modules of decoder 200 shown, additional functional modules, and/or in a different arrangement than illustrated.

Figure 4:
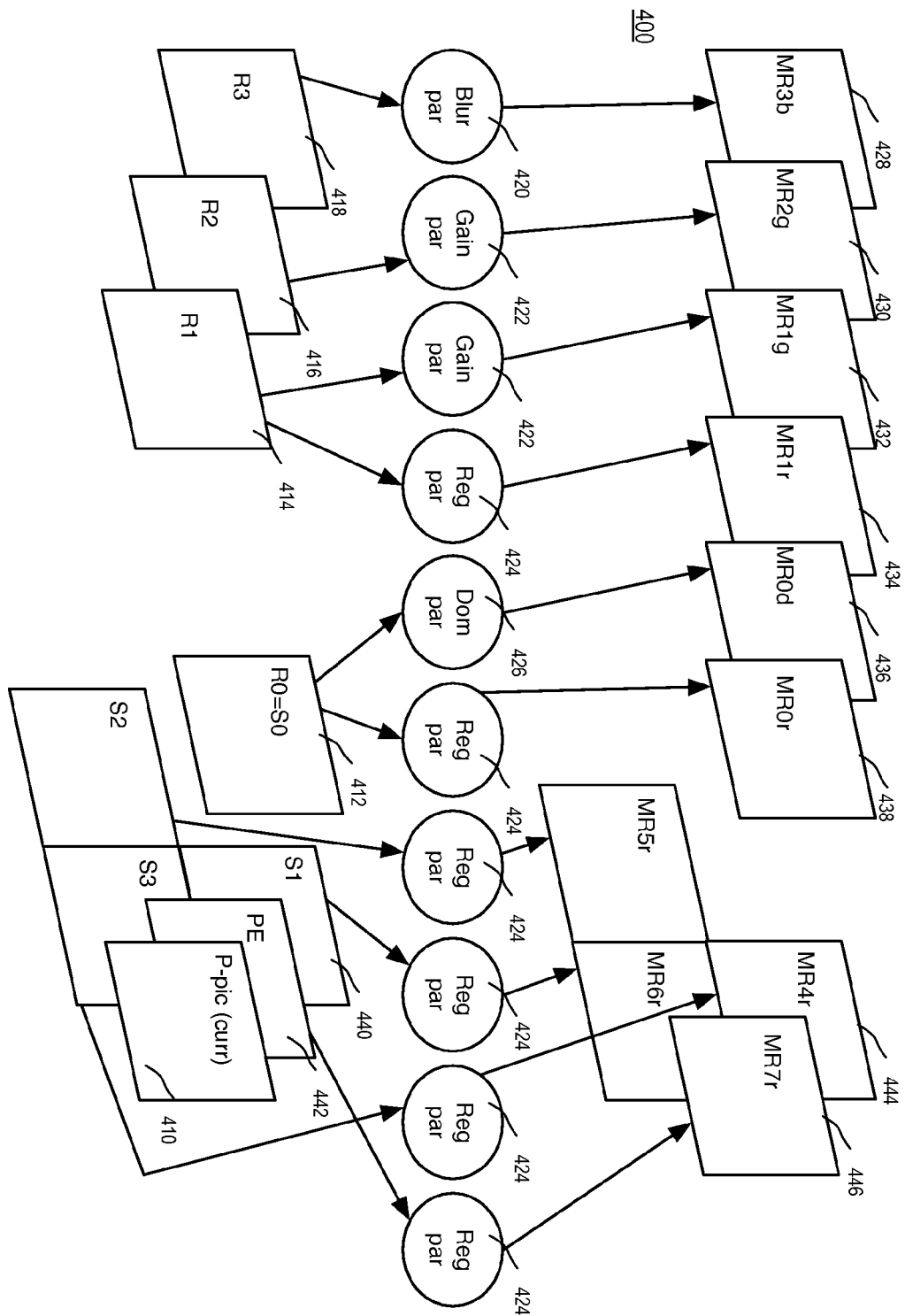
FIG. 4 is an illustrative diagram of modified prediction reference pictures.

FIG. 4 is an illustrative diagram of modified prediction reference pictures 400, arranged in accordance with at least some implementations of the present disclosure. As shown, the output of quality analyzer and quality restoration filtering may be a final reconstructed frame that may be used for prediction for coding other frames (e.g., the final reconstructed frame may be a reference frame or the like).

The proposed implementation of the NGV coder (e.g., encoder 100 and/or decoder 200) may implement P-picture coding using a combination of Morphed Prediction References 428 through 438 (MR0 through 3) and/or Synthesized Prediction References 412 and 440 through 446 (S0 through S3, MR4 through 7). NGV coding involves use of 3 picture types referred to as I-pictures, P-pictures, and F/B-pictures. In the illustrated example, the current picture to be coded (a P-picture) is shown at time t=4. During coding, the proposed implementation of the NGV coder (e.g., encoder 100 and/or decoder 200) may and use one or more of 4 previously decoded references R0 412, R1 414, R2 416, and R3 418. Unlike other solutions that may simply use these references directly for prediction, the proposed implementation of the NGV coder (e.g., encoder 100 and/or decoder 200) may generate modified (morphed or synthesized) references from such previously decoded references and then use motion compensated coding based at least in part on such generated modified (morphed or synthesized) references.

As will be described in greater detail below, in some examples, the proposed implementation of the NGV coder (e.g., encoder 100 and/or decoder 200) may incorporate a number of components and the combined predictions generated by these components in an efficient video coding algorithm. For example, proposed implementation of the NGV coder may include one or more of the following features: 1. Gain Compensation (e.g., explicit compensation for changes in gain/brightness in a scene); 2. Blur Compensation: e.g., explicit compensation for changes in blur/sharpness in a scene; 3. Dominant/Global Motion Compensation (e.g., explicit compensation for dominant motion in a scene); 4. Registration Compensation (e.g., explicit compensation for registration mismatches in a scene); 5. Super Resolution (e.g., explicit model for changes in resolution precision in a scene); 6. Projection (e.g., explicit model for changes in motion trajectory in a scene); the like, and/or combinations thereof.

In the illustrated example, if inter-prediction is applied, a characteristics and motion filtering predictor module may apply motion compensation to a current picture 410 (e.g., labeled in the figure as P-pic (carr)) as part of the local decode loop. In some instances, such motion compensation may be based at least in part on future frames (not shown) and/or previous frame R0 412 (e.g., labeled in the figure as R0), previous frame R1 414 (e.g., labeled in the figure as R1), previous frame R2 416 (e.g., labeled in the figure as R2), and/or previous frame R3 418 (e.g., labeled in the figure as R3).

For example, in some implementations, prediction operations may include inter- and/or intra-prediction. Inter-prediction may be performed by one or more modules including a morphing analyzer and generation module and/or a synthesizing analyzer and generation module. Such a morphing analyzer and generation module may analyze a current picture to determine parameters for changes in blur 420 (e.g., labeled in the figure as Blur par), changes in gain 422 (e.g., labeled in the figure as Gain par), changes in registration 424 (e.g., labeled in the figure as Reg par), and changes in dominant motion 426 (e.g., labeled in the figure as Dom par), or the like with respect to a reference frame or frames with which it is to be coded.

The determined morphing parameters 420, 422, 424, and/or 426 may be used to generate morphed reference frames. Such generated morphed reference frames may be stored and may be used for computing motion vectors for efficient motion (and characteristics) compensated prediction of a current frame. In the illustrated example, determined morphing parameters 420, 422, 424, and/or 426 may be used to generate morphed reference frames, such as blur compensated morphed reference frame 428 (e.g., labeled in the figure as MR3*b*), gain compensated morphed reference frame 430 (e.g., labeled in the figure as MR2*g*), gain compensated morphed reference frame 432 (e.g., labeled in the figure as MR1*g*), registration compensated morphed reference frame 434 (e.g., labeled in the figure as MR1*r*), dominant motion compensated morphed reference frame 436 (e.g., labeled in the figure as MR0*d*), and/or registration compensated morphed reference frame 438 (e.g., labeled in the figure as MR0*r*), the like or combinations thereof, for example.

Similarly, a synthesizing analyzer and generation module may generate super resolution (SR) pictures 440 (e.g., labeled in the figure as S0 (which is equal to previous frame R0 412), 51, S2, S3) and projected interpolation (PI) pictures 442 (e.g., labeled in the figure as PE) or the like for determining motion vectors for efficient motion compensated prediction in these frames. Such generated synthesized reference frames may be stored and may be used for computing motion vectors for efficient motion (and characteristics) compensated prediction of a current frame.

Additionally or alternatively, the determined morphing parameters 420, 422, 424, and/or 426 may be used to morph the generate synthesis reference frames super resolution (SR) pictures 440 and/or projected interpolation (PI) pictures 442. For example, a synthesizing analyzer and generation module may generate morphed registration compensated super resolution (SR) pictures 444 (e.g., labeled in the figure as MR4*r*, MR5*r*, and MR6*r*) and/or morphed registration compensated projected interpolation (PI) pictures 446 (e.g., labeled in the figure as MR7*r*) or the like from the determined registration morphing parameter 424. Such generated morphed and synthesized reference frames may be stored and may be used for computing motion vectors for efficient motion (and characteristics) compensated prediction of a current frame.

In some implementations changes in a set of characteristics (such as gain, blur, dominant motion, registration, resolution precision, motion trajectory, the like, or combinations thereof, for example) may be explicitly computed. Such a set of characteristics may be computed in addition to local motion. In some cases previous and next pictures/slices may be utilized as appropriate; however, in other cases such a set of characteristics may do a better job of prediction from previous picture/slices. Further, since there can be error in any estimation procedure, (e.g., from multiple past or multiple past and future pictures/slices) a modified reference frame associated with the set of characteristics (such as gain, blur, dominant motion, registration, resolution precision, motion trajectory, the like, or combinations thereof, for example) may be selected that yields the best estimate. Thus, the proposed approach that utilizes modified reference frames associated with the set of characteristics (such as gain, blur, dominant motion, registration, resolution precision, motion trajectory, the like, or combinations thereof, for example) may explicitly compensate for differences in these characteristics. The proposed implementation may address the problem of how to improve the prediction signal, which in turn allows achieving high compression efficiency in video coding.

For instance, with ever increasing resolution of video to be compressed and expectation of high video quality, the corresponding bitrate/bandwidth required for coding using existing video coding standards such as H.264 or even evolving standards such as H.265/HEVC, is relatively high. The aforementioned standards use expanded forms of traditional approaches to implicitly address the insufficient compression/quality problem, but often the results are limited.

The proposed implementation improves video compression efficiency by improving interframe prediction, which in turn reduces interframe prediction difference (error signal) that needs to be coded. The less the amount of interframe prediction difference to be coded, the less the amount of bits required for coding, which effectively improves the compression efficiency as it now takes less bits to store or transmit the coded prediction difference signal. Instead of being limited to motion predictions only, the proposed NCV codec may be highly adaptive to changing characteristics (such as gain, blur, dominant motion, registration, resolution precision, motion trajectory, the like, or combinations thereof, for example) of the content by employing, in addition or in the alternative to motion compensation, approaches to explicitly compensate for changes in the characteristics of the content. Thus by explicitly addressing the root cause of the problem the NGV codec may address a key source of limitation of standards based codecs, thereby achieving higher compression efficiency.

This change in interframe prediction output may be achieved due to ability of the proposed NCV codec to compensate for a wide range of reasons for changes in the video content. Typical video scenes vary from frame to frame due to many local and global changes (referred to herein as characteristics). Besides local motion, there are many other characteristics that are not sufficiently addressed by current solutions that may be addressed by the proposed implementation.

The proposed implementation may explicitly compute changes in a set of characteristics (such as gain, blur, dominant motion, registration, resolution precision, motion trajectory, the like, or combinations thereof, for example) in addition to local motion, and thus may do a better job of prediction from previous picture/slices than only using local motion prediction from previous and next pictures/slices. Further, since there can be error in any estimation procedure, from multiple past or multiple past and future pictures/slices the NGV coder may choose the frame that yields the best by explicitly compensating for differences in various characteristics.

In particular, the proposed implementation of the NGV coder may include features: i. explicit compensation for changes in gain/brightness in a scene; ii. explicit compensation for changes in blur/sharpness in a scene; iii. explicit compensation for dominant motion in a scene; iv. explicit compensation for registration mismatches in a scene; v. explicit model for changes in resolution precision in a scene; and/or vi. explicit model for changes in motion trajectory in a scene.

Tables 1 and 2, shown below, illustrate one example of codebook entries. A full codebook of entries may provide a full or substantially full listing of all possible entries and coding thereof. In some examples, the codebook may take into account constraints as described above. In some examples, data associated with a codebook entry for prediction modes and/or reference types may be encoded in a bitstream for use at a decoder as discussed herein.

TABLE 1

Example Prediction References in P-pictures

| No. | Ref Types for P-picture for Inter-Prediction mode |
|---|---|
| 0. | MR0r (=past SR0) |
| 1. | MR1r |
| 2. | MR2r |
| 3. | MR2g |
| 4. | MR4r (past SR1) |
| 5. | MR5r (past SR2) |
| 6. | MR6r (past SR3) |
| 7. | MR0d |
| 8. | MR1g |
| 9. | MR3b |

TABLE 2

Example Prediction References in F-pictures

| No. | Ref Types for F-picture for Inter-Prediction mode |
|---|---|
| 0. | MR0r |
| 1. | MR7r (=Proj Interpol) |
| 2. | MR3r (=future SR0) |
| 3. | MR1r |
| 4. | MR4r (=Future SR1) |
| 5. | MR5r (=Future SR2) |
| 6. | MR6r (=Future SR3) |
| 7. | MR0d |
| 8. | MR3d |
| 9. | MR0g/MR3g |
| 10. | MR3b |

In operation, the proposed implementation of the NGV coder (e.g., encoder 100 and/or decoder 200) may operate so that prediction mode and/or reference type data may be defined using symbol-run coding or a codebook or the like. The prediction mode and/or reference type data may be transform encoded using content adaptive or discrete transform in various examples to generate transform coefficients. Also as discussed, data associated with partitions (e.g., the transform coefficients or quantized transform coefficients), overhead data (e.g., indicators as discussed herein for transform type, adaptive transform direction, and/or a transform mode), and/or data defining the partitions and so on may be encoded (e.g., via an entropy encoder) into a bitstream. The bitstream may be communicated to a decoder, which may use the encoded bitstream to decode video frames for display. On a local basis (such as block-by-block within a macroblock or a tile, or on a partition-by-partition within a tile or a prediction unit, or fragments within a superfragment or region) the best mode may be selected for instance based at least in part on Rate Distortion Optimization (RDO) or based at least in part on pre-analysis of video, and the identifier for the mode and needed references may be encoded within the bitstream for use by the decoder.

In operation, the proposed implementation of the NGV coder (e.g., encoder 100 and/or decoder 200) may use one or more of the above components besides the usual local motion compensation with respect to decoded past and/or future, picture/slices. As such the implementation does not mandate a specific solution for instance for Gain compensation, or for any other characteristics compensated reference frame generation.

Figure 5:
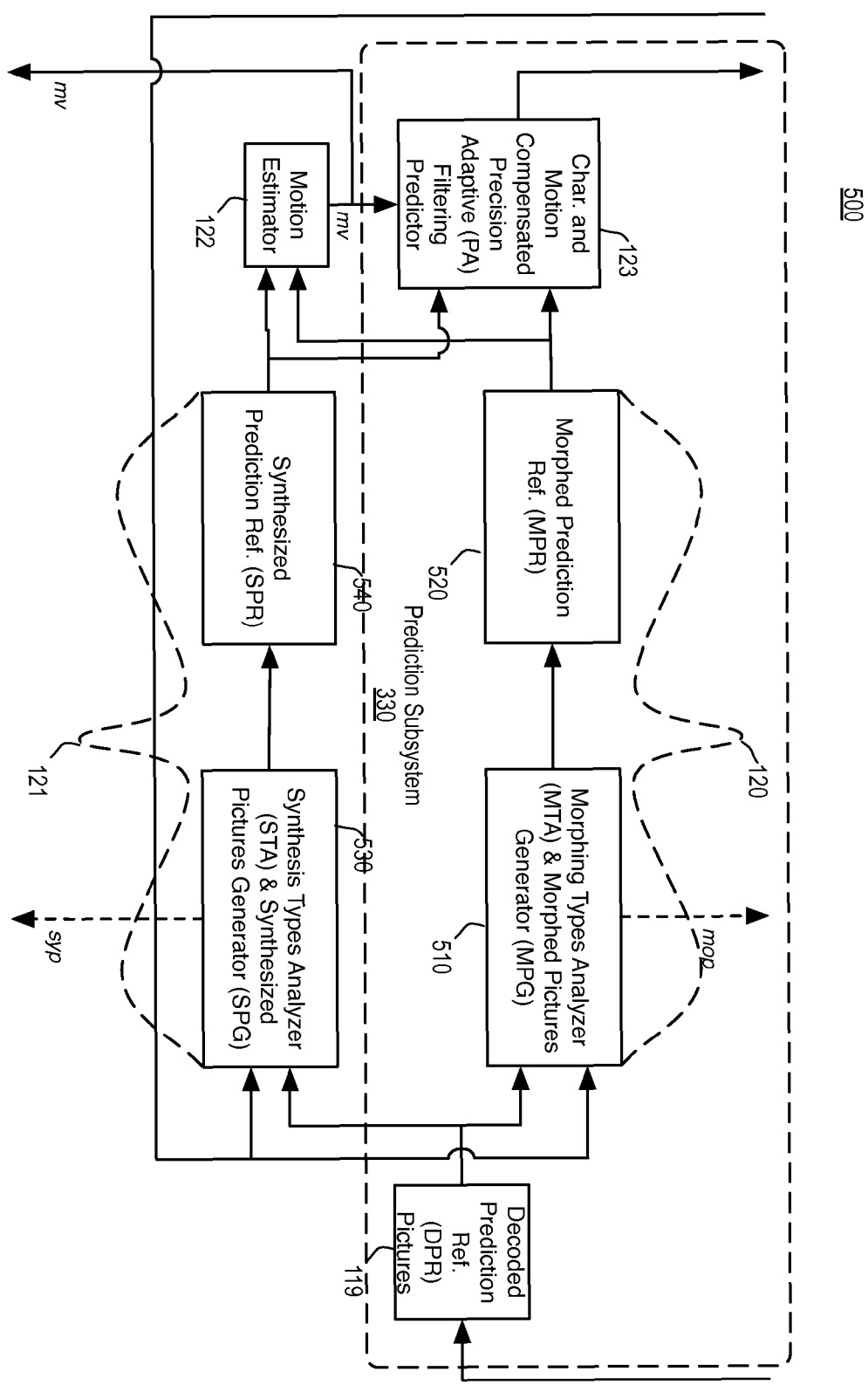
FIG. 5 is an illustrative diagram of an example encoder subsystem.

FIG. 5 is an illustrative diagram of an example encoder prediction subsystem 330 for performing characteristics and motion compensated prediction, arranged in accordance with at least some implementations of the present disclosure. As illustrated, encoder prediction subsystem 330 of encoder 500 may include decoded picture buffer 119, morphing analyzer and generation module 120, synthesizing analyzer and generation module 121, motion estimator module 122, and/or characteristics and motion compensated precision adaptive filtering predictor module 123.

As shown, the output of quality analyzer and quality restoration filtering may be transmitted to decoded picture buffer 119. In some examples, the output of quality analyzer and quality restoration filtering may be a final reconstructed frame that may be used for prediction for coding other frames (e.g., the final reconstructed frame may be a reference frame or the like). In encoder 500, prediction operations may include inter- and/or intra-prediction. As shown in FIG. 5, inter-prediction may be performed by one or more modules including morphing analyzer and generation module 120, synthesizing analyzer and generation module 121, and/or characteristics and motion compensated precision adaptive filtering predictor module 123.

Morphing analyzer and generation module 120 may include a morphing types analyzer (MTA) and a morphed pictures generator (MPG) 510 as well as a morphed prediction reference (MPR) buffer 520. Morphing types analyzer (MTA) and a morphed pictures generator (MPG) 510 may analyze a current picture to determine parameters for changes in gain, changes in dominant motion, changes in registration, and changes in blur with respect to a reference frame or frames with which it is to be coded. The determined morphing parameters may be quantized/de-quantized and used (e.g., by morphing analyzer and generation module 120) to generate morphed reference frames. Such generated morphed reference frames may be stored in morphed prediction reference (MPR) buffer 520 and may be used by motion estimator module 122 for computing motion vectors for efficient motion (and characteristics) compensated prediction of a current frame.

Synthesizing analyzer and generation module 121 may include a synthesis types analyzer (STA) and synthesized pictures generator 530 as well as a synthesized prediction reference (MPR) buffer 540. Synthesis types analyzer (STA)

and synthesized pictures generator 530 may generate super resolution (SR) pictures and projected interpolation (PI) pictures or the like for determining motion vectors for efficient motion compensated prediction in these frames. Such generated synthesized reference frames may be stored in synthesized prediction reference (MPR) buffer 540 and may be used by motion estimator module 122 for computing motion vectors for efficient motion (and characteristics) compensated prediction of a current frame.

Motion estimator module 122 may generate motion vector data based at least in part on morphed reference frame(s) and/or super resolution (SR) pictures and projected interpolation (PI) pictures along with the current frame. In some examples, motion estimator module 122 may be considered an inter-prediction module. For example, the motion vector data may be used for inter-prediction. If inter-prediction is applied, characteristics and motion filtering predictor module 123 may apply motion compensation as part of the local decode loop as discussed.

Figure 6:
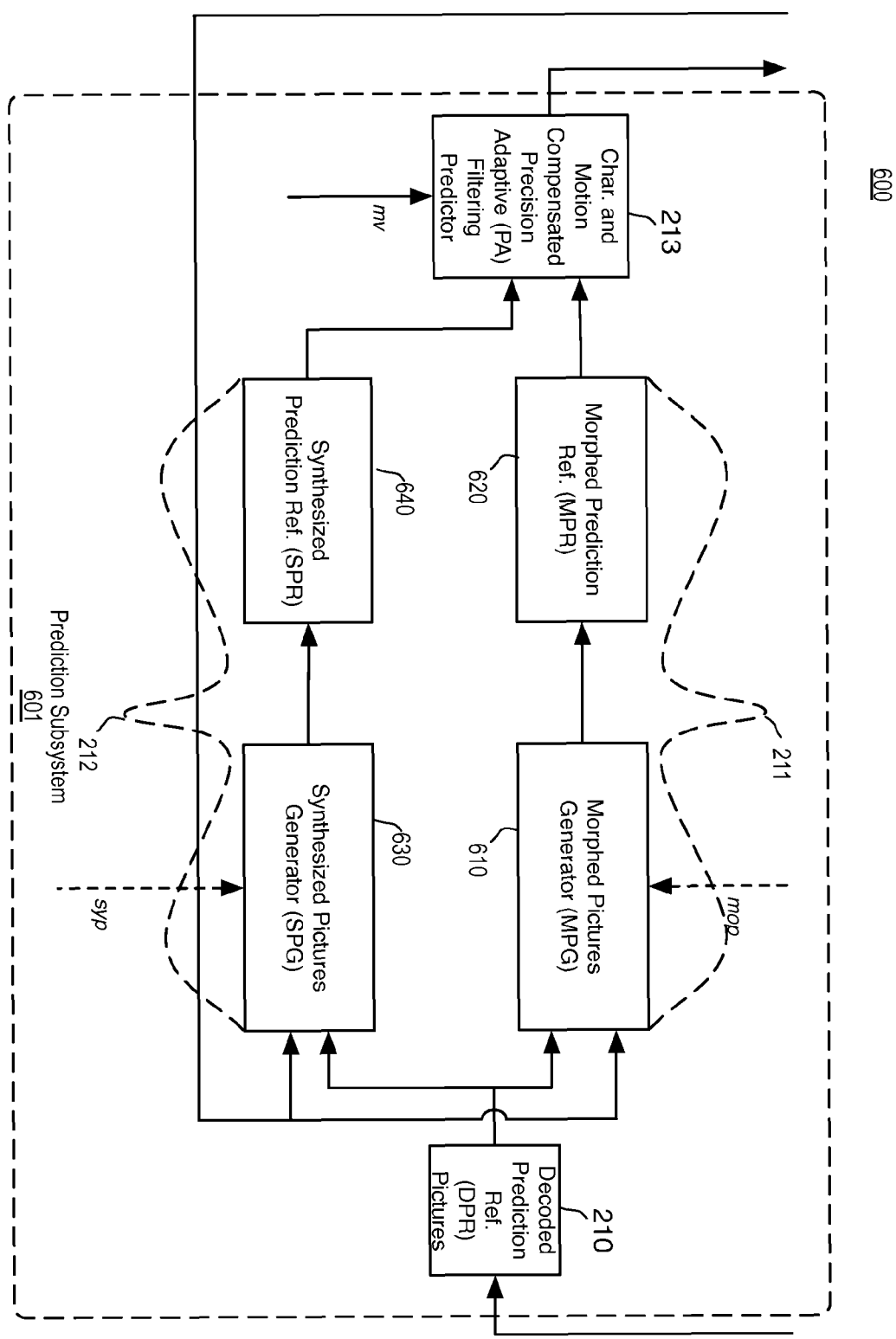
FIG. 6 is an illustrative diagram of an example encoder subsystem.

FIG. 6 is an illustrative diagram of an example decoder prediction subsystem 601 for performing characteristics and motion compensated prediction, arranged in accordance with at least some implementations of the present disclosure. As illustrated, decoder prediction subsystem 601 of decoder 600 may include decoded picture buffer 210, morphing analyzer and generation module 211, synthesizing analyzer and generation module 212, and/or characteristics and motion compensated precision adaptive filtering predictor module 213.

As shown, the output of quality restoration filtering module may be transmitted to decoded picture buffer 210. In some examples, the output of quality restoration filtering module may be a final reconstructed frame that may be used for prediction for coding other frames (e.g., the final reconstructed frame may be a reference frame or the like). As discussed, compensation due to prediction operations may include inter- and/or intra-prediction compensation. As shown, inter-prediction compensation may be performed by one or more modules including morphing analyzer and generation module 211, synthesizing analyzer and generation module 212, and/or characteristics and motion compensated precision adaptive filtering predictor module 213.

Morphing analyzer and generation module 211 may include a morphed pictures generator (MPG) 610 as well as a morphed prediction reference (MPR) buffer 620. Morphed pictures generator (MPG) 610 may use de-quantized morphing parameters (e.g., determined from input bitstream) to generate morphed reference frames. Such generated morphed reference frames may be stored in morphed prediction reference (MPR) buffer 620 and may be used by characteristics and motion compensated precision adaptive filtering predictor module 213.

Synthesizing analyzer and generation module 212 may include a synthesized pictures generator 630 as well as a synthesized prediction reference (MPR) buffer 640. Synthesized pictures generator 630 may be configured to generate one or more types of synthesized prediction reference pictures such as super resolution (SR) pictures and projected interpolation (PI) pictures or the like based at least in part on parameters determined from input bitstream 201. Such generated synthesized reference frames may be stored in synthesized prediction reference (MPR) buffer 540 and may be used by motion compensated filtering predictor module 213.

If inter-prediction is applied, characteristics and motion compensated filtering predictor module 213 may apply motion compensation based at least in part on morphed reference frame(s) and/or super resolution (SR) pictures and projected interpolation (PI) pictures along with the current frame.

Figure 7:
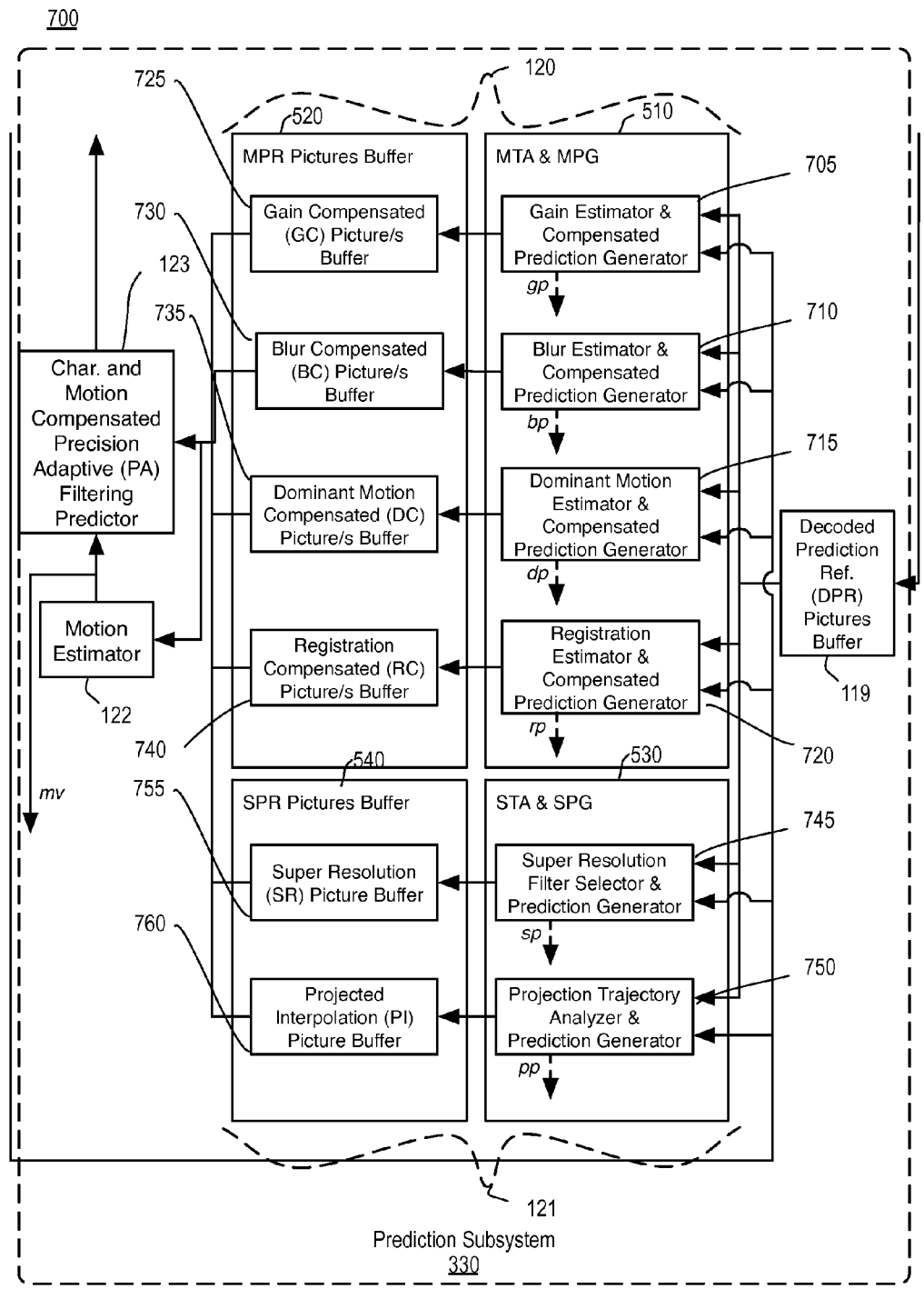
FIG. 7 is an illustrative diagram of an example encoder subsystem.

FIG. 7 is an illustrative diagram of another example encoder prediction subsystem 330 for performing characteristics and motion compensated prediction, arranged in accordance with at least some implementations of the present disclosure. As illustrated, encoder prediction subsystem 330 of encoder 700 may include decoded picture buffer 119, morphing analyzer and generation module 120, synthesizing analyzer and generation module 121, motion estimator module 122, and/or characteristics and motion compensated precision adaptive filtering predictor module 123.

As shown, the output of quality analyzer and quality restoration filtering may be transmitted to decoded picture buffer 119. In some examples, the output of quality analyzer and quality restoration filtering may be a final reconstructed frame that may be used for prediction for coding other frames (e.g., the final reconstructed frame may be a reference frame or the like). In encoder 700, prediction operations may include inter- and/or intra-prediction. As shown in FIG. 7, inter-prediction may be performed by one or more modules including morphing analyzer and generation module 120, synthesizing analyzer and generation module 121, and/or characteristics and motion compensated precision adaptive filtering predictor module 123.

Morphing analyzer and generation module 120 may include a morphing types analyzer (MTA) and a morphed pictures generator (MPG) 510 as well as a morphed prediction reference (MPR) buffer 520. Morphing types analyzer (MTA) and a morphed pictures generator (MPG) 510 may be configured to analyze and/or generate one or more types of modified prediction reference pictures.

For example, morphing types analyzer (MTA) and a morphed pictures generator (MPG) 510 may include Gain Estimator and Compensated Prediction Generator 705, Blur Estimator and Compensated Prediction Generator 710, Dominant Motion Estimator and Compensated Prediction Generator 715, Registration Estimator and Compensated Prediction Generator 720, the like and/or combinations thereof. Gain Estimator and Compensated Prediction Generator 705 may be configured to analyze and/or generate morphed prediction reference pictures that are adapted to address changes in gain. Blur Estimator and Compensated Prediction Generator 710 may be configured to analyze and/or generate morphed prediction reference pictures that are adapted to address changes in blur. Dominant Motion Estimator and Compensated Prediction Generator 715 may be configured to analyze and/or generate morphed prediction reference pictures that are adapted to address changes in dominant motion. Registration Estimator and Compensated Prediction Generator 720 may be configured to analyze and/or generate morphed prediction reference pictures that are adapted to address changes in registration.

Morphing types analyzer (MTA) and a morphed pictures generator (MPG) 510 may store such generated morphed reference frames in morphed prediction reference (MPR) buffer 520. For example, morphed prediction reference (MPR) buffer 520 may include Gain Compensated (GC) Picture/s Buffer 725, Blur Compensated (BC) Picture/s Buffer 730, Dominant Motion Compensated (DC) Picture/s Buffer 735, Registration Compensated (RC) Picture/s Buffer 740, the like and/or combinations thereof. Gain Compensated (GC) Picture/s Buffer 725 may be configured to store morphed reference frames that are adapted to address changes in gain. Blur Compensated (BC) Picture/s Buffer 730 may be configured to store morphed reference frames that are adapted to address changes in blur. Dominant Motion Compensated (DC) Picture/s Buffer 735 may be configured to store morphed reference frames that are adapted to address changes in dominant motion. Registration Compensated (RC) Picture/s Buffer 740 may be configured to store morphed reference frames that are adapted to address changes in registration.

Synthesizing analyzer and generation module 121 may include a synthesis types analyzer (STA) and synthesized pictures generator 530 as well as a synthesized prediction reference (MPR) buffer 540. Synthesis types analyzer (STA) and synthesized pictures generator 530 may be configured to analyze and/or generate one or more types of synthesized prediction reference pictures. For example, synthesis types analyzer (STA) and synthesized pictures generator 530 may include Super Resolution Filter Selector & Prediction Generator 745, Projection Trajectory Analyzer & Prediction Generator 750, the like and/or combinations thereof. Super Resolution Filter Selector & Prediction Generator 745 may be configured to analyze and/or generate a super resolution (SR) type of synthesized prediction reference pictures. Projection Trajectory Analyzer & Prediction Generator 750 may be configured to analyze and/or generate a projected interpolation (PI) type of synthesized prediction reference pictures.

Synthesis types analyzer (STA) and synthesized pictures generator 530 may generate super resolution (SR) pictures and projected interpolation (PI) pictures or the like for efficient motion compensated prediction in these frames. Such generated synthesized reference frames may be stored in synthesized prediction reference (MPR) buffer 540 and may be used by motion estimator module 122 for computing motion vectors for efficient motion (and characteristics) compensated prediction of a current frame.

For example, synthesized prediction reference (MPR) buffer 540 may include Super Resolution (SR) Picture Buffer 755, Projected Interpolation (PI) Picture Buffer 760, the like and/or combinations thereof. Super Resolution (SR) Picture Buffer 755 may be configured to store synthesized reference frames that are generated for super resolution (SR) pictures. Projected Interpolation (PI) Picture Buffer 760 may be configured to store synthesized reference frames that are generated for projected interpolation (PI) pictures.

Motion estimator module 122 may generate motion vector data based at least in part on morphed reference frame(s) and/or super resolution (SR) pictures and projected interpolation (PI) pictures along with the current frame. In some examples, motion estimator module 122 may be considered an inter-prediction module. For example, the motion vector data may be used for inter-prediction. If inter-prediction is applied, characteristics and motion filtering predictor module 123 may apply motion compensation as part of the local decode loop as discussed.

Figure 8:
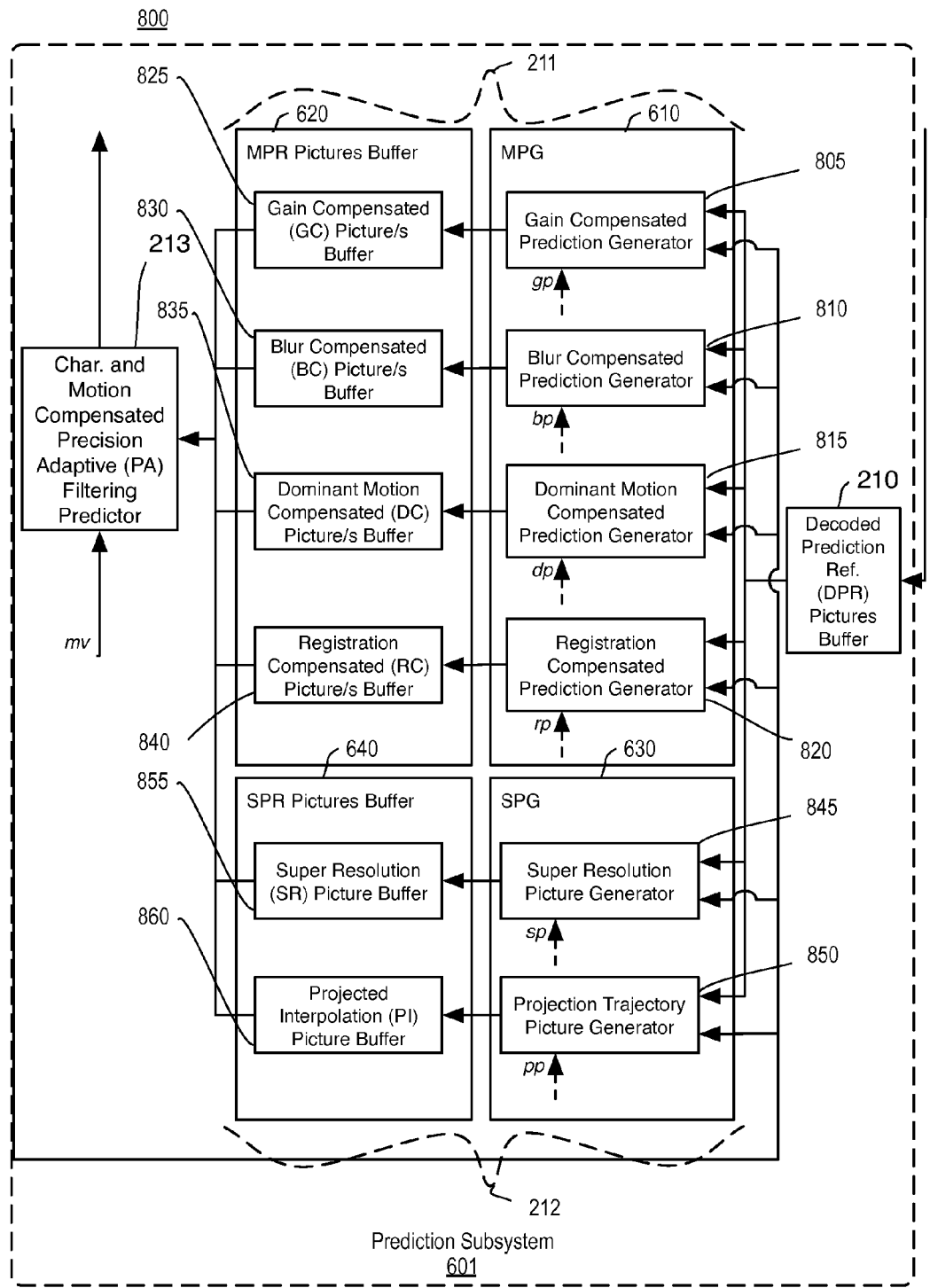
FIG. 8 is an illustrative diagram of an example decoder subsystem.

FIG. 8 is an illustrative diagram of another example decoder prediction subsystem 601 for performing characteristics and motion compensated prediction, arranged in accordance with at least some implementations of the present disclosure. As illustrated, decoder prediction subsystem 601 may include decoded picture buffer 210, morphing analyzer and generation module 211, synthesizing analyzer and generation module 212, and/or characteristics and motion compensated precision adaptive filtering predictor module 213.

As shown, the output of quality restoration filtering module may be transmitted to decoded picture buffer 210. In some examples, the output of quality restoration filtering module may be a final reconstructed frame that may be used for prediction for coding other frames (e.g., the final reconstructed frame may be a reference frame or the like). As discussed, compensation due to prediction operations may include inter- and/or intra-prediction compensation. As shown, inter-prediction compensation may be performed by one or more modules including morphing analyzer and generation module 211, synthesizing analyzer and generation module 212, and/or characteristics and motion compensated precision adaptive filtering predictor module 213.

Morphing generation module 212 may include a morphed pictures generator (MPG) 610 as well as a morphed prediction reference (MPR) buffer 620. Morphed pictures generator (MPG) 610 may use de-quantized morphing parameters (e.g., determined from input bitstream) to generate morphed reference frames. For example, morphed pictures generator (MPG) 610 may include Gain Compensated Prediction Generator 805, Blur Compensated Prediction Generator 810, Dominant Motion Compensated Prediction Generator 815, Registration Compensated Prediction Generator 820, the like and/or combinations thereof. Gain Compensated Prediction Generator 805 may be configured to generate morphed prediction reference pictures that are adapted to address changes in gain. Blur Compensated Prediction Generator 810 may be configured to generate morphed prediction reference pictures that are adapted to address changes in blur. Dominant Motion Compensated Prediction Generator 815 may be configured to generate morphed prediction reference pictures that are adapted to address changes in dominant motion. Registration Compensated Prediction Generator 820 may be configured to generate morphed prediction reference pictures that are adapted to address changes in registration.

Morphed pictures generator (MPG) 610 may store such generated morphed reference frames in morphed prediction reference (MPR) buffer 620. For example, morphed prediction reference (MPR) buffer 620 may include Gain Compensated (GC) Picture/s Buffer 825, Blur Compensated (BC) Picture/s Buffer 830, Dominant Motion Compensated (DC) Picture/s Buffer 835, Registration Compensated (RC) Picture/s Buffer 840, the like and/or combinations thereof. Gain Compensated (GC) Picture/s Buffer 825 may be configured to store morphed reference frames that are adapted to address changes in gain. Blur Compensated (BC) Picture/s Buffer 830 may be configured to store morphed reference frames that are adapted to address changes in blur. Dominant Motion Compensated (DC) Picture/s Buffer 835 may be configured to store morphed reference frames that are adapted to address changes in dominant motion. Registration Compensated (RC) Picture/s Buffer 840 may be configured to store morphed reference frames that are adapted to address changes in registration.

Synthesizing generation module 212 may include a synthesized pictures generator 630 as well as a synthesized prediction reference (MPR) buffer 640. Synthesized pictures generator 630 may be configured to generate one or more types of synthesized prediction reference pictures such as super resolution (SR) pictures and projected interpolation (PI) pictures or the like based at least in part on parameters determined from input bitstream 201. Such generated synthesized reference frames may be stored in synthesized prediction reference (MPR) buffer 640 and may be used by motion compensated filtering predictor module 213. For example, synthesized pictures generator 630 may include Super Resolution Picture Generator 845, Projection Trajectory Picture Generator 850, the like and/or combinations thereof. Super Resolution Picture Generator 845 may be configured to generate a super resolution (SR) type of synthesized prediction reference pictures. Projection Trajectory Picture Generator 850 may be configured to generate a projected interpolation (PI) type of synthesized prediction reference pictures.

Synthesized pictures generator 630 may generate super resolution (SR) pictures and projected interpolation (PI) pictures or the like for efficient motion compensated prediction in these frames. Such generated synthesized reference frames may be stored in synthesized prediction reference (MPR) buffer 640 and may be used by characteristics and motion compensated filtering predictor module 213 for efficient motion (and characteristics) compensated prediction of a current frame.

For example, synthesized prediction reference (MPR) buffer 640 may include Super Resolution (SR) Picture Buffer 855, Projected Interpolation (PI) Picture Buffer 860, the like and/or combinations thereof. Super Resolution (SR) Picture Buffer 855 may be configured to store synthesized reference frames that are generated for super resolution (SR) pictures. Projected Interpolation (PI) Picture Buffer 860 may be configured to store synthesized reference frames that are generated for projected interpolation (PI) pictures.

If inter-prediction is applied, characteristics and motion compensated filtering predictor module 213 may apply motion compensation based at least in part on morphed reference frame(s) and/or super resolution (SR) pictures and projected interpolation (PI) pictures along with the current frame.

Figure 9:
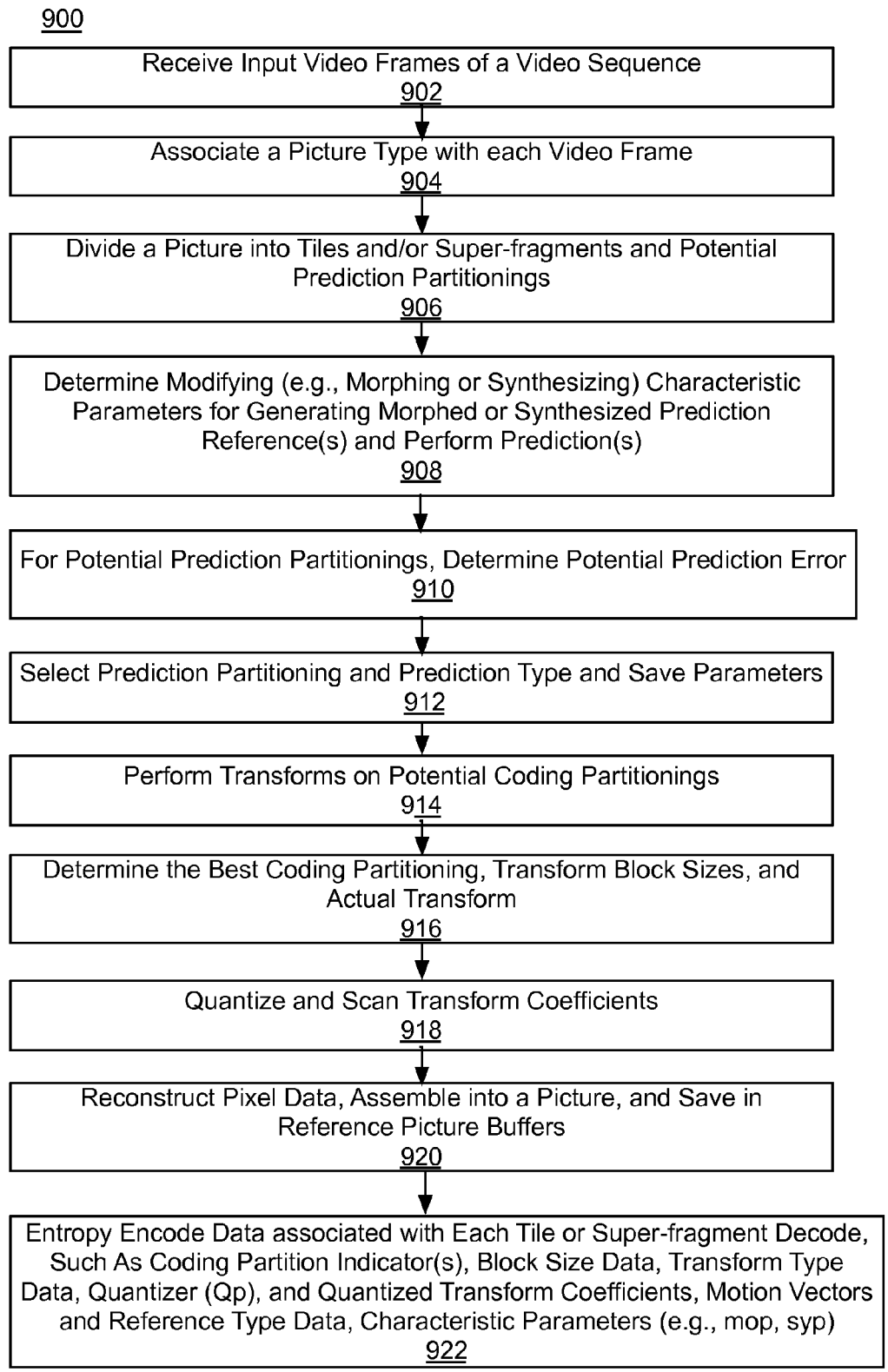
FIG. 9 is a flow diagram illustrating an example video encoding process.

FIG. 9 is a flow diagram illustrating an example process 900, arranged in accordance with at least some implementations of the present disclosure. Process 900 may include one or more operations, functions or actions as illustrated by one or more of operations 902, 904, 906, 908, 910, 912, 914, 916, 918, 920, and/or 922. Process 900 may form at least part of a next generation video coding process. By way of non-limiting example, process 900 may form at least part of a next generation video encoding process as undertaken by encoder system 100 of FIG. 1 and/or any of coder systems of FIGS. 1 through 3 and 5 through 8.

Process 900 may begin at operation 902, "Receive Input Video Frames of a Video Sequence", where input video frames of a video sequence may be received via encoder 100 for example.

Process 900 may continue at operation 904, "Associate a Picture Type with each Video Frame", where a picture type may be associated with each video frame in a group of pictures via content pre-analyzer module 102 for example. For example, the picture type may be F/B-picture, P-picture, or I-picture, or the like. In some examples, a video sequence may include groups of pictures and the processing described herein (e.g., operations 903 through 911) may be performed on a frame or picture of a group of pictures and the processing may be repeated for all frames or pictures of a group and then repeated for all groups of pictures in a video sequence.

Process 900 may continue at operation 906, "Divide a Picture into Tiles and/or Super-fragments and Potential Prediction Partitionings", where a picture may be divided into tiles or super-fragments and potential prediction partitions via prediction partitions generator 105 for example.

Process 900 may continue at operation 908, "Determine Modifying (e.g., Morphing or Synthesizing) Characteristic Parameters for Generating Morphed or Synthesized Prediction Reference(s) and Perform Prediction(s)", where, modifying (e.g., morphing or synthesizing) characteristic parameters and prediction(s) may be performed. For example, modifying (e.g., morphing or synthesizing) characteristic parameters for generating morphed or synthesized prediction reference(s) may be generated and prediction(s) may be performed.

During partitioning, for each potential prediction partitionings, prediction(s) may be performed and prediction parameters may be determined. For example, a range of potential prediction partitionings (each having various prediction partitions) may be generated and the associated prediction(s) and prediction parameters may be determined. For example, the prediction(s) may include prediction(s) using characteristics and motion based multi-reference predictions or intra-predictions.

As discussed, in some examples, inter-prediction may be performed. In some examples, up to 4 decoded past and/or future pictures and several morphing/synthesis predictions may be used to generate a large number of reference types (e.g., reference pictures). For instance in 'inter' mode, up to 9 reference types may be supported in P-pictures, and up to 10 reference types may be supported for F/B-pictures. Further, 'multi' mode may provide a type of inter prediction mode in which instead of 1 reference picture, 2 reference pictures may be used and P- and F/B-pictures respectively may allow 3, and up to 8 reference types. For example, prediction may be based at least in part on a previously decoded frame generated using at least one of a morphing technique or a synthesizing technique. In such examples, and the bitstream (discussed below with respect to operation 912) may include a frame reference, morphing parameters, or synthesizing parameters associated with the prediction partition.

Process 900 may continue at operation 910, "For Potential Prediction Partitioning, Determine Potential Prediction Error", where, for each potential prediction partitioning, a potential prediction error may be determined. For example, for each prediction partitioning (and associated prediction partitions, prediction(s), and prediction parameters), a prediction error may be determined. For example, determining the potential prediction error may include differencing original pixels (e.g., original pixel data of a prediction partition) with prediction pixels. In some examples, the associated prediction parameters may be stored. As discussed, in some examples, the prediction error data partition may include prediction error data generated based at least in part on a previously decoded frame generated using at least one of a morphing technique or a synthesizing technique.

Process 900 may continue at operation 912, "Select Prediction Partitioning and Prediction Type and Save Parameters", where a prediction partitioning and prediction type may be selected and the associated parameters may be saved. In some examples, the potential prediction partitioning with a minimum prediction error may be selected. In some examples, the potential prediction partitioning may be selected based at least in part on a rate distortion optimization (RDO).

Process 900 may continue at operation 914, "Perform Transforms on Potential Coding Partitionings", where fixed or content adaptive transforms with various block sizes may be performed on various potential coding partitionings of partition prediction error data. For example, partition prediction error data may be partitioned to generate a plurality of coding partitions. For example, the partition prediction error data may be partitioned by a bi-tree coding partitioner module or a k-d tree coding partitioner module of coding partitions generator module 107 as discussed herein. In some examples, partition prediction error data associated with an F/B- or P-picture may be partitioned by a bi-tree coding partitioner module. In some examples, video data associated with an I-picture (e.g., tiles or super-fragments in some examples) may be partitioned by a k-d tree coding partitioner module. In some examples, a coding partitioner module may be chosen or selected via a switch or switches. For example, the partitions may be generated by coding partitions generator module 107.

Process 900 may continue at operation 916, "Determine the Best Coding Partitioning, Transform Block Sizes, and Actual Transform", where the best coding partitioning, transform block sizes, and actual transforms may be determined. For example, various coding partitionings (e.g., having various coding partitions) may be evaluated based at least in part on RDO or another basis to determine a selected coding partitioning (which may also include further division of coding partitions into transform blocks when coding partitions to not match a transform block size as discussed). For example, the actual transform (or selected transform) may include any content adaptive transform or fixed transform performed on coding partition or block sizes as described herein.

Process 900 may continue at operation 918, "Quantize and Scan Transform Coefficients", where transform coefficients associated with coding partitions (and/or transform blocks) may be quantized and scanned in preparation for entropy coding.

Process 900 may continue at operation 920, "Reconstruct Pixel Data, Assemble into a Picture, and Save in Reference Picture Buffers", where pixel data may be reconstructed, assembled into a picture, and saved in reference picture buffers. For example, after a local decode loop (e.g., including inverse scan, inverse transform, and assembling coding partitions), prediction error data partitions may be generated. The prediction error data partitions may be added with a prediction partition to generate reconstructed prediction partitions, which may be assembled into tiles or super-fragments. The assembled tiles or super-fragments may be optionally processed via deblock filtering and/or quality restoration filtering and assembled to generate a picture. The picture may be saved in decoded picture buffer 119 as a reference picture for prediction of other (e.g., following) pictures.

Process 900 may continue at operation 922, "Decode the Entropy Encoded Bitstream to Determine Coding Partition Indicator(s), Block Size Data, Transform Type Data, Quantizer (Qp), Quantized Transform Coefficients, Motion Vectors and Reference Type Data, Characteristic Parameters (e.g., mop, syp)", where data may be entropy encoded. For example, the entropy encoded data may include the coding partition indicators, block size data, transform type data, quantizer (Qp), quantized transform coefficients, motion vectors and reference type data, characteristic parameters (e.g., mop, syp), the like, and/or combinations thereof. Additionally or alternatively, the entropy encoded data may include prediction partitioning, prediction parameters, the selected coding partitioning, the selected characteristics data, motion vector data, quantized transform coefficients, filter parameters, selection data (such as mode selection data), and indictors.

Operations 902 through 922 may provide for video encoding and bitstream transmission techniques, which may be employed by an encoder system as discussed herein.

FIG. 10 illustrates an example bitstream 1000, arranged in accordance with at least some implementations of the present disclosure. In some examples, bitstream 1000 may correspond to output bitstream 111 as shown in FIG. 1 and/or input bitstream 201 as shown in FIG. 2. Although not shown in FIG. 10 for the sake of clarity of presentation, in some examples bitstream 1000 may include a header portion and a data portion. In various examples, bitstream 1000 may include data, indicators, index values, mode selection data, or the like associated with encoding a video frame as discussed herein.

In operation the quantized transform coefficients, the first modifying characteristic parameters, the second modifying characteristic parameters, the motion data, a mode associated with the prediction partition, the like, and/or combinations thereof may be entropy encoded into output bitstream 111 as shown in FIG. 1. Output bitstream 111 as shown in FIG. 1 may be transmitted from encoder 100 as shown in FIG. 1 to decoder 200 as shown in FIG. 2. Input bitstream 201 as shown in FIG. 2 may be received by decoder 200 as shown in FIG. 2. Input bitstream 201 as shown in FIG. 2 may be entropy decoded by decoder 200 as shown in FIG. 2 to determine the quantized transform coefficients, the first modifying characteristic parameters, the second modifying characteristic parameters, the motion data, the mode, the like, and/or combinations thereof associated with the prediction partition.

As discussed, bitstream 1000 may be generated by an encoder such as, for example, encoder 100 and/or received by a decoder 200 for decoding such that decoded video frames may be presented via a display device.

FIG. 11 is a flow diagram illustrating an example process 1100, arranged in accordance with at least some implementations of the present disclosure. Process 1100 may include one or more operations, functions or actions as illustrated by one or more of operations 1102, 1104, 1106, 1108, 1110, 1112, and/or 1114. Process 1100 may form at least part of a next generation video coding process. By way of non-limiting example, process 1100 may form at least part of a next generation video decoding process as undertaken by decoder system 200 of FIG. 2.

Process 1100 may begin at operation 1102, "Receive Encoded Bitstream", where a bitstream may be received. For example, a bitstream encoded as discussed herein may be received at a video decoder. In some examples, bitstream 1100 may be received via decoder 200.

Process 1100 may continue at operation 1104, "Decode the Entropy Encoded Bitstream to Determine Coding Partition Indicator(s), Block Size Data, Transform Type Data, Quantizer (Qp), Quantized Transform Coefficients, Motion Vectors and Reference Type Data, Characteristic Parameters (e.g., mop, syp)", where the bitstream may be decoded to determine coding partition indicators, block size data, transform type data, quantizer (Qp), quantized transform coefficients, motion vectors and reference type data, characteristic parameters (e.g., mop, syp), the like, and/or combinations thereof. Additionally or alternatively, the entropy encoded data may include prediction partitioning, prediction parameters, the selected coding partitioning, the selected characteristics data, motion vector data, quantized transform coefficients, filter parameters, selection data (such as mode selection data), and indictors.

Process 1100 may continue at operation 1106, "Apply Quantizer (Qp) on Quantized Coefficients to Generate Inverse Quantized Transform Coefficients", where quantizer (Qp) may be applied to quantized transform coefficients to generate inverse quantized transform coefficients. For example, operation 1106 may be applied via adaptive inverse quantize module 203.

Process 1100 may continue at operation 1108, "On each Decoded Block of Coefficients in a Coding (or Intra Predicted) Partition Perform Inverse Transform based at least in part on Transform Type and Block Size Data to Generate Decoded Prediction Error Partitions", where, on each decode block of transform coefficients in a coding (or intra predicted) partition, an inverse transform based at least in part on the transform type and block size data may be performed to generate decoded prediction error partitions. In some examples, the inverse transform may include an inverse fixed transform. In some examples, the inverse transform may include an inverse content adaptive transform. In such examples, performing the inverse content adaptive transform may include determining basis functions associated with the inverse content adaptive transform based at least in part on a neighboring block of decoded video data, as discussed herein. Any forward transform used for encoding as discussed herein may be used for decoding using an associated inverse transform. In some examples, the inverse transform may be performed by adaptive inverse transform module 204. In some examples, generating the decoded prediction error partitions may also include assembling coding partitions via coding partitions assembler 205.

Process 1100 may continue at operation 1109, "Use Decoded Modifying Characteristics (e.g., mop, syp) to Generate Modified References for Prediction and Use Motion Vectors and Reference Info, Predicted Partition Info, and Modified References to Generate Predicted Partition", where modified references for prediction may be generated and predicted partitions may be generated as well. For example, where modified references for prediction may be generated based at least in part on decoded modifying characteristics (e.g., mop, syp) and predicted partitions may be generated based at least in part on motion vectors and reference information, predicted partition information, and modified references.

Process 1100 may continue at operation 1110, "Add Prediction Partition to the Decoded Prediction Error Data Partition to Generate a Reconstructed Partition", where a prediction partition my be added to the decoded prediction error data partition to generate a reconstructed prediction partition. For example, the decoded prediction error data partition may be added to the associated prediction partition via adder 206.

Process 1100 may continue at operation 1112, "Assemble Reconstructed Partitions to Generate a Tile or Super-Fragment", where the reconstructed prediction partitions may be assembled to generate tiles or super-fragments. For example, the reconstructed prediction partitions may be assembled to generate tiles or super-fragments via prediction partitions assembler module 207.

Process 1100 may continue at operation 1114, "Assemble Tiles or Super-Fragments of a Picture to Generate a Full Decoded Picture", where the tiles or super-fragments of a picture may be assembled to generate a full decoded picture. For example, after optional deblock filtering and/or quality restoration filtering, tiles or super-fragments may be assembled to generate a full decoded picture, which may be stored via decoded picture buffer 210 and/or transmitted for presentment via a display device after processing via adaptive picture re-organizer module 217 and content post-restorer module 218.

While implementation of the example processes herein may include the undertaking of all operations shown in the order illustrated, the present disclosure is not limited in this regard and, in various examples, implementation of the example processes herein may include the undertaking of only a subset of the operations shown and/or in a different order than illustrated.

Some additional and/or alternative details related to process 900, 1100 and other processes discussed herein may be illustrated in one or more examples of implementations discussed herein and, in particular, with respect to FIG. 12 below.

Figure 12A:
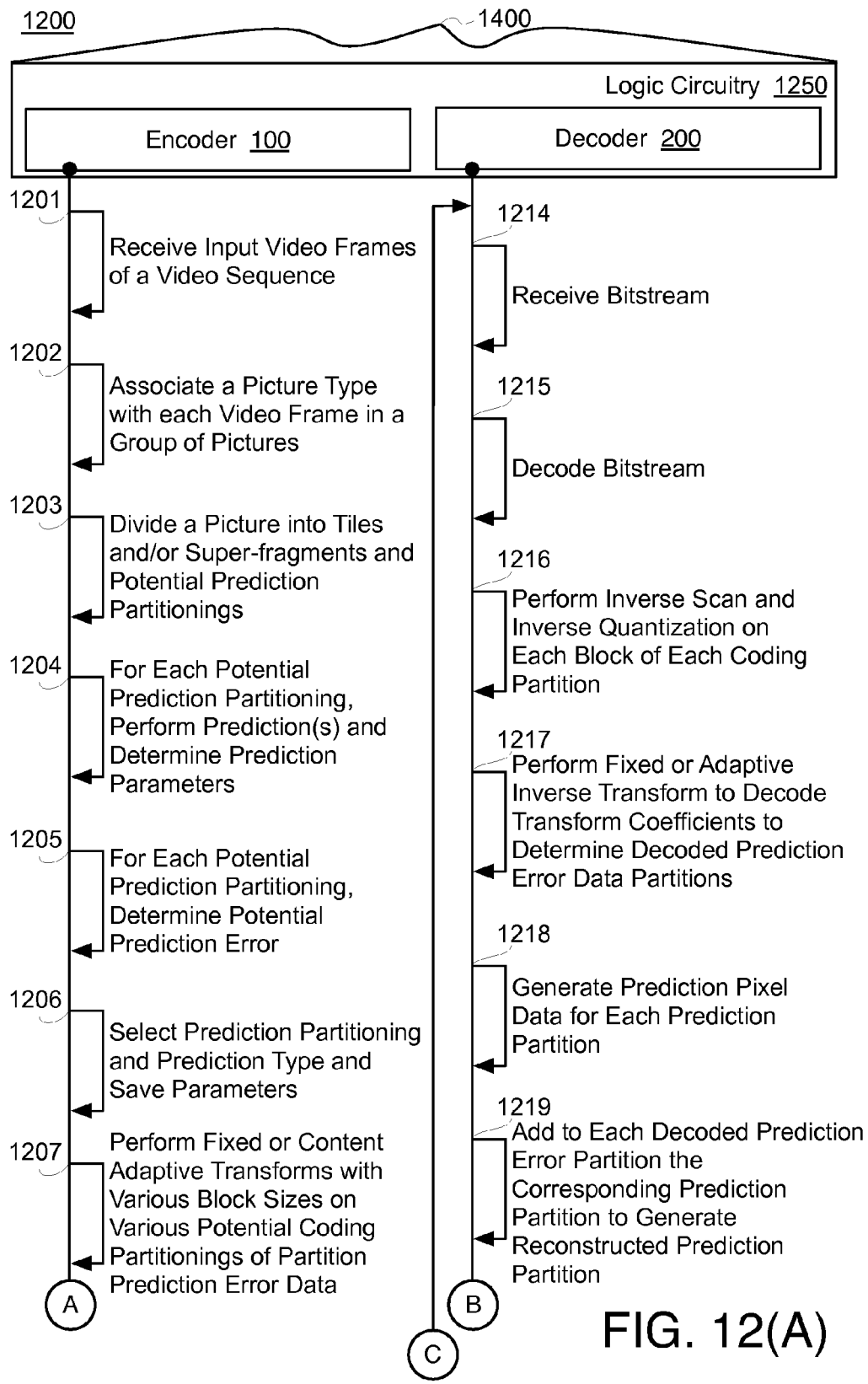
FIGS. 12(A) and 12(B) provide an illustrative diagram of an example video coding system and video coding process in operation.
Figure 12B:
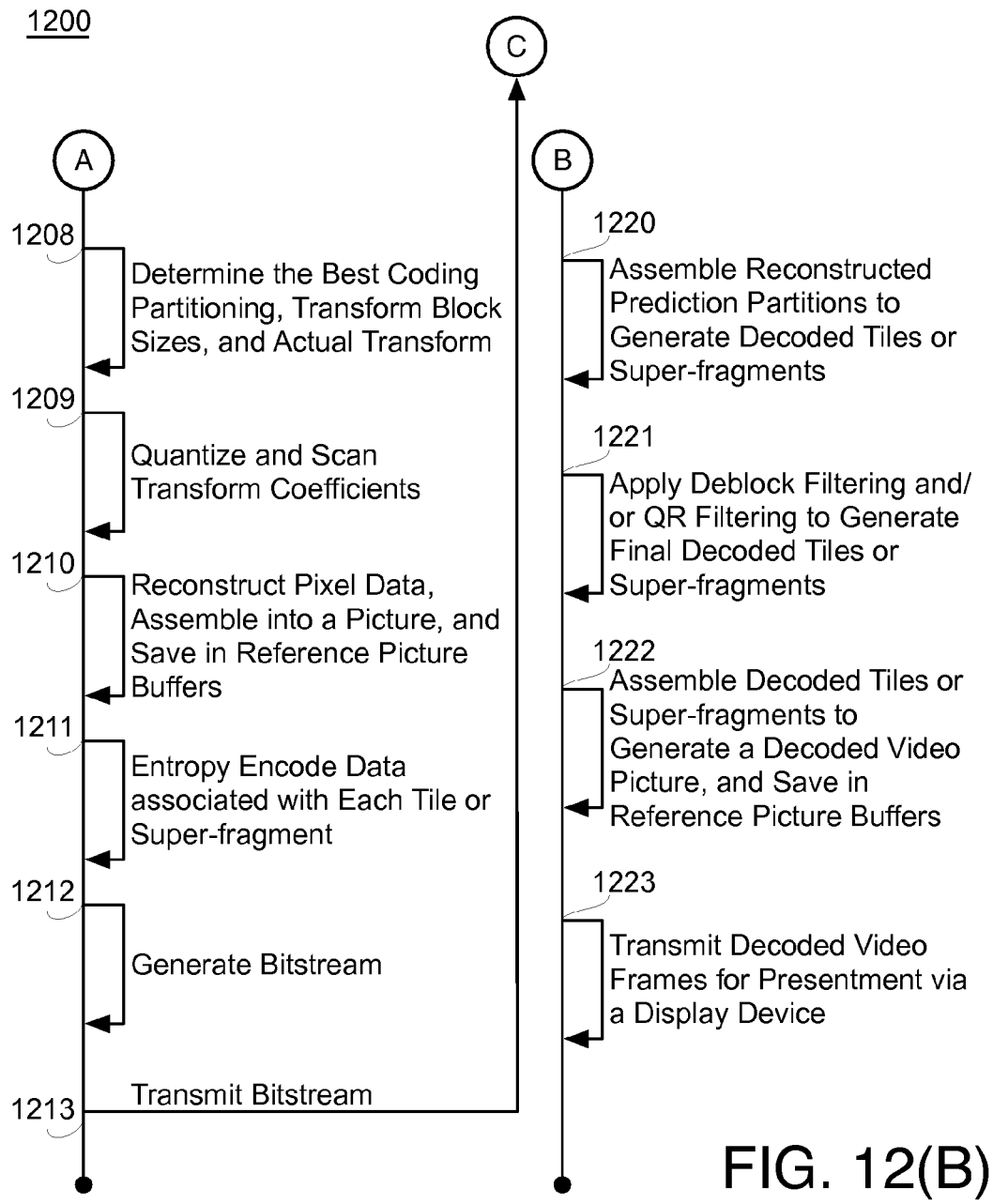

FIGS. 12(A) and 12(B) provide an illustrative diagram of an example video coding system 1400 and video coding process 1200 in operation, arranged in accordance with at least some implementations of the present disclosure. In the illustrated implementation, process 1200 may include one or more operations, functions or actions as illustrated by one or more of actions 1201 through 1223. By way of non-limiting example, process 1200 will be described herein with reference to example video coding system 1400 including encoder 100 of FIG. 1 and decoder 200 of FIG. 2, as is discussed further herein below with respect to FIG. 14. In some examples, video coding system 1400 may include encoder 700 of FIG. 7 and decoder 800 of FIG. 8. In various examples, process 1200 may be undertaken by a system including both an encoder and decoder or by separate systems with one system employing an encoder (and optionally a decoder) and another system employing a decoder (and optionally an encoder). It is also noted, as discussed above, that an encoder may include a local decode loop employing a local decoder as a part of the encoder system.

In the illustrated implementation, video coding system 1400 may include logic circuitry 1250, the like, and/or combinations thereof. For example, logic circuitry 1250 may include encoder 100 (or encoder 700) and may include any modules as discussed with respect to FIGS. 1, 3, 5 and/or 7 and decoder 200 (or decoder 1800) and may include any modules as discussed with respect to FIGS. 2, 6 and/or 8. Although video coding system 1400, as shown in FIGS. 12(A) and 12(B), may include one particular set of blocks or actions associated with particular modules, these blocks or actions may be associated with different modules than the particular modules illustrated here. Although process 1200, as illustrated, is directed to encoding and decoding, the concepts and/or operations described may be applied to encoding and/or decoding separately, and, more generally, to video coding.

Process 1200 may begin at operation 1201, "Receive Input Video Frames of a Video Sequence", where input video frames of a video sequence may be received via encoder 100 for example.

Process 1200 may continue at operation 1202, "Associate a Picture Type with each Video Frame in a Group of Pictures", where a picture type may be associated with each video frame in a group of pictures via content pre-analyzer module 102 for example. For example, the picture type may be F/B-picture, P-picture, or I-picture, or the like. In some examples, a video sequence may include groups of pictures and the processing described herein (e.g., operations 1203 through 1211) may be performed on a frame or picture of a group of pictures and the processing may be repeated for all frames or pictures of a group and then repeated for all groups of pictures in a video sequence.

Process 1200 may continue at operation 1203, "Divide a Picture into Tiles and/or Super-fragments and Potential Prediction Partitionings", where a picture may be divided into tiles or super-fragments and potential prediction partitions via prediction partitions generator 105 for example.

Process 1200 may continue at operation 1204, "For Each Potential Prediction Partitioning, Perform Prediction(s) and Determine Prediction Parameters", where, for each potential prediction partitionings, prediction(s) may be performed and prediction parameters may be determined. For example, a range of potential prediction partitionings (each having various prediction partitions) may be generated and the associated prediction(s) and prediction parameters may be determined. For example, the prediction(s) may include prediction(s) using characteristics and motion based multi-reference predictions or intra-predictions.

As discussed, in some examples, inter-prediction may be performed. In some examples, up to 4 decoded past and/or future pictures and several morphing/synthesis predictions may be used to generate a large number of reference types (e.g., reference pictures). For instance in 'inter' mode, up to 9 reference types may be supported in P-pictures, and up to 10 reference types may be supported for F/B-pictures. Further, 'multi' mode may provide a type of inter prediction mode in which instead of 1 reference picture, 2 reference pictures may be used and P- and F/B-pictures respectively may allow 3, and up to 8 reference types. For example, prediction may be based at least in part on a previously decoded frame generated using at least one of a morphing technique or a synthesizing technique. In such examples, and the bitstream (discussed below with respect to operation 1212) may include a frame reference, morphing parameters, or synthesizing parameters associated with the prediction partition.

Process 1200 may continue at operation 1205, "For Each Potential Prediction Partitioning, Determine Potential Prediction Error", where, for each potential prediction partitioning, a potential prediction error may be determined. For example, for each prediction partitioning (and associated prediction partitions, prediction(s), and prediction parameters), a prediction error may be determined. For example, determining the potential prediction error may include differencing original pixels (e.g., original pixel data of a prediction partition) with prediction pixels. In some examples, the associated prediction parameters may be stored. As discussed, in some examples, the prediction error data partition may include prediction error data generated based at least in part on a previously decoded frame generated using at least one of a morphing technique or a synthesizing technique.

Process 1200 may continue at operation 1206, "Select Prediction Partitioning and Prediction Type and Save Parameters", where a prediction partitioning and prediction type may be selected and the associated parameters may be saved. In some examples, the potential prediction partitioning with a minimum prediction error may be selected. In some examples, the potential prediction partitioning may be selected based at least in part on a rate distortion optimization (RDO).

Process 1200 may continue at operation 1207, "Perform Fixed or Content Adaptive Transforms with Various Block Sizes on Various Potential Coding Partitionings of Partition Prediction Error Data", where fixed or content adaptive transforms with various block sizes may be performed on various potential coding partitionings of partition prediction error data. For example, partition prediction error data may be partitioned to generate a plurality of coding partitions. For example, the partition prediction error data may be partitioned by a bi-tree coding partitioner module or a k-d tree coding partitioner module of coding partitions generator module 107 as discussed herein. In some examples, partition prediction error data associated with an F/B- or P-picture may be partitioned by a bi-tree coding partitioner module. In some examples, video data associated with an I-picture (e.g., tiles or super-fragments in some examples) may be partitioned by a k-d tree coding partitioner module. In some examples, a coding partitioner module may be chosen or selected via a switch or switches. For example, the partitions may be generated by coding partitions generator module 107.

Process 1200 may continue at operation 1208, "Determine the Best Coding Partitioning, Transform Block Sizes, and Actual Transform", where the best coding partitioning, transform block sizes, and actual transforms may be determined. For example, various coding partitionings (e.g., having various coding partitions) may be evaluated based at least in part on RDO or another basis to determine a selected coding partitioning (which may also include further division of coding partitions into transform blocks when coding partitions to not match a transform block size as discussed). For example, the actual transform (or selected transform) may include any content adaptive transform or fixed transform performed on coding partition or block sizes as described herein.

Process 1200 may continue at operation 1209, "Quantize and Scan Transform Coefficients", where transform coefficients associated with coding partitions (and/or transform blocks) may be quantized and scanned in preparation for entropy coding.

Process 1200 may continue at operation 1210, "Reconstruct Pixel Data, Assemble into a Picture, and Save in Reference Picture Buffers", where pixel data may be reconstructed, assembled into a picture, and saved in reference picture buffers. For example, after a local decode loop (e.g., including inverse scan, inverse transform, and assembling coding partitions), prediction error data partitions may be generated. The prediction error data partitions may be added with a prediction partition to generate reconstructed prediction partitions, which may be assembled into tiles or super-fragments. The assembled tiles or super-fragments may be optionally processed via deblock filtering and/or quality restoration filtering and assembled to generate a picture. The picture may be saved in decoded picture buffer 119 as a reference picture for prediction of other (e.g., following) pictures.

Process 1200 may continue at operation 1211, "Entropy Encode Data associated with Each Tile or Super-fragment", where data associated with each tile or super-fragment may be entropy encoded. For example, data associated with each tile or super-fragment of each picture of each group of pictures of each video sequence may be entropy encoded. The entropy encoded data may include the prediction partitioning, prediction parameters, the selected coding partitioning, the selected characteristics data, motion vector data, quantized transform coefficients, filter parameters, selection data (such as mode selection data), and indictors.

Process 1200 may continue at operation 1212, "Generate Bitstream" where a bitstream may be generated based at least in part on the entropy encoded data. As discussed, in some examples, the bitstream may include a frame or picture reference, morphing parameters, or synthesizing parameters associated with a prediction partition.

Process 1200 may continue at operation 1213, "Transmit Bitstream", where the bitstream may be transmitted. For example, video coding system 1400 may transmit output bitstream 111, bitstream 1000, or the like via an antenna 1402 (please refer to FIG. 14).

Operations 1201 through 1213 may provide for video encoding and bitstream transmission techniques, which may be employed by an encoder system as discussed herein. The following operations, operations 1214 through 1223 may provide for video decoding and video display techniques, which may be employed by a decoder system as discussed herein.

Process 1200 may continue at operation 1214, "Receive Bitstream", where the bitstream may be received. For example, input bitstream 201, bitstream 1000, or the like may be received via decoder 200. In some examples, the bitstream may include data associated with a coding partition, one or more indicators, and/or data defining coding partition(s) as discussed above. In some examples, the bitstream may include the prediction partitioning, prediction parameters, the selected coding partitioning, the selected characteristics data, motion vector data, quantized transform coefficients, filter parameters, selection data (such as mode selection data), and indictors.

Process 1200 may continue at operation 1215, "Decode Bitstream", where the received bitstream may be decoded via adaptive entropy decoder module 202 for example. For example, received bitstream may be entropy decoded to determine the prediction partitioning, prediction parameters, the selected coding partitioning, the selected characteristics data, motion vector data, quantized transform coefficients, filter parameters, selection data (such as mode selection data), and indictors.

Process 1200 may continue at operation 1216, "Perform Inverse Scan and Inverse Quantization on Each Block of Each Coding Partition", where an inverse scan and inverse quantization may be performed on each block of each coding partition for the prediction partition being processed. For example, the inverse scan and inverse quantization may be performed via adaptive inverse quantize module 203.

Process 1200 may continue at operation 1217, "Perform Fixed or Content Adaptive Inverse Transform to Decode Transform Coefficients to Determine Decoded Prediction Error Data Partitions", where a fixed or content adaptive inverse transform may be performed to decode transform coefficients to determine decoded prediction error data partitions. For example, the inverse transform may include an inverse content adaptive transform such as a hybrid parametric Haar inverse transform such that the hybrid parametric Haar inverse transform may include a parametric Haar inverse transform in a direction of the parametric transform direction and a discrete cosine inverse transform in a direction orthogonal to the parametric transform direction. In some examples, the fixed inverse transform may include a discrete cosine inverse transform or a discrete cosine inverse transform approximator. For example, the fixed or content adaptive transform may be performed via adaptive inverse transform module 204. As discussed, the content adaptive inverse transform may be based at least in part on other previously decoded data, such as, for example, decoded neighboring partitions or blocks. In some examples, generating the decoded prediction error data partitions may include assembling decoded coding partitions via coding partitions assembler module 205.

Process 1200 may continue at operation 1218, "Generate Prediction Pixel Data for Each Prediction Partition", where prediction pixel data may be generated for each prediction partition. For example, prediction pixel data may be generated using the selected prediction type (e.g., based at least in part on characteristics and motion, or intra-, or other types) and associated prediction parameters.

Process 1200 may continue at operation 1219, "Add to Each Decoded Prediction Error Partition the Corresponding Prediction Partition to Generate Reconstructed Prediction Partition", where each decoded prediction error partition (e.g., including zero prediction error partitions) may be added to the corresponding prediction partition to generated a reconstructed prediction partition. For example, prediction partitions may be generated via the decode loop illustrated in FIG. 2 and added via adder 206 to decoded prediction error partitions.

Process 1200 may continue at operation 1220, "Assemble Reconstructed Prediction Partitions to Generate Decoded Tiles or Super-fragments", where reconstructed prediction partitions may be assembled to generate decoded tiles or super-fragments. For example, prediction partitions may be assembled to generate decoded tiles or super-fragments via prediction partitions assembler module 207.

Process 1200 may continue at operation 1221, "Apply Deblock Filtering and/or QR Filtering to Generate Final Decoded Tiles or Super-fragments", where optional deblock filtering and/or quality restoration filtering may be applied to the decoded tiles or super-fragments to generate final decoded tiles or super-fragments. For example, optional deblock filtering may be applied via deblock filtering module 208 and/or optional quality restoration filtering may be applied via quality restoration filtering module 209.

Process 1200 may continue at operation 1222, "Assemble Decoded Tiles or Super-fragments to Generate a Decoded Video Picture, and Save in Reference Picture Buffers", where decoded (or final decoded) tiles or super-fragments may be assembled to generate a decoded video picture, and the decoded video picture may be saved in reference picture buffers (e.g., decoded picture buffer 210) for use in future prediction.

Figure 14:
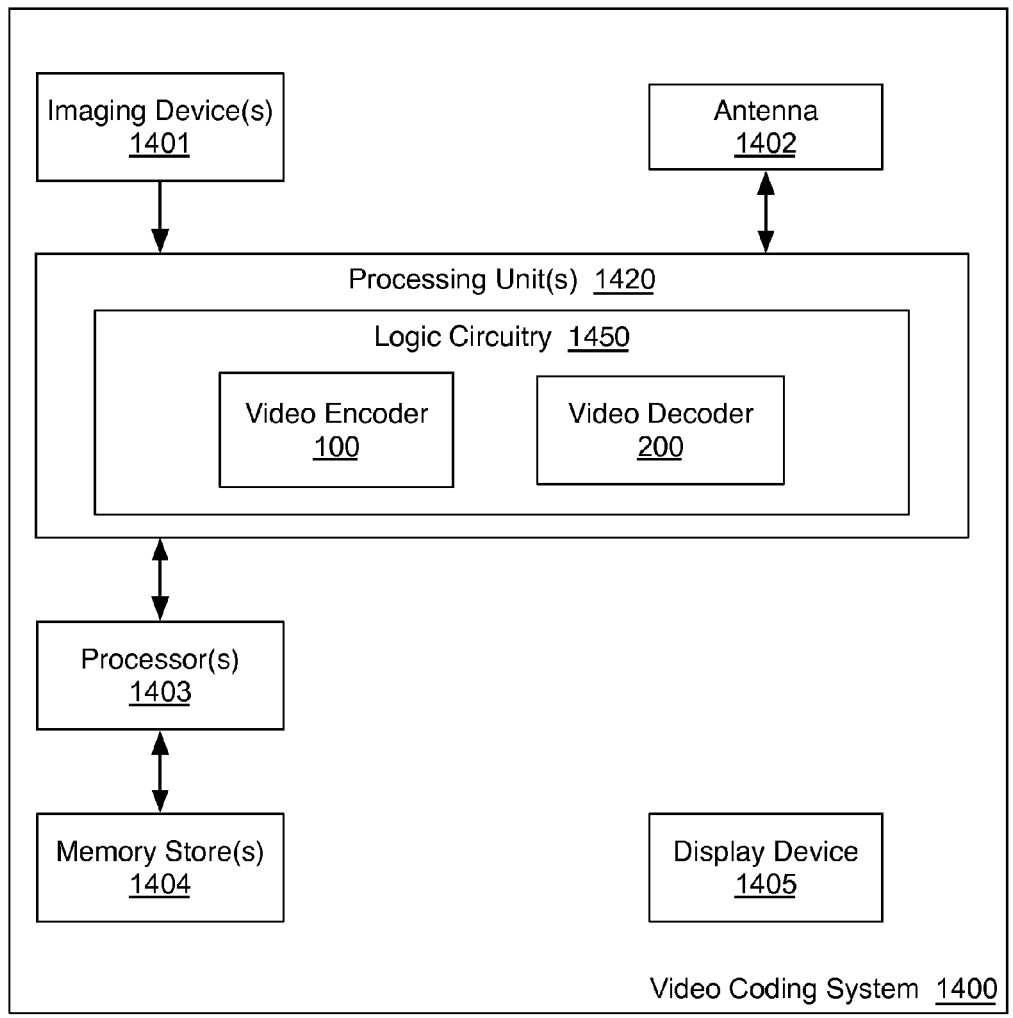
FIG. 14 is an illustrative diagram of an example video coding system.

Process 1200 may continue at operation 1223, "Transmit Decoded Video Frames for Presentment via a Display Device", where decoded video frames may be transmitted for presentment via a display device. For example, decoded video pictures may be further processed via adaptive picture re-organizer 217 and content post restorer module 218 and transmitted to a display device as video frames of display video 219 for presentment to a user. For example, the video frame(s) may be transmitted to a display device 1405 (as shown in FIG. 14) for presentment.

While implementation of the example processes herein may include the undertaking of all operations shown in the order illustrated, the present disclosure is not limited in this regard and, in various examples, implementation of the example processes herein may include the undertaking of only a subset of the operations shown and/or in a different order than illustrated.

Some additional and/or alternative details related to process 900, 1100, 1200 and other processes discussed herein may be illustrated in one or more examples of implementations discussed herein and, in particular, with respect to FIG. 13 below.

Figure 13A:
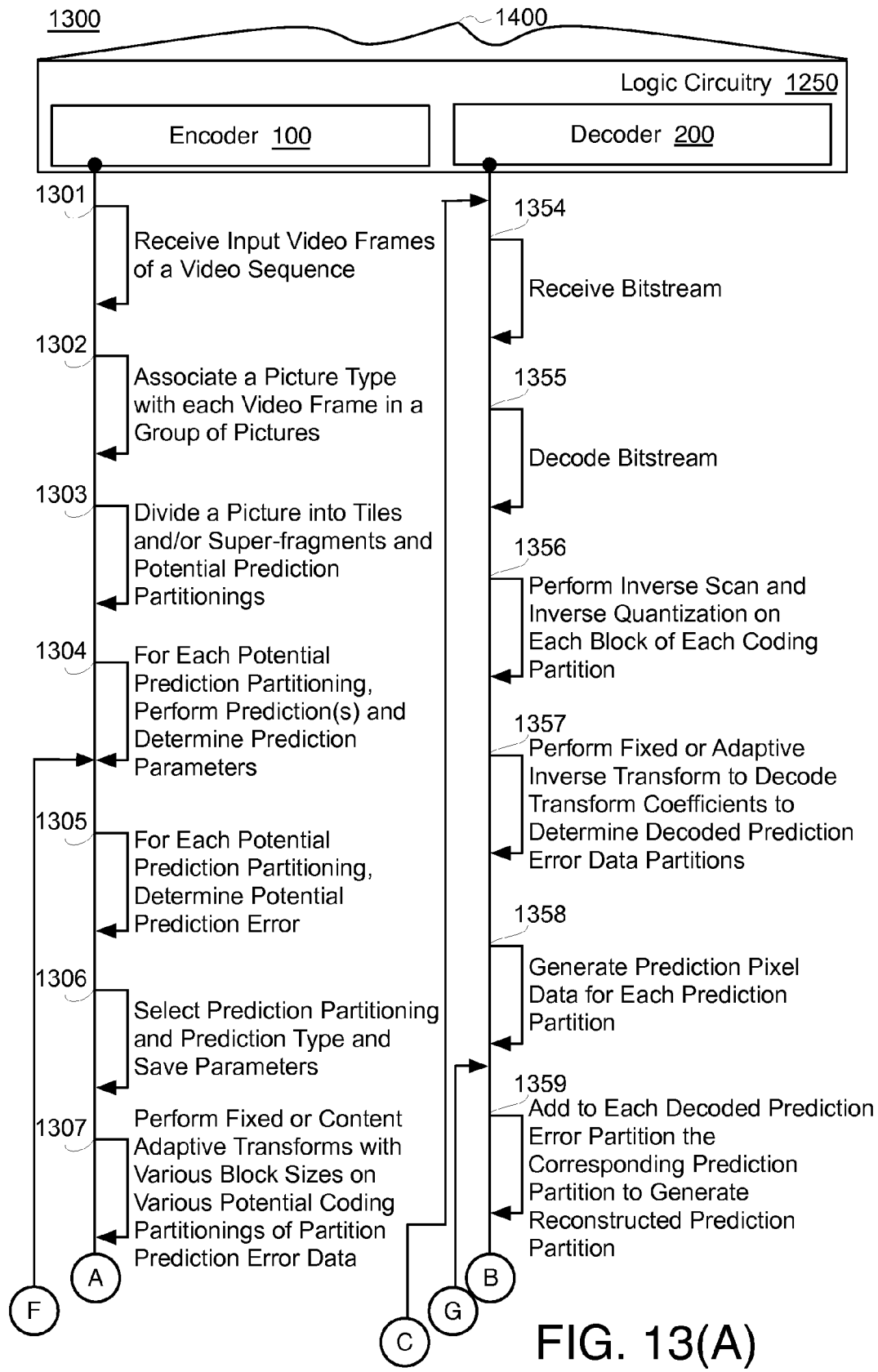
FIGS. 13(A), 13(B) and 13(C) provide an illustrative diagram of an example video coding system and video coding process in operation.
Figure 13B:
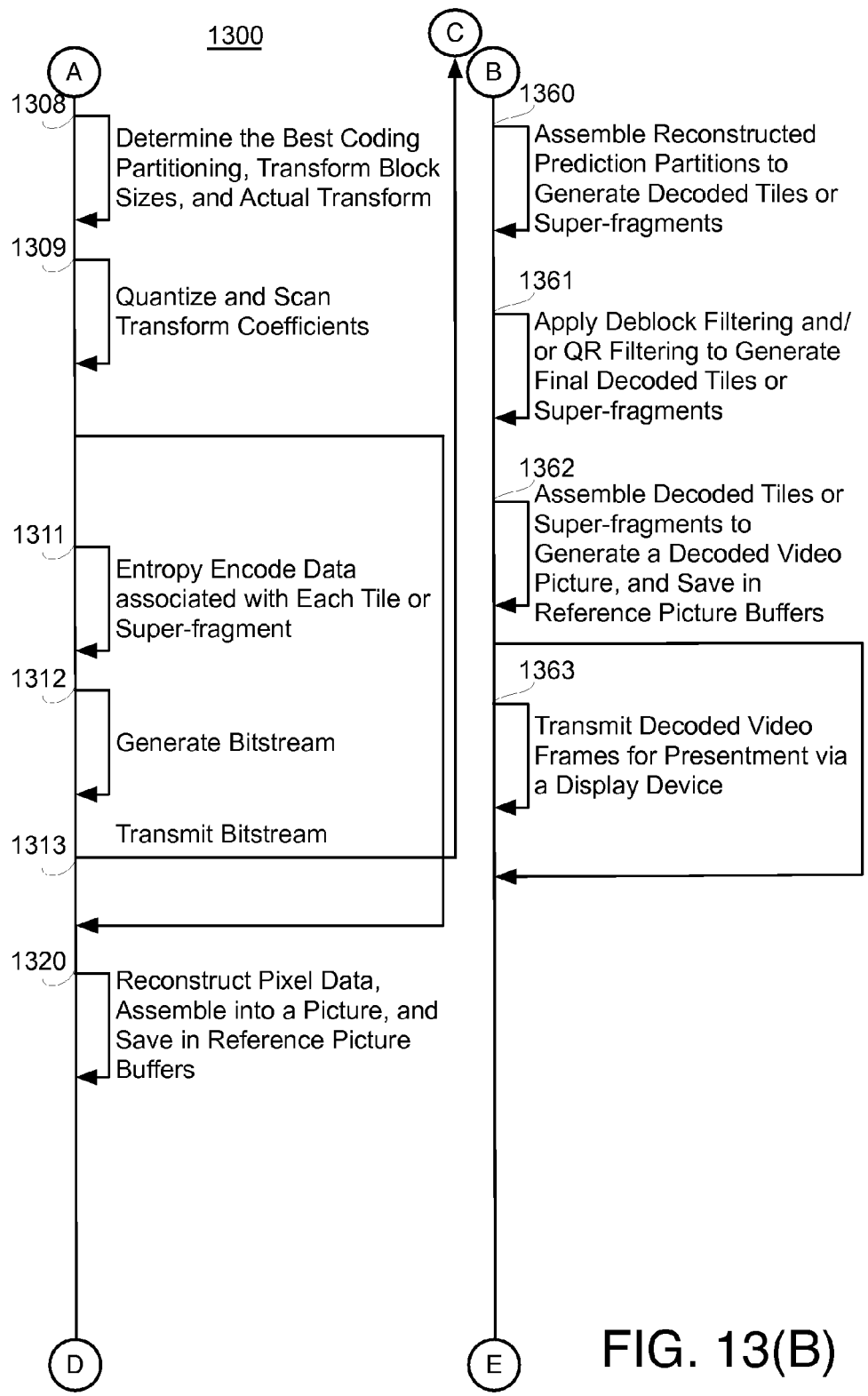
Figure 13C:
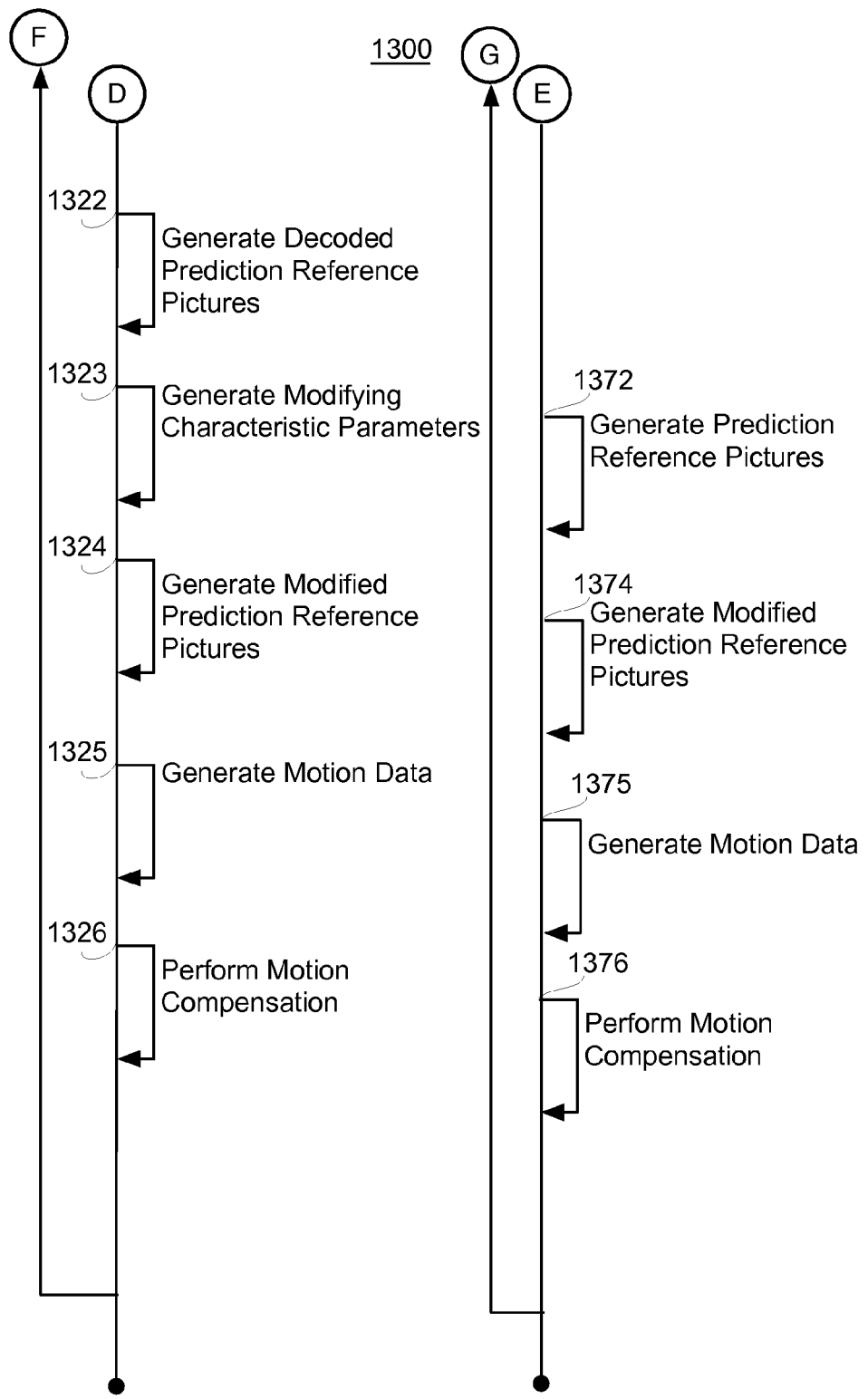

FIGS. 13(A), 13(B) and 13(C) provide an illustrative diagram of an example video coding system 1200 and video coding process 1300 in operation, arranged in accordance with at least some implementations of the present disclosure. In the illustrated implementation, process 1300 may include one or more operations, functions or actions as illustrated by one or more of actions 1301 through 1323. By way of non-limiting example, process 1300 will be described herein with reference to example video coding system 1400 including encoder 100 of FIG. 1 and decoder 200 of FIG. 2, as is discussed further herein below with respect to FIG. 14. In some examples, video coding system 1400 may include encoder 700 of FIG. 7 and decoder 800 of FIG. 8. In various examples, process 1300 may be undertaken by a system including both an encoder and decoder or by separate systems with one system employing an encoder (and optionally a decoder) and another system employing a decoder (and optionally an encoder). It is also noted, as discussed above, that an encoder may include a local decode loop employing a local decoder as a part of the encoder system.

In the illustrated implementation, video coding system 1400 may include logic circuitry 1350, the like, and/or combinations thereof. For example, logic circuitry 1350 may include encoder 100 (or encoder 700) and may include any modules as discussed with respect to FIGS. 1, 3, 5 and/or 7 and decoder 200 (or decoder 1800) and may include any modules as discussed with respect to FIGS. 2, 6 and/or 8. Although video coding system 1400, as shown in FIGS. 13(A), 13(B) and 13(C), may include one particular set of blocks or actions associated with particular modules, these blocks or actions may be associated with different modules than the particular modules illustrated here. Although process 1300, as illustrated, is directed to encoding and decoding, the concepts and/or operations described may be applied to encoding and/or decoding separately, and, more generally, to video coding.

Process 1300 may begin at operation 1301, "Receive Input Video Frames of a Video Sequence", where input video frames of a video sequence may be received via encoder 100 for example.

Process 1300 may continue at operation 1302, "Associate a Picture Type with each Video Frame in a Group of Pictures", where a picture type may be associated with each video frame in a group of pictures via content pre-analyzer module 102 for example. For example, the picture type may be F/B-picture, P-picture, or I-picture, or the like. In some examples, a video sequence may include groups of pictures and the processing described herein (e.g., operations 1303 through 1311) may be performed on a frame or picture of a group of pictures and the processing may be repeated for all frames or pictures of a group and then repeated for all groups of pictures in a video sequence.

Process 1300 may continue at operation 1303, "Divide a Picture into Tiles and/or Super-fragments and Potential Prediction Partitionings", where a picture may be divided into tiles or super-fragments and potential prediction partitions via prediction partitions generator 105 for example.

Process 1300 may continue at operation 1304, "For Each Potential Prediction Partitioning, Perform Prediction(s) and Determine Prediction Parameters", where, for each potential prediction partitionings, prediction(s) may be performed and prediction parameters may be determined. For example, a range of potential prediction partitionings (each having various prediction partitions) may be generated and the associated prediction(s) and prediction parameters may be determined. For example, the prediction(s) may include prediction(s) using characteristics and motion based multi-reference predictions or intra-predictions.

As discussed, in some examples, inter-prediction may be performed. In some examples, up to 4 decoded past and/or future pictures and several morphing/synthesis predictions may be used to generate a large number of reference types (e.g., reference pictures). For instance in 'inter' mode, up to 9 reference types may be supported in P-pictures, and up to 10 reference types may be supported for F/B-pictures. Further, 'multi' mode may provide a type of inter prediction mode in which instead of 1 reference picture, 2 reference pictures may be used and P- and F/B-pictures respectively may allow 3, and up to 8 reference types. For example, prediction may be based at least in part on a previously decoded frame generated using at least one of a morphing technique or a synthesizing technique. In such examples, and the bitstream (discussed below with respect to operation 1312) may include a frame reference, morphing parameters, or synthesizing parameters associated with the prediction partition.

Process 1300 may continue at operation 1305, "For Each Potential Prediction Partitioning, Determine Potential Prediction Error", where, for each potential prediction partitioning, a potential prediction error may be determined. For example, for each prediction partitioning (and associated prediction partitions, prediction(s), and prediction parameters), a prediction error may be determined. For example, determining the potential prediction error may include differencing original pixels (e.g., original pixel data of a prediction partition) with prediction pixels. In some examples, the associated prediction parameters may be stored. As discussed, in some examples, the prediction error data partition may include prediction error data generated based at least in part on a previously decoded frame generated using at least one of a morphing technique or a synthesizing technique.

Process 1300 may continue at operation 1306, "Select Prediction Partitioning and Prediction Type and Save Parameters", where a prediction partitioning and prediction type may be selected and the associated parameters may be saved. In some examples, the potential prediction partitioning with a minimum prediction error may be selected. In some examples, the potential prediction partitioning may be selected based at least in part on a rate distortion optimization (RDO).

Process 1300 may continue at operation 1307, "Perform Fixed or Content Adaptive Transforms with Various Block Sizes on Various Potential Coding Partitionings of Partition Prediction Error Data", where fixed or content adaptive transforms with various block sizes may be performed on various potential coding partitionings of partition prediction error data. For example, partition prediction error data may be partitioned to generate a plurality of coding partitions. For example, the partition prediction error data may be partitioned by a bi-tree coding partitioner module or a k-d tree coding partitioner module of coding partitions generator module 107 as discussed herein. In some examples, partition prediction error data associated with an F/B- or P-picture may be partitioned by a bi-tree coding partitioner module. In some examples, video data associated with an I-picture (e.g., tiles or super-fragments in some examples) may be partitioned by a k-d tree coding partitioner module. In some examples, a coding partitioner module may be chosen or selected via a switch or switches. For example, the partitions may be generated by coding partitions generator module 107.

Process 1300 may continue at operation 1308, "Determine the Best Coding Partitioning, Transform Block Sizes, and Actual Transform", where the best coding partitioning, transform block sizes, and actual transforms may be determined. For example, various coding partitionings (e.g., having various coding partitions) may be evaluated based at least in part on RDO or another basis to determine a selected coding partitioning (which may also include further division of coding partitions into transform blocks when coding partitions to not match a transform block size as discussed). For example, the actual transform (or selected transform) may include any content adaptive transform or fixed transform performed on coding partition or block sizes as described herein.

Process 1300 may continue at operation 1309, "Quantize and Scan Transform Coefficients", where transform coefficients associated with coding partitions (and/or transform blocks) may be quantized and scanned in preparation for entropy coding.

Process 1300 may continue at operation 1311, "Entropy Encode Data associated with Each Tile or Super-fragment", where data associated with each tile or super-fragment may be entropy encoded. For example, data associated with each tile or super-fragment of each picture of each group of pictures of each video sequence may be entropy encoded. The entropy encoded data may include the prediction partitioning, prediction parameters, the selected coding partitioning, the selected characteristics data, motion vector data, quantized transform coefficients, filter parameters, selection data (such as mode selection data), and indictors.

Process 1300 may continue at operation 1312, "Generate Bitstream" where a bitstream may be generated based at least in part on the entropy encoded data. As discussed, in some examples, the bitstream may include a frame or picture reference, morphing parameters, or synthesizing parameters associated with a prediction partition.

Process 1300 may continue at operation 1313, "Transmit Bitstream", where the bitstream may be transmitted. For example, video coding system 1400 may transmit output bitstream 111, bitstream 1000, or the like via an antenna 1402 (please refer to FIG. 14).

Process 1300 may continue at operation 1320, "Reconstruct Pixel Data, Assemble into a Picture, and Save in Reference Picture Buffers", where pixel data may be reconstructed, assembled into a picture, and saved in reference picture buffers. For example, after a local decode loop (e.g., including inverse scan, inverse transform, and assembling coding partitions), prediction error data partitions may be generated. The prediction error data partitions may be added with a prediction partition to generate reconstructed prediction partitions, which may be assembled into tiles or super-fragments. The assembled tiles or super-fragments may be optionally processed via deblock filtering and/or quality restoration filtering and assembled to generate a picture. The picture may be saved in decoded picture buffer 119 as a reference picture for prediction of other (e.g., following) pictures.

Process 1300 may continue at operation 1322, "Generate Decoded Prediction Reference Pictures", where decoded prediction reference pictures may be decoded. For example, decoded (or final decoded) tiles or super-fragments may be assembled to generate a decoded video picture, and the decoded video picture may be saved in reference picture buffers (e.g., decoded picture buffer 119) for use in future prediction.

Process 1300 may continue at operation 1323, "Generate Modifying Characteristic Parameters", where, modified characteristic parameters may be generated. For example, a second modified prediction reference picture and second modifying characteristic parameters associated with the second modified prediction reference picture may be generated based at least in part on the second decoded prediction reference picture, where the second modified reference picture may be of a different type than the first modified reference picture.

Process 1300 may continue at operation 1324, "Generate Modified Prediction Reference Pictures", where modified prediction reference pictures may be generated, for example, a first modified prediction reference picture and first modifying characteristic parameters associated with the first modified prediction reference picture may be generated based at least in part on the first decoded prediction reference picture.

Process 1300 may continue at operation 1325, "Generate Motion Data", where, motion estimation data may be generated. For example, motion data associated with a prediction partition of a current picture may be generated based at least in part on one of the first modified prediction reference picture or the second modified prediction reference picture.

Process 1300 may continue at operation 1326, "Perform Motion Compensation", where, motion compensation may be performed. For example, motion compensation may be performed based at least in part on the motion data and at least one of the first modified prediction reference picture or the second modified prediction reference picture to generate prediction partition data for the prediction partition. Process 1300 may feed this information back to operation 1304 where each decoded prediction error partition (e.g., including zero prediction error partitions) may be added to the corresponding prediction partition to generate a reconstructed prediction partition.

Operations 1301 through 1326 may provide for video encoding and bitstream transmission techniques, which may be employed by an encoder system as discussed herein. The following operations, operations 1354 through 1368 may provide for video decoding and video display techniques, which may be employed by a decoder system as discussed herein.

Process 1300 may continue at operation 1354, "Receive Bitstream", where the bitstream may be received. For example, input bitstream 201, bitstream 1000, or the like may be received via decoder 200. In some examples, the bitstream may include data associated with a coding partition, one or more indicators, and/or data defining coding partition(s) as discussed above. In some examples, the bitstream may include the prediction partitioning, prediction parameters, the selected coding partitioning, the selected characteristics data, motion vector data, quantized transform coefficients, filter parameters, selection data (such as mode selection data), and indictors.

Process 1300 may continue at operation 1355, "Decode Bitstream", where the received bitstream may be decoded via adaptive entropy decoder module 202 for example. For example, received bitstream may be entropy decoded to determine the prediction partitioning, prediction parameters, the selected coding partitioning, the selected characteristics data, motion vector data, quantized transform coefficients, filter parameters, selection data (such as mode selection data), and indictors.

Process 1300 may continue at operation 1356, "Perform Inverse Scan and Inverse Quantization on Each Block of Each Coding Partition", where an inverse scan and inverse quantization may be performed on each block of each coding partition for the prediction partition being processed. For example, the inverse scan and inverse quantization may be performed via adaptive inverse quantize module 203.

Process 1300 may continue at operation 1357, "Perform Fixed or Content Adaptive Inverse Transform to Decode Transform Coefficients to Determine Decoded Prediction Error Data Partitions", where a fixed or content adaptive inverse transform may be performed to decode transform coefficients to determine decoded prediction error data partitions. For example, the inverse transform may include an inverse content adaptive transform such as a hybrid parametric Haar inverse transform such that the hybrid parametric Haar inverse transform may include a parametric Haar inverse transform in a direction of the parametric transform direction and a discrete cosine inverse transform in a direction orthogonal to the parametric transform direction. In some examples, the fixed inverse transform may include a discrete cosine inverse transform or a discrete cosine inverse transform approximator. For example, the fixed or content adaptive transform may be performed via adaptive inverse transform module 204. As discussed, the content adaptive inverse transform may be based at least in part on other previously decoded data, such as, for example, decoded neighboring partitions or blocks. In some examples, generating the decoded prediction error data partitions may include assembling decoded coding partitions via coding partitions assembler module 205.

Process 1300 may continue at operation 1358, "Generate Prediction Pixel Data for Each Prediction Partition", where prediction pixel data may be generated for each prediction partition. For example, prediction pixel data may be generated using the selected prediction type (e.g., based at least in part on characteristics and motion, or intra-, or other types) and associated prediction parameters.

Process 1300 may continue at operation 1359, "Add to Each Decoded Prediction Error Partition the Corresponding Prediction Partition to Generate Reconstructed Prediction Partition", where each decoded prediction error partition (e.g., including zero prediction error partitions) may be added to the corresponding prediction partition to generated a reconstructed prediction partition. For example, prediction partitions may be generated via the decode loop illustrated in FIG. 2 and added via adder 206 to decoded prediction error partitions.

Process 1300 may continue at operation 1360, "Assemble Reconstructed Prediction Partitions to Generate Decoded Tiles or Super-fragments", where reconstructed prediction partitions may be assembled to generate decoded tiles or super-fragments. For example, prediction partitions may be assembled to generate decoded tiles or super-fragments via prediction partitions assembler module 207.

Process 1300 may continue at operation 1361, "Apply Deblock Filtering and/or QR Filtering to Generate Final Decoded Tiles or Super-fragments", where optional deblock filtering and/or quality restoration filtering may be applied to the decoded tiles or super-fragments to generate final decoded tiles or super-fragments. For example, optional deblock filtering may be applied via deblock filtering module 208 and/or optional quality restoration filtering may be applied via quality restoration filtering module 209.

Process 1300 may continue at operation 1362, "Assemble Decoded Tiles or Super-fragments to Generate a Decoded Video Picture, and Save in Reference Picture Buffers", where decoded (or final decoded) tiles or super-fragments may be assembled to generate a decoded video picture, and the decoded video picture may be saved in reference picture buffers (e.g., decoded picture buffer 210) for use in future prediction.

Process 1300 may continue at operation 1363, "Transmit Decoded Video Frames for Presentment via a Display Device", where decoded video frames may be transmitted for presentment via a display device. For example, decoded video pictures may be further processed via adaptive picture re-organizer 217 and content post restorer module 218 and transmitted to a display device as video frames of display video 219 for presentment to a user. For example, the video frame(s) may be transmitted to a display device 1405 (as shown in FIG. 14) for presentment.

Process 1300 may continue at operation 1372, "Generate Decoded Prediction Reference Pictures", where decoded prediction reference pictures may be decoded. For example, decoded coding partitions may be assembled to generate a decoded prediction error data partition, and the decoded video picture (e.g. a third decoded prediction reference picture and a fourth decoded prediction reference picture may be generated) may be saved in reference picture buffers for use in future prediction.

Process 1300 may continue at operation 1324, "Generate Modified Prediction Reference Pictures", where modified prediction reference pictures may be generated, for example, at least a portion of a third modified prediction reference picture may be generated based at least in part on the third modifying characteristic parameters. Similarly, at least a portion a fourth modified prediction reference picture may be generated based at least in part on the second modifying characteristic parameters associated.

Process 1300 may continue at operation 1375, "Generate Motion Data", where, motion estimation data may be generated. For example, motion data associated with a prediction partition of a current picture may be generated based at least in part on one of the third modified prediction reference picture or the third modified prediction reference picture.

Process 1300 may continue at operation 1376, "Perform Motion Compensation", where, motion compensation may be performed. For example, motion compensation may be performed based at least in part on the motion data and at least one of the third modified prediction reference picture or the fourth modified prediction reference picture to generate prediction partition data for the prediction partition. Process 1300 may feed this information back to operation 1359 where each decoded prediction error partition (e.g., including zero prediction error partitions) may be added to the corresponding prediction partition to generate a reconstructed prediction partition.

Process 1300 may be implemented via any of the coder systems as discussed herein. Further, process 1300 may be repeated either in serial or in parallel on any number of instantiations of video data such as prediction error data partitions, original data partitions, or wavelet data or the like (e.g., at operation 1301, process 1300 may receive original data or wavelet data for processing in analogy to the described prediction error data partition). In some examples, operations 1322 through 1326 may include generating a first decoded prediction reference picture and a second decoded prediction reference picture; generating, based at least in part on the first decoded prediction reference picture, a first modified prediction reference picture and first modifying characteristic parameters associated with the first modified prediction reference picture; generating, based at least in part on the second decoded prediction reference picture, a second modified prediction reference picture and second modifying characteristic parameters associated with the first modified prediction reference picture, wherein the second modified reference picture may be of a different type than the first modified reference picture; generating motion data associated with a prediction partition of a current picture based at least in part on one of the first modified prediction reference picture or the second modified prediction reference picture; and performing motion compensation based at least in part on the motion data and at least one of the first modified prediction reference picture or the second modified prediction reference picture to generate predicted partition data for the prediction partition.

In operation, process 1300 may generate a first decoded prediction reference picture and a second decoded prediction reference picture. A first modified prediction reference picture and first modifying characteristic parameters associated with the first modified prediction reference picture may be generated based at least in part on the first decoded prediction reference picture. A second modified prediction reference picture and second modifying characteristic parameters associated with the second modified prediction reference picture may be generated based at least in part on the second decoded prediction reference picture, where the second modified reference picture may be of a different type than the first modified reference picture. Motion data associated with a prediction partition of a current picture may be generated based at least in part on one of the first modified prediction reference picture or the second modified prediction reference picture. Motion compensation may be performed based at least in part on the motion data and at least one of the first modified prediction reference picture or the second modified prediction reference picture to generate prediction partition data for the prediction partition.

In some examples, process 1300 may operate to generate a first decoded prediction reference picture and a second decoded prediction reference picture. A first modified prediction reference picture and first modifying characteristic parameters associated with the first modified prediction reference picture may be generated based at least in part on the first decoded prediction reference picture. A second modified prediction reference picture and second modifying characteristic parameters associated with the first modified prediction reference picture may be generated, based at least in part on the second decoded prediction reference picture, where the second modified reference picture may be of a different type than the first modified reference picture. Motion data associated with a prediction partition of a current picture may be generated based at least in part on one of the first modified prediction reference picture or the second modified prediction reference picture. Motion compensation may be performed based at least in part on the motion data and at least one of the first modified prediction reference picture or the second modified prediction reference picture to generate prediction partition data for the prediction partition. Second motion data associated with the prediction partition of the current picture may be generated based at least in part on the second modified prediction reference picture such that generating the motion data may include generating the motion data based at least in part on the first modified prediction reference picture. A second motion compensation may be performed based at least in part on the second motion data and the second modified prediction reference picture to generate second predicted partition data for the prediction partition such that performing the motion compensation may include performing the motion compensation based at least in part on the first modified prediction reference picture. The predicted partition data and the second predicted partition data may be combined to generate final predicted partition data for the prediction partition such that combining the predicted partition data and the second predicted partition data may include averaging the predicted partition data and the second predicted partition data. The prediction partition data or the final predicted partition may be differenced with original pixel data associated with the prediction partition to generate a prediction error data partition; partitioning the prediction error data partition to generate a plurality of coding partitions. A forward transform may be performed on the plurality of coding partitions to generate transform coefficients associated with the plurality of coding partitions; quantizing the transform coefficients to generate quantized transform coefficients. The quantized transform coefficients, the first modifying characteristic parameters, the second modifying characteristic parameters, the motion data, a mode associated with the prediction partition, the like, and/or combinations thereof may be entropy encoded into a bitstream. The bitstream may be transmitted from encoder 100 to decoder 200.

In such an example, predicted partition data may be generated based on motion compensation using motion data and a modified prediction reference picture. In some examples, two or more modified prediction reference pictures may be used to generate two or more instances of motion data (e.g., two or more motion vectors referencing the two or more modified prediction reference pictures) and two or more predicted partitions associated with a single prediction partition. The predicted partitions may then be combined (e.g., averaged, combined via a weighted average, or the like) to generate a final predicted partition (e.g., final prediction partition data) for the prediction partition. For example, second motion data associated with the prediction partition may be determined based on a second modified prediction reference picture (which may be any type as discussed herein). A second motion compensation may be performed based on the second motion data and the second modified prediction reference picture to generate a second predicted partition (e.g., second predicted partition data). The second predicted partition may be combined with a first predicted partition (generated in a similar manner and as discussed herein) to generate a final predicted partition (e.g., final predicted partition data), which may be used as discussed herein for coding.

Similarly, process 1300 may operate so that the bitstream may be received by decoder 200. The bitstream may be entropy decoded to determine the quantized transform coefficients, the first modifying characteristic parameters, the second modifying characteristic parameters, the motion data, the mode, the like, and/or combinations thereof associated with the prediction partition. An inverse quantization may be performed based at least in part on the quantized transform coefficients to generate decoded transform coefficients. An inverse transform may be performed based at least in part on the decoded transform coefficients to generate a plurality of decoded coding partitions. The plurality of decoded coding partitions may be assembled to generate a decoded prediction error data partition. A third decoded prediction reference picture and a fourth decoded prediction reference picture may be generated. At least a portion of a third modified prediction reference picture may be generated based at least in part on the third modifying characteristic parameters. At least a portion a fourth modified prediction reference picture may be generated based at least in part on the second modifying characteristic parameters associated. Motion compensation may be performed based at least in part on the motion data and at least one of the portion of the third modified prediction reference picture or the portion of the fourth modified prediction reference picture to generate decoded prediction partition data. The decoded prediction partition data may be added to the decoded prediction error data partition to generate a first reconstructed prediction partition. The first reconstructed prediction partition and a second reconstructed prediction partition may be assembled to generate at least one of a first tile or a first super-fragment. At least one of a deblock filtering or a quality restoration filtering may be applied to the first tile or the first super-fragment to generate a first final decoded tile or super-fragment. The first final decoded tile or super-fragment and a second final decoded tile or super-fragment may be assembled to generate a decoded video frame; transmitting the decoded video frame for presentment via a display device. Second motion data associated with a second prediction partition of the current picture may be generated based at least in part the first decoded prediction reference picture, the second decoded prediction reference picture, or a third decoded prediction reference picture. Third motion data associated with a third prediction partition of the current picture may be further generated based at least in part on decoded prediction reference pictures and modified prediction reference pictures totaling ten prediction reference pictures, in cases where the current picture comprises a P-picture. Fourth motion data associated with a fourth prediction partition of the current picture may be further generated based at least in part on decoded prediction reference pictures and modified prediction reference pictures totaling eleven prediction reference pictures, in cases where the current picture includes an F/B-picture. The first modified prediction reference picture may include at least one of a morphed prediction reference picture, a synthesized prediction reference picture, a gain modified prediction reference picture, a blur modified prediction reference picture, a dominant motion modified prediction reference picture, a registration modified prediction reference picture, a super resolution prediction reference picture, a projection trajectory prediction reference picture, the like, and/or combinations thereof. The first modified prediction reference picture may include a morphed prediction reference picture and the second modified prediction reference picture may include a synthesized prediction reference picture. The morphed prediction reference picture may include at least one of a gain modified prediction reference picture, a blur modified prediction reference picture, a dominant motion modified prediction reference picture, a registration modified prediction reference picture, the like, and/or combinations thereof. The synthesized prediction reference picture may include at least one of a super resolution prediction reference picture, a projection trajectory prediction reference picture, the like, and/or combinations thereof. The first decoded prediction reference picture may include at least one of a past decoded prediction reference picture or a future decoded prediction reference picture. The motion data may include a motion vector.

In still another example, process 1300 may generate a decoded prediction reference picture. Modifying characteristic parameters associated with a modification partitioning of the decoded prediction reference picture may be generated. Motion data associated with a prediction partition of a current picture may be generated based at least in part on a modified reference partition based at least in part on the decoded prediction reference picture and the modifying characteristic parameters. Motion compensation may be performed based at least in part on the motion data and the modified reference partition to generate predicted partition data for the prediction partition.

In such an example, process 1300 may further generate a decoded prediction reference picture; generating modifying characteristic parameters associated with a modification partitioning of the decoded prediction reference picture; generating motion data associated with a prediction partition of a current picture based at least in part on a modified reference partition generated based at least in part on the decoded prediction reference picture and the modifying characteristic parameters; performing motion compensation based at least in part on the motion data and the modified reference partition to generate predicted partition data for the prediction partition; generating second modifying characteristic parameters associated with a second modification partitioning of the decoded prediction reference picture such that the modification partitioning and the second modification partitioning comprise different partitionings; generating second motion data associated with the prediction partition of the current picture based at least in part on a second modified reference partition generated based at least in part on the decoded prediction reference picture and the second modifying characteristic parameters; performing a second motion compensation based at least in part on the motion data and the second modified reference partition to generate second predicted partition data for the prediction partition; and combining the predicted partition data and the second predicted partition data to generate final predicted partition data for the prediction partition such that combining the predicted partition data and the second predicted partition data may include averaging the predicted partition data and the second predicted partition data. The modifying characteristic parameters may include at least one of morphing characteristic parameters, synthesizing characteristic parameters, gain characteristic parameters, blur characteristic parameters, dominant motion characteristic parameters, registration characteristic parameters, super resolution characteristic parameters, or projection trajectory characteristic parameters. The second modifying characteristic parameters may include at least one of morphing characteristic parameters, synthesizing characteristic parameters, gain characteristic parameters, blur characteristic parameters, dominant motion characteristic parameters, registration characteristic parameters, super resolution characteristic parameters, or projection trajectory characteristic parameters.

In such an example, the modified characteristics parameters and modified reference pictures may be determined using a local-based technique. For example, modified characteristics parameters may be determined based on a modification partitioning of a decoded prediction reference picture. For example, the partitioning may include partitioning the decoded prediction reference picture into tiles, blocks, fragments, or the like. The partitioning may divide the prediction reference picture into repeated shapes such as squares or rectangles or the partitioning may divide the prediction reference picture based on a partitioning technique such as k-d tree partitioning, bi-tree partitioning, or the like. For example, the partitioning technique may vary based on the type of modification (e.g., gain, blur, dominant motion, registration, super resolution, or projection trajectory, or the like). Motion data may be generated for a prediction partition of a current picture (e.g., a partition for prediction and not a partition of the prediction reference picture) based on a modified reference partition (e.g., a partition of the prediction reference picture modified based on the modified characteristic parameters). Such a motion estimation may be considered local based as it uses a modified partition of the prediction reference picture as opposed to a globally modified prediction reference picture. The predicted partition may be used as discussed elsewhere herein for coding. Further, in some examples, the local-based techniques may be repeated one or more times to generate two or more predicted partitions, which may be combined as discussed (e.g., via averaging or the like) to generate a final predicted partition. Further, the local based techniques may be performed using any of the modification techniques (e.g., gain, blur, dominant motion, registration, super resolution, or projection trajectory, or the like) as discussed herein.

While implementation of the example processes herein may include the undertaking of all operations shown in the order illustrated, the present disclosure is not limited in this regard and, in various examples, implementation of the example processes herein may include the undertaking of only a subset of the operations shown and/or in a different order than illustrated.

Various components of the systems described herein may be implemented in software, firmware, and/or hardware and/or any combination thereof. For example, various components of system 1400 may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the video systems as discussed herein.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

FIG. 14 is an illustrative diagram of example video coding system 1400, arranged in accordance with at least some implementations of the present disclosure. In the illustrated implementation, video coding system 1400 may include imaging device(s) 1401, video encoder 100, video decoder 200 (and/or a video coder implemented via logic circuitry 1450 of processing unit(s) 1420), an antenna 1402, one or more processor(s) 1403, one or more memory store(s) 1404, and/or a display device 1405.

As illustrated, imaging device(s) 1401, antenna 1402, processing unit(s) 1420, logic circuitry 1450, video encoder 100, video decoder 200, processor(s) 1403, memory store(s) 1404, and/or display device 1405 may be capable of communication with one another. As discussed, although illustrated with both video encoder 100 and video decoder 200, video coding system 1400 may include only video encoder 100 or only video decoder 200 in various examples. Further, although described with respect to video encoder and/or video decoder, system 1400 may, in some examples, implement video encoder 700 of FIG. 7 and/or decoder 800 of FIG. 8.

As shown, in some examples, video coding system 1400 may include antenna 1402. Antenna 1402 may be configured to transmit or receive an encoded bitstream of video data, for example. Further, in some examples, video coding system 1400 may include display device 1405. Display device 1405 may be configured to present video data. As shown, in some example, logic circuitry 1450 may be implemented via processing unit(s) 1420. Processing unit(s) 1420 may include application-specific integrated circuit (ASIC) logic, graphics processor(s), general purpose processor(s), or the like. Video coding system 1400 also may include optional processor(s) 1403, which may similarly include application-specific integrated circuit (ASIC) logic, graphics processor(s), general purpose processor(s), or the like. In some examples, logic circuitry 1450 may be implemented via hardware, video coding dedicated hardware, or the like, and processor(s) 1403 may implemented general purpose software, operating systems, or the like. In addition, memory store(s) 1404 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory store(s) 1404 may be implemented by cache memory. In some examples, logic circuitry 1450 may access memory store(s) 1404 (for implementation of an image buffer for example). In other examples, logic circuitry 1450 and/or processing unit(s) 1420 may include memory stores (e.g., cache or the like) for the implementation of an image buffer or the like.

In some examples, video encoder 100 implemented via logic circuitry may include an image buffer (e.g., via either processing unit(s) 1420 or memory store(s) 1404)) and a graphics processing unit (e.g., via processing unit(s) 1420). The graphics processing unit may be communicatively coupled to the image buffer. The graphics processing unit may include video encoder 100 (or encoder 700) as implemented via logic circuitry 1450 to embody the various modules as discussed with respect to FIGS. 1, 3, 5 and 8. For example, the graphics processing unit may include coding partitions generator logic circuitry, adaptive transform logic circuitry, content pre-analyzer, encode controller logic circuitry, adaptive entropy encoder logic circuitry, and so on.

The logic circuitry may be configured to perform the various operations as discussed herein. For example, the coding partitions generator logic circuitry may be configured to include an image buffer and a graphics processing unit including morphing analyzer and generation logic circuitry, synthesizing analyzer and generation logic circuitry, motion estimator logic circuitry, and characteristics and motion compensated filtering predictor logic circuitry, where the graphics processing unit may be communicatively coupled to the image buffer and where the morphing analyzer and generation logic circuitry may be configured to receive a first decoded prediction reference picture and generate, based at least in part on the first decoded prediction reference picture, a morphed prediction reference picture and morphing characteristic parameters associated with the morphed prediction reference picture, where the synthesizing analyzer and generation logic circuitry may be configured to receive a second decoded prediction reference picture and generate, based at least in part on the second decoded prediction reference picture, a synthesized prediction reference picture and synthesizing characteristic parameters associated with the synthesized prediction reference picture, where the motion estimator logic circuitry may be configured to generate motion data associated with a prediction partition of a current picture based at least in part on one of the morphed prediction reference picture or the synthesized prediction reference picture, and where the characteristics and motion compensated filtering predictor logic circuitry may be configured to perform motion compensation based at least in part on the motion data and at least one of the morphed prediction reference picture or the synthesized prediction reference picture to generate predicted partition data for the prediction partition. Video decoder 200 may be implemented in a similar manner.

In some examples, antenna 1402 of video coding system 1400 may be configured to receive an encoded bitstream of video data. Video coding system 1400 may also include video decoder 200 (or decoder 1800) coupled to antenna 1402 and configured to decode the encoded bitstream.

In an example embodiment, a decoder system may include video decoder 200 (or decoder 1800) configured to decode an encoded bitstream, where the video decoder may be configured to decode the encoded bitstream to determine first modified picture characteristic parameters, second modified picture characteristic parameters, and motion data associated with a prediction partition; generate a first decoded prediction reference picture and a second decoded prediction reference picture; generate at least a portion of a first modified prediction reference picture based at least in part on the first decoded prediction reference picture and the first modified picture characteristic parameters; generate at least a portion of a second modified prediction reference picture based at least in part on the second decoded prediction reference picture and the first modified picture characteristic parameters, where the second modified reference picture may be of a different type than the first modified reference picture; perform motion compensation based at least in part on the motion data and at least one of the portion of the first modified prediction reference picture or the portion of the second modified prediction reference picture to generate decoded predicted partition data associated with the prediction partition; add the decoded predicted partition data to decoded prediction partition error data to generate a first reconstructed prediction partition; and assemble the first reconstructed partition and a second reconstructed partition to generate at least one of a tile or a super-fragment.

In embodiments, features described herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more features described herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the features described herein.

Figure 15:
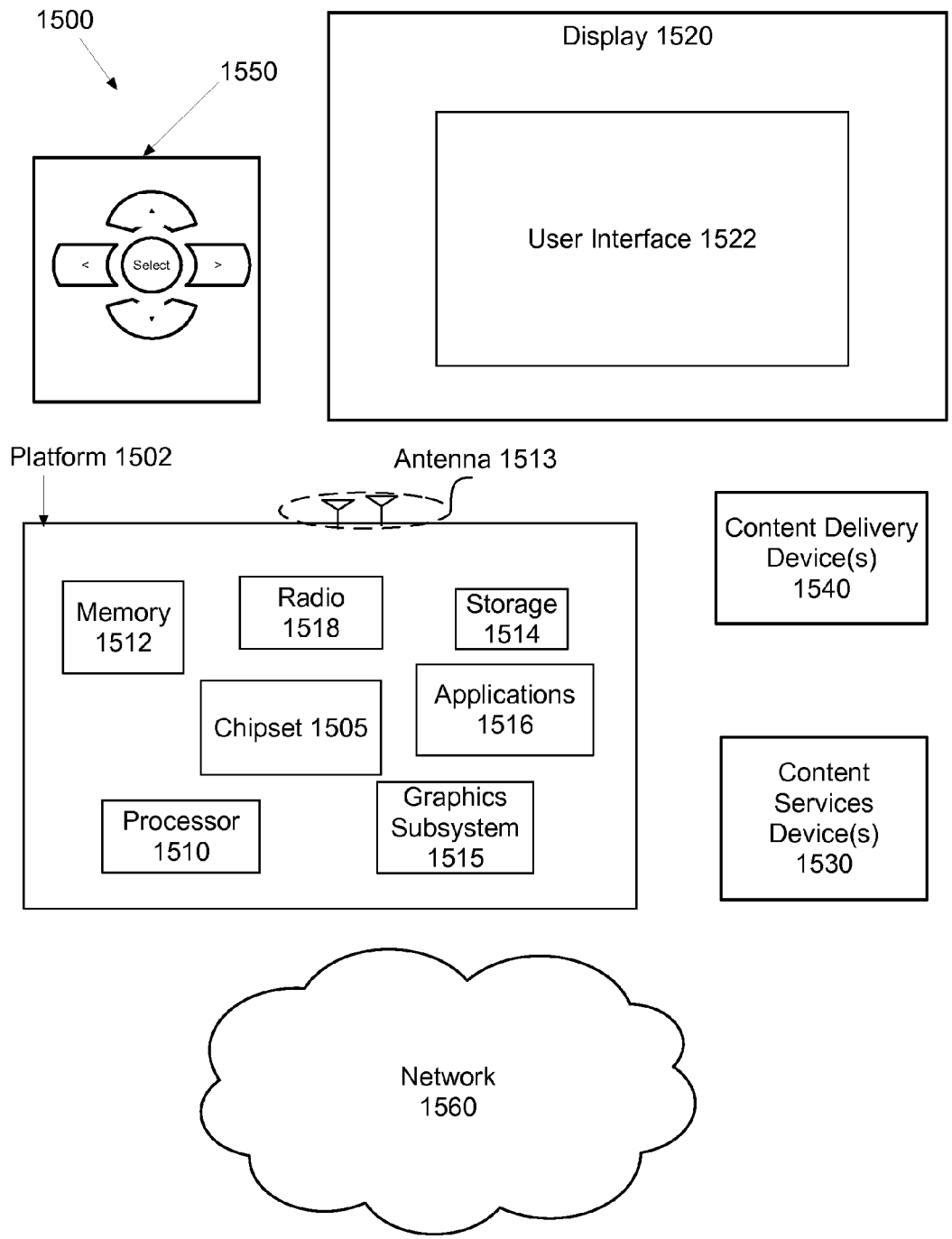
FIG. 15 is an illustrative diagram of an example system.

FIG. 15 is an illustrative diagram of an example system 1500, arranged in accordance with at least some implementations of the present disclosure. In various implementations, system 1500 may be a media system although system 1500 is not limited to this context. For example, system 1500 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 1500 includes a platform 1502 coupled to a display 1520. Platform 1502 may receive content from a content device such as content services device(s) 1530 or content delivery device(s) 1540 or other similar content sources. A navigation controller 1550 including one or more navigation features may be used to interact with, for example, platform 1502 and/or display 1520. Each of these components is described in greater detail below.

In various implementations, platform 1502 may include any combination of a chipset 1505, processor 1510, memory 1512, antenna 1513, storage 1514, graphics subsystem 1515, applications 1516 and/or radio 1518. Chipset 1505 may provide intercommunication among processor 1510, memory 1512, storage 1514, graphics subsystem 1515, applications 1516 and/or radio 1518. For example, chipset 1505 may include a storage adapter (not depicted) capable of providing intercommunication with storage 1514.

Processor 1510 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1510 may be dual-core processor(s), dual-core mobile processor(s), and so forth.

Memory 1512 may be implemented as a volatile memory device such as, but not limited to, a Random Access Memory (RAM), Dynamic Random Access Memory (DRAM), or Static RAM (SRAM).

Storage 1514 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1514 may include technology to increase the storage performance enhanced protection for valuable digital media when multiple hard drives are included, for example.

Graphics subsystem 1515 may perform processing of images such as still or video for display. Graphics subsystem 1515 may be a graphics processing unit (GPU) or a visual processing unit (VPU), for example. An analog or digital interface may be used to communicatively couple graphics subsystem 1515 and display 1520. For example, the interface may be any of a High-Definition Multimedia Interface, DisplayPort, wireless HDMI, and/or wireless HD compliant techniques. Graphics subsystem 1515 may be integrated into processor 1510 or chipset 1505. In some implementations, graphics subsystem 1515 may be a stand-alone device communicatively coupled to chipset 1505.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1518 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1518 may operate in accordance with one or more applicable standards in any version.

In various implementations, display 1520 may include any television type monitor or display. Display 1520 may include, for example, a computer display screen, touch screen display, video monitor, television-like device, and/or a television. Display 1520 may be digital and/or analog. In various implementations, display 1520 may be a holographic display. Also, display 1520 may be a transparent surface that may receive a visual projection. Such projections may convey various forms of information, images, and/or objects. For example, such projections may be a visual overlay for a mobile augmented reality (MAR) application. Under the control of one or more software applications 1516, platform 1502 may display user interface 1522 on display 1520.

In various implementations, content services device(s) 1530 may be hosted by any national, international and/or independent service and thus accessible to platform 1502 via the Internet, for example. Content services device(s) 1530 may be coupled to platform 1502 and/or to display 1520. Platform 1502 and/or content services device(s) 1530 may be coupled to a network 1560 to communicate (e.g., send and/or receive) media information to and from network 1560. Content delivery device(s) 1540 also may be coupled to platform 1502 and/or to display 1520.

In various implementations, content services device(s) 1530 may include a cable television box, personal computer, network, telephone, Internet enabled devices or appliance capable of delivering digital information and/or content, and any other similar device capable of unidirectionally or bidirectionally communicating content between content providers and platform 1502 and/display 1520, via network 1560 or directly. It will be appreciated that the content may be communicated unidirectionally and/or bidirectionally to and from any one of the components in system 1500 and a content provider via network 1560. Examples of content may include any media information including, for example, video, music, medical and gaming information, and so forth.

Content services device(s) 1530 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1502 may receive control signals from navigation controller 1550 having one or more navigation features. The navigation features of controller 1550 may be used to interact with user interface 1522, for example. In various embodiments, navigation controller 1550 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1550 may be replicated on a display (e.g., display 1520) by movements of a pointer, cursor, focus ring, or other visual indicators displayed on the display. For example, under the control of software applications 1516, the navigation features located on navigation controller 1550 may be mapped to virtual navigation features displayed on user interface 1522. In various embodiments, controller 1550 may not be a separate component but may be integrated into platform 1502 and/or display 1520. The present disclosure, however, is not limited to the elements or in the context shown or described herein.

In various implementations, drivers (not shown) may include technology to enable users to instantly turn on and off platform 1502 like a television with the touch of a button after initial boot-up, when enabled, for example. Program logic may allow platform 1502 to stream content to media adaptors or other content services device(s) 1530 or content delivery device(s) 1540 even when the platform is turned "off." In addition, chipset 1505 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 1500 may be integrated. For example, platform 1502 and content services device(s) 1530 may be integrated, or platform 1502 and content delivery device(s) 1540 may be integrated, or platform 1502, content services device(s) 1530, and content delivery device(s) 1540 may be integrated, for example. In various embodiments, platform 1502 and display 1520 may be an integrated unit. Display 1520 and content service device(s) 1530 may be integrated, or display 1520 and content delivery device(s) 1540 may be integrated, for example. These examples are not meant to limit the present disclosure.

In various embodiments, system 1500 may be implemented as a wireless system, a wired system, or a combination of both. When implemented as a wireless system, system 1500 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1500 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1502 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 15.

Figure 16:
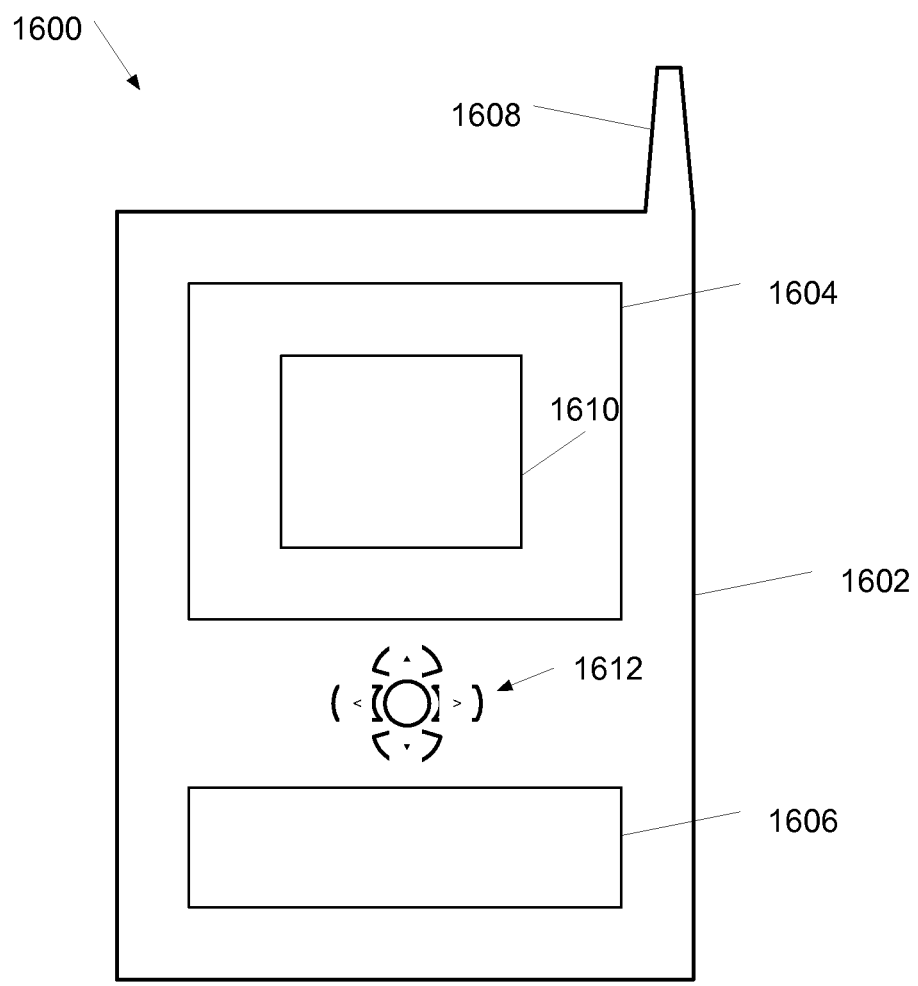
FIG. 16 illustrates an example device, all arranged in accordance with at least some implementations of the present disclosure.

As described above, system 1500 may be embodied in varying physical styles or form factors. FIG. 16 illustrates implementations of a small form factor device 1600 in which system 1600 may be embodied. In various embodiments, for example, device 1600 may be implemented as a mobile computing device a having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 16, device 1600 may include a housing 1602, a display 1604 which may include a user interface 1610, an input/output (I/O) device 1606, and an antenna 1608. Device 1600 also may include navigation features 1612. Display 1604 may include any suitable display unit for displaying information appropriate for a mobile computing device. I/O device 1606 may include any suitable I/O device for entering information into a mobile computing device. Examples for I/O device 1606 may include an alphanumeric keyboard, a numeric keypad, a touch pad, input keys, buttons, switches, rocker switches, microphones, speakers, voice recognition device and software, and so forth. Information also may be entered into device 1600 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further embodiments.

In one example, a computer-implemented method for video coding may include generating a first decoded prediction reference picture and a second decoded prediction reference picture; generating, based at least in part on the first decoded prediction reference picture, a first modified prediction reference picture and first modifying characteristic parameters associated with the first modified prediction reference picture; generating, based at least in part on the second decoded prediction reference picture, a second modified prediction reference picture and second modifying characteristic parameters associated with the second modified prediction reference picture, where the second modified reference picture is of a different type than the first modified reference picture; generating motion data associated with a prediction partition of a current picture based at least in part on one of the first modified prediction reference picture or the second modified prediction reference picture; and performing motion compensation based at least in part on the motion data and at least one of the first modified prediction reference picture or the second modified prediction reference picture to generate prediction partition data for the prediction partition.

In another example, a computer-implemented method for video coding may include generating a first decoded prediction reference picture and a second decoded prediction reference picture; generating, based at least in part on the first decoded prediction reference picture, a first modified prediction reference picture and first modifying characteristic parameters associated with the first modified prediction reference picture; generating, based at least in part on the second decoded prediction reference picture, a second modified prediction reference picture and second modifying characteristic parameters associated with the first modified prediction reference picture, where the second modified reference picture is of a different type than the first modified reference picture; generating motion data associated with a prediction partition of a current picture based at least in part on one of the first modified prediction reference picture or the second modified prediction reference picture; performing motion compensation based at least in part on the motion data and at least one of the first modified prediction reference picture or the second modified prediction reference picture to generate prediction partition data for the prediction partition; generating second motion data associated with the prediction partition of the current picture based at least in part on the second modified prediction reference picture such that generating the motion data may include generating the motion data based at least in part on the first modified prediction reference picture; performing a second motion compensation based at least in part on the second motion data and the second modified prediction reference picture to generate second predicted partition data for the prediction partition such that performing the motion compensation may include performing the motion compensation based at least in part on the first modified prediction reference picture; combining the predicted partition data and the second predicted partition data to generate final predicted partition data for the prediction partition such that combining the predicted partition data and the second predicted partition data may include averaging the predicted partition data and the second predicted partition data; differencing the prediction partition data or the final predicted partition with original pixel data associated with the prediction partition to generate a prediction error data partition; partitioning the prediction error data partition to generate a plurality of coding partitions; performing a forward transform on the plurality of coding partitions to generate transform coefficients associated with the plurality of coding partitions; quantizing the transform coefficients to generate quantized transform coefficients; entropy encoding the quantized transform coefficients, the first modifying characteristic parameters, the second modifying characteristic parameters, the motion data, and a mode associated with the prediction partition into a bitstream; transmitting the bitstream; receiving the bitstream; entropy decoding the bitstream to determine the quantized transform coefficients, the first modifying characteristic parameters, the second modifying characteristic parameters, the motion data, and the mode associated with the prediction partition; performing an inverse quantization based at least in part on the quantized transform coefficients to generate decoded transform coefficients; performing an inverse transform based at least in part on the decoded transform coefficients to generate a plurality of decoded coding partitions; assembling the plurality of decoded coding partitions to generate a decoded prediction error data partition; generating a third decoded prediction reference picture and a fourth decoded prediction reference picture; generating at least a portion of a third modified prediction reference picture based at least in part on the third modifying characteristic parameters; generating at least a portion a fourth modified prediction reference picture based at least in part on the second modifying characteristic parameters associated; performing motion compensation based at least in part on the motion data and at least one of the portion of the third modified prediction reference picture or the portion of the fourth modified prediction reference picture to generate decoded prediction partition data; adding the decoded prediction partition data to the decoded prediction error data partition to generate a first reconstructed prediction partition; assembling the first reconstructed prediction partition and a second reconstructed prediction partition to generate at least one of a first tile or a first super-fragment; applying at least one of a deblock filtering or a quality restoration filtering to the first tile or the first super-fragment to generate a first final decoded tile or super-fragment; assembling the first final decoded tile or super-fragment and a second final decoded tile or super-fragment to generate a decoded video frame; transmitting the decoded video frame for presentment via a display device; generating second motion data associated with a second prediction partition of the current picture based at least in part the first decoded prediction reference picture, the second decoded prediction reference picture, or a third decoded prediction reference picture; generating third motion data associated with a third prediction partition of the current picture further based at least in part on decoded prediction reference pictures and modified prediction reference pictures totaling ten prediction reference pictures, where the current picture comprises a P-picture; and generating fourth motion data associated with a fourth prediction partition of the current picture further based at least in part on decoded prediction reference pictures and modified prediction reference pictures totaling eleven prediction reference pictures, where the current picture includes an F/B-picture; the first modified prediction reference picture includes at least one of a morphed prediction reference picture, a synthesized prediction reference picture, a gain modified prediction reference picture, a blur modified prediction reference picture, a dominant motion modified prediction reference picture, a registration modified prediction reference picture, a super resolution prediction reference picture, or a projection trajectory prediction reference picture; the first modified prediction reference picture includes a morphed prediction reference picture and the second modified prediction reference picture includes a synthesized prediction reference picture; the morphed prediction reference picture includes at least one of a gain modified prediction reference picture, a blur modified prediction reference picture, a dominant motion modified prediction reference picture, or a registration modified prediction reference picture; the synthesized prediction reference picture includes at least one of a super resolution prediction reference picture or a projection trajectory prediction reference picture; the first decoded prediction reference picture includes at least one of a past decoded prediction reference picture or a future decoded prediction reference picture; and the motion data includes a motion vector.

In another example, a computer-implemented method for video coding may include generating a decoded prediction reference picture; generating modifying characteristic parameters associated with a modification partitioning of the decoded prediction reference picture; generating motion data associated with a prediction partition of a current picture based at least in part on a modified reference partition generated based at least in part on the decoded prediction reference picture and the modifying characteristic parameters; and performing motion compensation based at least in part on the motion data and the modified reference partition to generate predicted partition data for the prediction partition.

In another example, a computer-implemented method for video coding may include generating a decoded prediction reference picture; generating modifying characteristic parameters associated with a modification partitioning of the decoded prediction reference picture; generating motion data associated with a prediction partition of a current picture based at least in part on a modified reference partition generated based at least in part on the decoded prediction reference picture and the modifying characteristic parameters; performing motion compensation based at least in part on the motion data and the modified reference partition to generate predicted partition data for the prediction partition; generating second modifying characteristic parameters associated with a second modification partitioning of the decoded prediction reference picture such that the modification partitioning and the second modification partitioning comprise different partitionings; generating second motion data associated with the prediction partition of the current picture based at least in part on a second modified reference partition generated based at least in part on the decoded prediction reference picture and the second modifying characteristic parameters; performing a second motion compensation based at least in part on the motion data and the second modified reference partition to generate second predicted partition data for the prediction partition; and combining the predicted partition data and the second predicted partition data to generate final predicted partition data for the prediction partition such that combining the predicted partition data and the second predicted partition data may include averaging the predicted partition data and the second predicted partition data. The modifying characteristic parameters may include at least one of morphing characteristic parameters, synthesizing characteristic parameters, gain characteristic parameters, blur characteristic parameters, dominant motion characteristic parameters, registration characteristic parameters, super resolution characteristic parameters, or projection trajectory characteristic parameters. The second modifying characteristic parameters may include at least one of morphing characteristic parameters, synthesizing characteristic parameters, gain characteristic parameters, blur characteristic parameters, dominant motion characteristic parameters, registration characteristic parameters, super resolution characteristic parameters, or projection trajectory characteristic parameters.

In a further example, a video encoder may include an image buffer; a graphics processing unit including morphing analyzer and generation logic circuitry, synthesizing analyzer and generation logic circuitry, motion estimator logic circuitry, and characteristics and motion compensated filtering predictor logic circuitry, where the graphics processing unit may be communicatively coupled to the image buffer and the morphing analyzer and generation logic circuitry may be configured to receive a first decoded prediction reference picture and generate, based at least in part on the first decoded prediction reference picture, a morphed prediction reference picture and morphing characteristic parameters associated with the morphed prediction reference picture, where the synthesizing analyzer and generation logic circuitry may be configured to receive a second decoded prediction reference picture and generate, based at least in part on the second decoded prediction reference picture, a synthesized prediction reference picture and synthesizing characteristic parameters associated with the synthesized prediction reference picture, where the motion estimator logic circuitry may be configured to generate motion data associated with a prediction partition of a current picture based at least in part on one of the morphed prediction reference picture or the synthesized prediction reference picture, and where the characteristics and motion compensated filtering predictor logic circuitry may be configured to perform motion compensation based at least in part on the motion data and at least one of the morphed prediction reference picture or the synthesized prediction reference picture to generate prediction partition data for the prediction partition.

In an additional example, this graphics processing unit may further include a differencer configured to difference the prediction partition data with original pixel data associated with the prediction partition to generate a prediction error data partition; coding partitions logic circuitry configured to partition the prediction error data partition to generate a plurality of coding partitions; adaptive transform logic circuitry configured to perform a forward transform on the plurality of coding partitions to generate transform coefficients associated with the plurality of coding partitions; adaptive quantize logic circuitry configured to quantize the transform coefficients to generate quantized transform coefficients; and adaptive entropy encoder logic circuitry configured to entropy encode the quantized transform coefficients, the morphing characteristic parameters, the synthesizing characteristic parameters, the motion data, and a mode associated with the prediction partition into a bitstream and transmit the bitstream; where the motion estimator logic circuitry is further configured to generate second motion data associated with a second prediction partition of the current picture based at least in part the first decoded prediction reference picture, the second decoded prediction reference picture, or a third decoded prediction reference picture, generate third motion data associated with a third prediction partition of the current picture further based at least in part on decoded prediction reference pictures and modified prediction reference pictures totaling ten prediction reference pictures (where the current picture includes a P-picture), and generate fourth motion data associated with a fourth prediction partition of the current picture further based at least in part on decoded prediction reference pictures and modified prediction reference pictures totaling eleven prediction reference pictures (where the current picture includes an F/B-picture), where the morphed prediction reference picture includes at least one of a gain modified prediction reference picture, a blur modified prediction reference picture, a dominant motion modified prediction reference picture, or a registration modified prediction reference picture, where the synthesized prediction reference picture includes at least one of a super resolution prediction reference picture or a projection trajectory prediction reference picture, and where the first decoded prediction reference picture includes at least one of a past decoded prediction reference picture or a future decoded prediction reference picture.

In yet an additional example, a decoder system may include an antenna configured to receive an encoded bitstream of video data and a video decoder communicatively coupled to the antenna and configured to decode the encoded bitstream, where the video decoder is configured to decode the encoded bitstream to determine first modified picture characteristic parameters, second modified picture characteristic parameters, and motion data associated with a prediction partition; generate a first decoded prediction reference picture and a second decoded prediction reference picture; generate at least a portion of a first modified prediction reference picture based at least in part on the first decoded prediction reference picture and the first modified picture characteristic parameters; generate at least a portion of a second modified prediction reference picture based at least in part on the second decoded prediction reference picture and the second modified picture characteristic parameters (where the second modified reference picture is of a different type than the first modified reference picture); perform motion compensation based at least in part on the motion data and at least one of the portion of the first modified prediction reference picture or the portion of the second modified prediction reference picture to generate decoded prediction partition data associated with the prediction partition; add the decoded prediction partition data to decoded prediction partition error data to generate a first reconstructed prediction partition; and assemble the first reconstructed partition and a second reconstructed partition to generate at least one of a tile or a super-fragment.

In a further additional example, this decoder system may further include a display device configured to present video frames, where the video decoder is further configured to decode the encoded bitstream to determine quantized transform coefficients associated with prediction error data for the prediction partition and a mode associated with the prediction partition; perform an inverse quantization based at least in part on the quantized transform coefficients to generate decoded transform coefficients; perform an inverse transform based at least in part on the decoded transform coefficients to generate a plurality of decoded coding partitions; assemble the plurality of decoded coding partitions to generate the prediction partition error data associated with the prediction partition; apply at least one of a deblock filtering or a quality restoration filtering to the tile or the first super-fragment to generate a first final decoded tile or super-fragment; assemble the first final decoded tile or super-fragment and a second final decoded tile or super-fragment to generate a decoded video frame; and transmit the decoded video frame for presentment via a display device, where the first modified prediction reference picture includes at least one of a morphed prediction reference picture, a synthesized prediction reference picture, a gain modified prediction reference picture, a blur modified prediction reference picture, a dominant motion modified prediction reference picture, a registration modified prediction reference picture, a super resolution prediction reference picture, or a projection trajectory prediction reference picture, where the first modified prediction reference picture includes a morphed prediction reference picture and the second modified prediction reference picture includes a synthesized prediction reference picture, where the morphed prediction reference picture includes at least one of a gain modified prediction reference picture, a blur modified prediction reference picture, a dominant motion modified prediction reference picture, or a registration modified prediction reference picture, where the synthesized prediction reference picture includes at least one of a super resolution prediction reference picture or a projection trajectory prediction reference picture, where the first decoded prediction reference picture includes at least one of a past decoded prediction reference picture or a future decoded prediction reference picture, and where the motion data comprises a motion vector.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, such the above examples are not limited in this regard and, in various implementations, the above examples may include the undertaking only a subset of such features, undertaking a different order of such features, undertaking a different combination of such features, and/or undertaking additional features than those features explicitly listed. For example, all features described with respect to the example methods may be implemented with respect to the example apparatus, the example systems, and/or the example articles, and vice versa.

What is claimed:

1. A computer-implemented method for video coding, comprising:
    generating a first decoded prediction reference picture and a second decoded prediction reference picture;
    generating, based at least in part on the first decoded prediction reference picture, a first modified prediction reference picture and first modifying characteristic parameters associated with the first modified prediction reference picture;
    generating, based at least in part on the second decoded prediction reference picture, a second modified prediction reference picture and second modifying characteristic parameters associated with the second modified prediction reference picture, wherein the second modified reference picture is of a different type than the first modified reference picture;
    generating motion data associated with a prediction partition of a current picture based at least in part on one of the first modified prediction reference picture or the second modified prediction reference picture; and
    performing motion compensation based at least in part on the motion data and at least one of the first modified prediction reference picture or the second modified prediction reference picture to generate predicted partition data for the prediction partition.

2. The method of claim 1, further comprising:
    differencing the predicted partition data with original pixel data associated with the prediction partition to generate a prediction error data partition;
    partitioning the prediction error data partition to generate a plurality of coding partitions;
    performing a forward transform on the plurality of coding partitions to generate transform coefficients associated with the plurality of coding partitions;
    quantizing the transform coefficients to generate quantized transform coefficients; and
    entropy encoding the quantized transform coefficients, the first modifying characteristic parameters, the second modifying characteristic parameters, the motion data, and a mode associated with the prediction partition into a bitstream.

3. The method of claim 1, wherein the first modified prediction reference picture comprises a morphed prediction reference picture and the second modified prediction reference picture comprises a synthesized prediction reference picture.

4. The method of claim 1, wherein the first modified prediction reference picture comprises at least one of a gain modified prediction reference picture, a blur modified prediction reference picture, a dominant motion modified prediction reference picture, or a registration modified prediction reference picture.

5. The method of claim 1, wherein the first modified prediction reference picture comprises at least one of a super resolution prediction reference picture or a projection trajectory prediction reference picture.

6. The method of claim 1, wherein the first modified prediction reference picture comprises at least one of a gain modified prediction reference picture, a blur modified prediction reference picture, a dominant motion modified prediction reference picture, or a registration modified prediction reference picture and wherein the second modified prediction reference picture comprises at least one of a super resolution prediction reference picture or a projection trajectory prediction reference picture.

7. The method of claim 1, wherein the first decoded prediction reference picture comprises at least one of a past decoded prediction reference picture or a future decoded prediction reference picture.

8. The method of claim 1, further comprising:
generating, based at least in part on the first decoded prediction reference picture, a third modified prediction reference picture and third modifying characteristic parameters associated with the third modified prediction reference picture; and
generating second motion data associated with a second prediction partition of the current picture based at least in part on one of the third modified prediction reference picture.

9. The method of claim 1, further comprising:
generating, based at least in part on the first decoded prediction reference picture, a third modified prediction reference picture and third modifying characteristic parameters associated with the third modified prediction reference picture; and
generating second motion data associated with a second prediction partition of the current picture based at least in part on one of the third modified prediction reference picture, wherein the first modified prediction reference picture comprises a gain modified prediction reference picture, the second modified prediction reference picture comprises a blur modified prediction reference picture, and the third modified prediction reference picture comprises a super resolution prediction reference picture.

10. The method of claim 1, further comprising:
generating second motion data associated with the prediction partition of the current picture based at least in part on the second modified prediction reference picture, wherein generating the motion data comprises generating the motion data based at least in part on the first modified prediction reference picture;
performing a second motion compensation based at least in part on the second motion data and the second modified prediction reference picture to generate second predicted partition data for the prediction partition, wherein performing the motion compensation comprises performing the motion compensation based at least in part on the first modified prediction reference picture; and
combining the predicted partition data and the second predicted partition data to generate final predicted partition data for the prediction partition, wherein combining the predicted partition data and the second predicted partition data comprises averaging the predicted partition data and the second predicted partition data.

11. The method of claim 1, further comprising:
generating second motion data associated with the prediction partition of the current picture based at least in part on the second modified prediction reference picture, wherein generating the motion data comprises generating the motion data based at least in part on the first modified prediction reference picture;
performing a second motion compensation based at least in part on the second motion data and the second modified prediction reference picture to generate second predicted partition data for the prediction partition, wherein performing the motion compensation comprises performing the motion compensation based at least in part on the first modified prediction reference picture;
combining the predicted partition data and the second predicted partition data to generate final predicted partition data for the prediction partition, wherein combining the predicted partition data and the second predicted partition data comprises averaging the predicted partition data and the second predicted partition data;
differencing the predicted partition data or the final predicted partition with original pixel data associated with the prediction partition to generate a prediction error data partition;
partitioning the prediction error data partition to generate a plurality of coding partitions;
performing a forward transform on the plurality of coding partitions to generate transform coefficients associated with the plurality of coding partitions;
quantizing the transform coefficients to generate quantized transform coefficients;
entropy encoding the quantized transform coefficients, the first modifying characteristic parameters, the second modifying characteristic parameters, the motion data, and a mode associated with the prediction partition into a bitstream;
transmitting the bitstream;
receiving the bitstream;
entropy decoding the bitstream to determine the quantized transform coefficients, the first modifying characteristic parameters, the second modifying characteristic parameters, the motion data, and the mode associated with the prediction partition;
performing an inverse quantization based at least in part on the quantized transform coefficients to generate decoded transform coefficients;
performing an inverse transform based at least in part on the decoded transform coefficients to generate a plurality of decoded coding partitions;
assembling the plurality of decoded coding partitions to generate a decoded prediction error data partition;
generating a third decoded prediction reference picture and a fourth decoded prediction reference picture;
generating at least a portion of a third modified prediction reference picture based at least in part on the first modifying characteristic parameters;
generating at least a portion a fourth modified prediction reference picture based at least in part on the second modifying characteristic parameters associated; and
performing motion compensation based at least in part on the motion data and at least one of the portion of the third modified prediction reference picture or the portion of the fourth modified prediction reference picture to generate decoded predicted partition data;
adding the decoded predicted partition data to the decoded prediction error data partition to generate a first reconstructed prediction partition;
assembling the first reconstructed prediction partition and a second reconstructed prediction partition to generate at least one of a first tile or a first super-fragment;

applying at least one of a deblock filtering or a quality restoration filtering to the first tile or the first super-fragment to generate a first final decoded tile or super-fragment;

assembling the first final decoded tile or super-fragment and a second final decoded tile or super-fragment to generate a decoded video frame;

transmitting the decoded video frame for presentment via a display device;

generating second motion data associated with a second prediction partition of the current picture based at least in part the first decoded prediction reference picture, the second decoded prediction reference picture, or a third decoded prediction reference picture;

generating third motion data associated with a third prediction partition of the current picture further based at least in part on decoded prediction reference pictures and modified prediction reference pictures totaling ten prediction reference pictures, wherein the current picture comprises a P-picture; and generating fourth motion data associated with a fourth prediction partition of the current picture further based at least in part on decoded prediction reference pictures and modified prediction reference pictures totaling eleven prediction reference pictures, wherein the current picture comprises an F/B-picture, wherein the first modified prediction reference picture comprises at least one of a morphed prediction reference picture, a synthesized prediction reference picture, a gain modified prediction reference picture, a blur modified prediction reference picture, a dominant motion modified prediction reference picture, a registration modified prediction reference picture, a super resolution prediction reference picture, or a projection trajectory prediction reference picture, wherein the first modified prediction reference picture comprises a morphed prediction reference picture and the second modified prediction reference picture comprises a synthesized prediction reference picture, wherein the morphed prediction reference picture comprises at least one of a gain modified prediction reference picture, a blur modified prediction reference picture, a dominant motion modified prediction reference picture, or a registration modified prediction reference picture, wherein the synthesized prediction reference picture comprises at least one of a super resolution prediction reference picture or a projection trajectory prediction reference picture, wherein the first decoded prediction reference picture comprises at least one of a past decoded prediction reference picture or a future decoded prediction reference picture, and wherein the motion data comprises a motion vector.

12. A computer-implemented method for video coding, comprising:

generating a decoded prediction reference picture;

generating modifying characteristic parameters associated with a modification partitioning of the decoded prediction reference picture;

generating motion data associated with a prediction partition of a current picture based at least in part on a modified reference partition generated based at least in part on the decoded prediction reference picture and the modifying characteristic parameters; and performing motion compensation based at least in part on the motion data and the modified reference partition to generate predicted partition data for the prediction partition.

13. The method of claim 12, wherein the modifying characteristic parameters comprise at least one of morphing characteristic parameters or synthesizing characteristic parameters.

14. The method of claim 12, wherein the modifying characteristic parameters comprise at least one of gain characteristic parameters, blur characteristic parameters, dominant motion characteristic parameters, registration characteristic parameters, super resolution characteristic parameters, or projection trajectory characteristic parameters.

15. The method of claim 12, further comprising:

generating second modifying characteristic parameters associated with a second modification partitioning of the decoded prediction reference picture, wherein the modification partitioning and the second modification partitioning comprise different partitionings;

generating second motion data associated with the prediction partition of the current picture based at least in part on a second modified reference partition generated based at least in part on the decoded prediction reference picture and the second modifying characteristic parameters;

performing a second motion compensation based at least in part on the motion data and the second modified reference partition to generate second predicted partition data for the prediction partition; and combining the predicted partition data and the second predicted partition data to generate final predicted partition data for the prediction partition.

16. The method of claim 12, further comprising:

generating second modifying characteristic parameters associated with a second modification partitioning of the decoded prediction reference picture, wherein the modification partitioning and the second modification partitioning comprise different partitionings, and wherein the modified characteristics parameters comprise morphing characteristics parameters and the second modified characteristics parameters comprise synthesizing characteristics parameters;

generating second motion data associated with the prediction partition of the current picture based at least in part on a second modified reference partition generated based at least in part on the decoded prediction reference picture and the second modifying characteristic parameters;

performing a second motion compensation based at least in part on the motion data and the second modified reference partition to generate second predicted partition data for the prediction partition; and averaging the predicted partition data and the second predicted partition data to generate final predicted partition data for the prediction partition.

17. The method of claim 12, further comprising:

generating second modifying characteristic parameters associated with a second modification partitioning of the decoded prediction reference picture, wherein the modification partitioning and the second modification partitioning comprise different partitionings;

generating second motion data associated with the prediction partition of the current picture based at least in part on a second modified reference partition generated based at least in part on the decoded prediction reference picture and the second modifying characteristic parameters;
performing a second motion compensation based at least in part on the motion data and the second modified reference partition to generate second predicted partition data for the prediction partition; and
combining the predicted partition data and the second predicted partition data to generate final predicted partition data for the prediction partition, wherein combining the predicted partition data and the second predicted partition data comprises averaging the predicted partition data and the second predicted partition data,
wherein the modifying characteristic parameters comprise at least one of morphing characteristic parameters, synthesizing characteristic parameters, gain characteristic parameters, blur characteristic parameters, dominant motion characteristic parameters, registration characteristic parameters, super resolution characteristic parameters, or projection trajectory characteristic parameters, and
wherein the second modifying characteristic parameters comprise at least one of morphing characteristic parameters, synthesizing characteristic parameters, gain characteristic parameters, blur characteristic parameters, dominant motion characteristic parameters, registration characteristic parameters, super resolution characteristic parameters, or projection trajectory characteristic parameters.

18. A video encoder comprising:
an image buffer; and
a graphics processing unit comprising morphing analyzer and generation logic circuitry, synthesizing analyzer and generation logic circuitry, motion estimator logic circuitry, and characteristics and motion compensated filtering predictor logic circuitry, wherein the graphics processing unit is communicatively coupled to the image buffer and wherein the morphing analyzer and generation logic circuitry is configured to:
  receive a first decoded prediction reference picture; and
  generate, based at least in part on the first decoded prediction reference picture, a morphed prediction reference picture and morphing characteristic parameters associated with the morphed prediction reference picture,
wherein the synthesizing analyzer and generation logic circuitry is configured to:
  receive a second decoded prediction reference picture; and
  generate, based at least in part on the second decoded prediction reference picture, a synthesized prediction reference picture and synthesizing characteristic parameters associated with the synthesized prediction reference picture,
wherein the motion estimator logic circuitry is configured to:
  generate motion data associated with a prediction partition of a current picture based at least in part on one of the morphed prediction reference picture or the synthesized prediction reference picture, and
wherein the characteristics and motion compensated filtering predictor logic circuitry is configured to:
  perform motion compensation based at least in part on the motion data and at least one of the morphed prediction reference picture or the synthesized prediction reference picture to generate predicted partition data for the prediction partition.

19. The video encoder of claim 18, the graphics processing unit further comprising:
a differencer configured to:
  difference the predicted partition data with original pixel data associated with the prediction partition to generate a prediction error data partition;
coding partitions logic circuitry configured to:
  partition the prediction error data partition to generate a plurality of coding partitions;
adaptive transform logic circuitry configured to:
  perform a forward transform on the plurality of coding partitions to generate transform coefficients associated with the plurality of coding partitions;
adaptive quantize logic circuitry configured to:
  quantize the transform coefficients to generate quantized transform coefficients;
adaptive entropy encoder logic circuitry configured to:
  entropy encode the quantized transform coefficients, the morphing characteristic parameters, the synthesizing characteristic parameters, the motion data, and a mode associated with the prediction partition into a bitstream; and
  transmit the bitstream,
wherein the motion estimator logic circuitry is further configured to:
  generate second motion data associated with a second prediction partition of the current picture based at least in part the first decoded prediction reference picture, the second decoded prediction reference picture, or a third decoded prediction reference picture;
  generate third motion data associated with a third prediction partition of the current picture further based at least in part on decoded prediction reference pictures and modified prediction reference pictures totaling ten prediction reference pictures, wherein the current picture comprises a P-picture; and
  generate fourth motion data associated with a fourth prediction partition of the current picture further based at least in part on decoded prediction reference pictures and modified prediction reference pictures totaling eleven prediction reference pictures, wherein the current picture comprises an F/B-picture,
wherein the morphed prediction reference picture comprises at least one of a gain modified prediction reference picture, a blur modified prediction reference picture, a dominant motion modified prediction reference picture, or a registration modified prediction reference picture,
wherein the synthesized prediction reference picture comprises at least one of a super resolution prediction reference picture or a projection trajectory prediction reference picture, and
wherein the first decoded prediction reference picture comprises at least one of a past decoded prediction reference picture or a future decoded prediction reference picture.

20. A decoder system comprising:
a video decoder configured to decode an encoded bitstream, wherein the video decoder is configured to:
  decode the encoded bitstream to determine first modified picture characteristic parameters, second modified picture characteristic parameters, and motion data associated with a prediction partition;

generate a first decoded prediction reference picture and a second decoded prediction reference picture;

generate at least a portion of a first modified prediction reference picture based at least in part on the first decoded prediction reference picture and the first modified picture characteristic parameters;

generate at least a portion of a second modified prediction reference picture based at least in part on the second decoded prediction reference picture and the second modified picture characteristic parameters, wherein the second modified reference picture is of a different type than the first modified reference picture;

perform motion compensation based at least in part on the motion data and at least one of the portion of the first modified prediction reference picture or the portion of the second modified prediction reference picture to generate decoded predicted partition data associated with the prediction partition;

add the decoded predicted partition data to decoded prediction partition error data to generate a first reconstructed prediction partition; and assemble the first reconstructed partition and a second reconstructed partition to generate at least one of a tile or a super-fragment.

21. The decoder system of claim 20, further comprising:

an antenna communicatively coupled to the antenna and configured to receive the encoded bitstream of video data; and a display device configured to present video frames, wherein the video decoder is further configured to:

decode the encoded bitstream to determine quantized transform coefficients associated with prediction error data for the prediction partition and a mode associated with the prediction partition;

perform an inverse quantization based at least in part on the quantized transform coefficients to generate decoded transform coefficients;

perform an inverse transform based at least in part on the decoded transform coefficients to generate a plurality of decoded coding partitions;

assemble the plurality of decoded coding partitions to generate the ed prediction partition error data associated with the prediction partition;

apply at least one of a deblock filtering or a quality restoration filtering to the tile or the first super-fragment to generate a first final decoded tile or super-fragment;

assemble the first final decoded tile or super-fragment and a second final decoded tile or super-fragment to generate a decoded video frame;

transmit the decoded video frame for presentment via a display device, wherein the first modified prediction reference picture comprises at least one of a morphed prediction reference picture, a synthesized prediction reference picture, a gain modified prediction reference picture, a blur modified prediction reference picture, a dominant motion modified prediction reference picture, a registration modified prediction reference picture, a super resolution prediction reference picture, or a projection trajectory prediction reference picture, wherein the first modified prediction reference picture comprises a morphed prediction reference picture and the second modified prediction reference picture comprises a synthesized prediction reference picture, wherein the morphed prediction reference picture comprises at least one of a gain modified prediction reference picture, a blur modified prediction reference picture, a dominant motion modified prediction reference picture, or a registration modified prediction reference picture, wherein the synthesized prediction reference picture comprises at least one of a super resolution prediction reference picture or a projection trajectory prediction reference picture, wherein the first decoded prediction reference picture comprises at least one of a past decoded prediction reference picture or a future decoded prediction reference picture, and wherein the motion data comprises a motion vector.

* * * * *